United States Patent
Cai et al.

(10) Patent No.: US 11,148,166 B2
(45) Date of Patent: Oct. 19, 2021

(54) FLUID-FLOW-MODIFICATION PLATE AND EXTRUDER, COMPRISING THE SAME

(71) Applicant: The Boeing Company, Chicago, IL (US)

(72) Inventors: Fei Cai, Edmonds, WA (US); Weidong Song, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/824,997

(22) Filed: Mar. 20, 2020

(65) Prior Publication Data

US 2021/0291220 A1   Sep. 23, 2021

(51) Int. Cl.
*B29C 48/255* (2019.01)
*F15D 1/02* (2006.01)
(Continued)

(52) U.S. Cl.
CPC .............. *B05C 5/02* (2013.01); *B01F 5/0691* (2013.01); *B29C 48/2556* (2019.02);
(Continued)

(58) Field of Classification Search
CPC .............. B29C 48/255; B29C 48/2556; B29C 48/2886; B29C 48/304; B29C 48/362;
(Continued)

(56) References Cited

U.S. PATENT DOCUMENTS 3,609,806 A  *  10/1971  Schippers et al. ...... B29C 48/70
                                                      425/197
4,150,932 A  *   4/1979  Moghe ................. B29D 23/001
                                                      425/197
(Continued)

FOREIGN PATENT DOCUMENTS

EP         0816047       1/1998
FR         2921292       3/2009
WO       2012095211      7/2012

OTHER PUBLICATIONS

European Search Report, International Application No. 21152016.8 dated Jul. 15, 2021.

*Primary Examiner* — Xiao S Zhao
*Assistant Examiner* — Joseph S Leyson
(74) *Attorney, Agent, or Firm* — Perman & Green, LLP

(57) ABSTRACT

A fluid-flow-modification plate comprises a monolithic body, having an inlet-side surface and an outlet-side surface, a first passage, a second passage, a third passage, and a fourth passage. The first passage, the second passage, the third passage, and the fourth passage each extend between the inlet-side surface and the outlet-side surface. The first passage and the second passage intersect each other at a first intersection boundary. The third passage and the fourth passage intersect each other at a second intersection boundary. The first passage and the third passage do not intersect each other. The second passage and the fourth passage do not intersect each other. The first-passage-inlet-opening perimeter boundary has only two points of intersection with the fourth-passage-inlet-opening perimeter boundary. The second-passage-outlet-opening perimeter boundary has only two points of intersection with the third-passage-outlet-opening perimeter boundary.

21 Claims, 27 Drawing Sheets

(51) Int. Cl.
  *B29C 48/36*   (2019.01)
  *B29C 48/70*   (2019.01)
  *B01F 5/06*    (2006.01)
  *B05C 5/02*    (2006.01)
  *B29C 48/30*   (2019.01)
  *B33Y 80/00*   (2015.01)
  *B29C 48/285*  (2019.01)

(52) U.S. Cl.
  CPC .......... *B29C 48/304* (2019.02); *B29C 48/362* (2019.02); *B29C 48/705* (2019.02); *F15D 1/025* (2013.01); *B29C 48/2886* (2019.02); *B33Y 80/00* (2014.12)

(58) Field of Classification Search
  CPC ....... B29C 48/705; B05C 5/02; B01F 5/0691; F15D 1/025; B33Y 80/00
  See application file for complete search history.

(56) References Cited

U.S. PATENT DOCUMENTS

| | | | | |
|---|---|---|---|---|
| 5,811,048 A | * | 9/1998 | Dunn | B29C 48/30 |
| | | | | 264/177.11 |
| 8,882,485 B2 | * | 11/2014 | Schutt | D01D 4/06 |
| | | | | 425/72.2 |
| 2011/0001267 A1 | * | 1/2011 | Demin | B29C 48/362 |
| | | | | 264/327 |

* cited by examiner

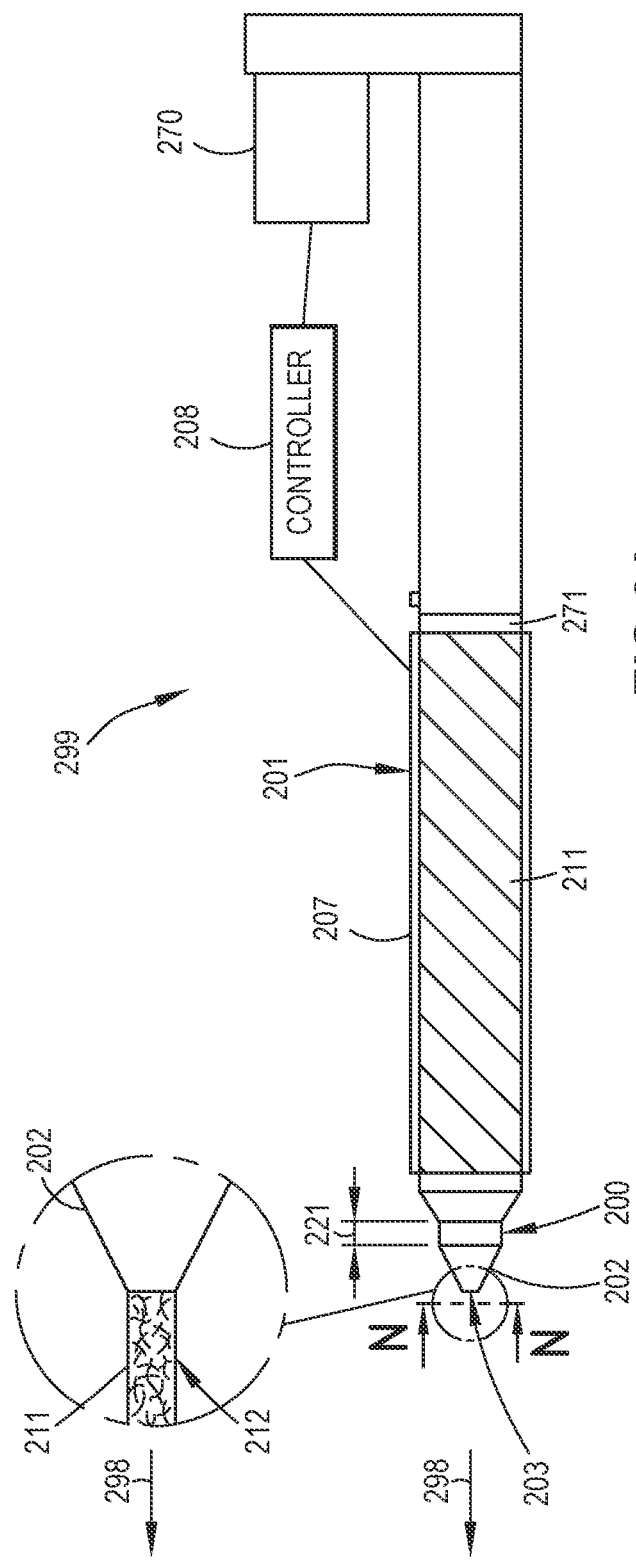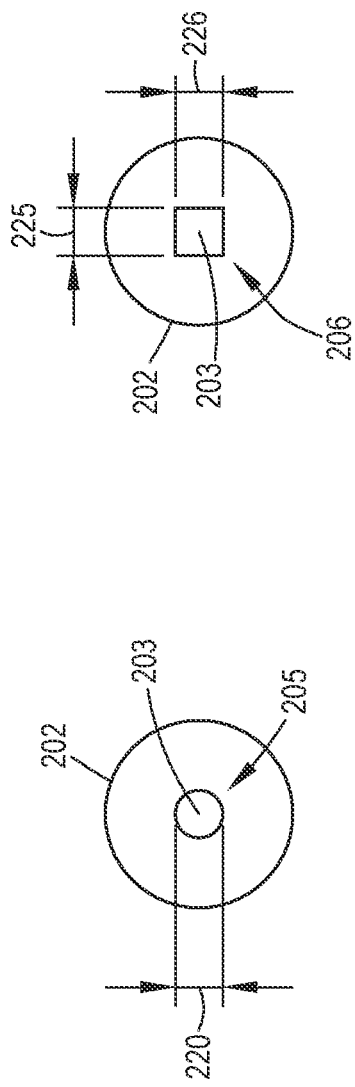
FIG.2A
FIG.2B
FIG.2C

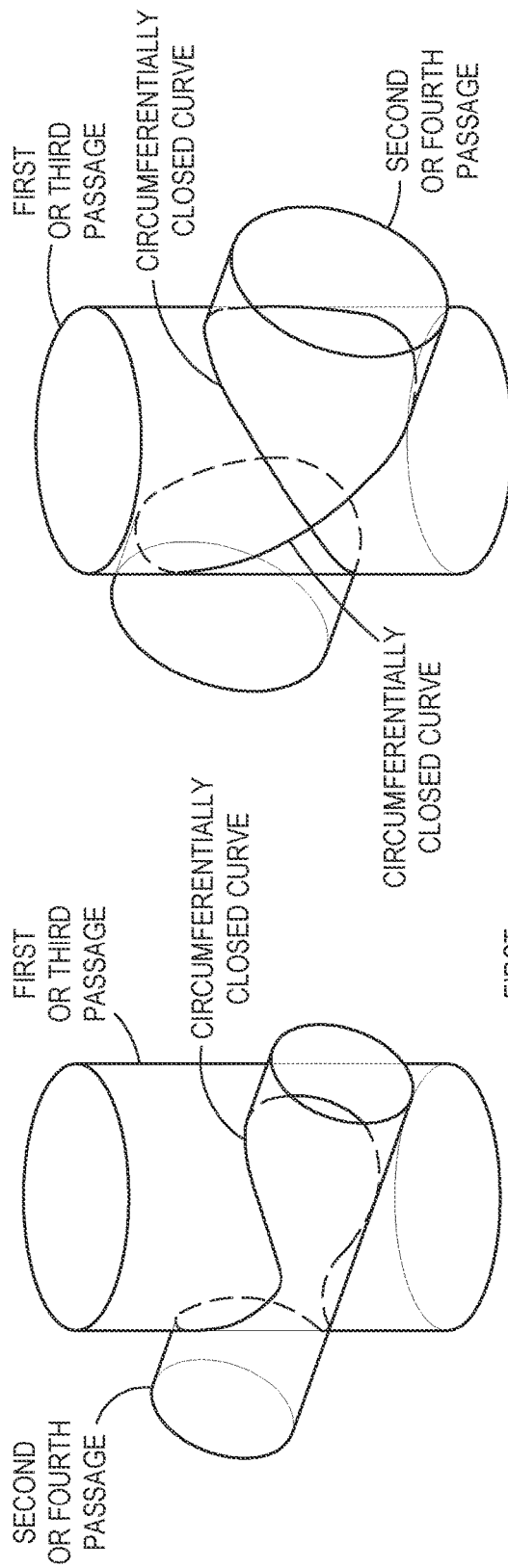
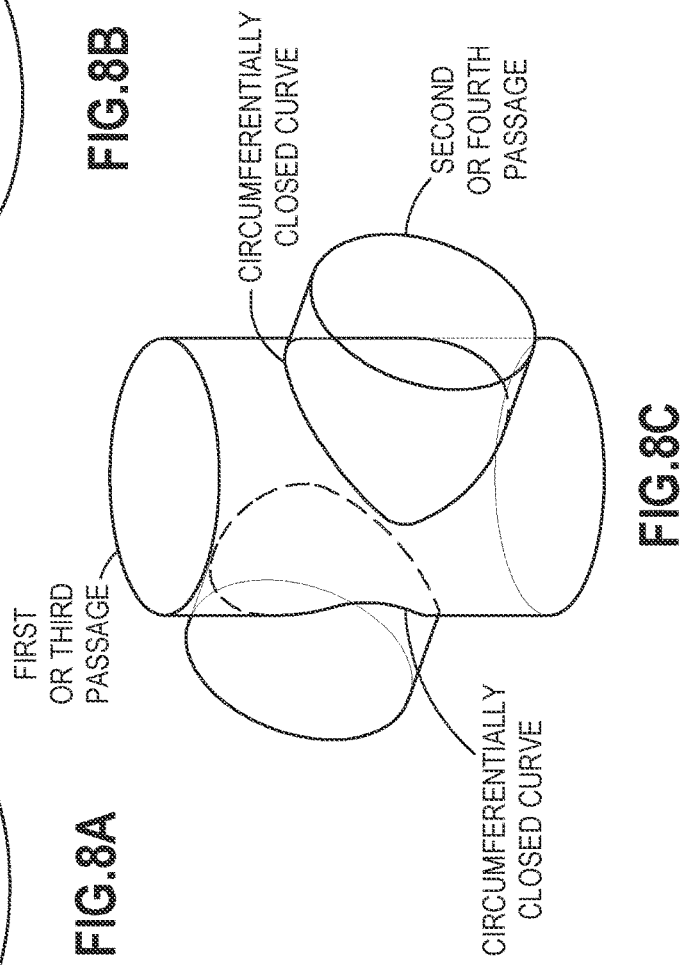
FIG. 8A
FIG. 8B
FIG. 8C

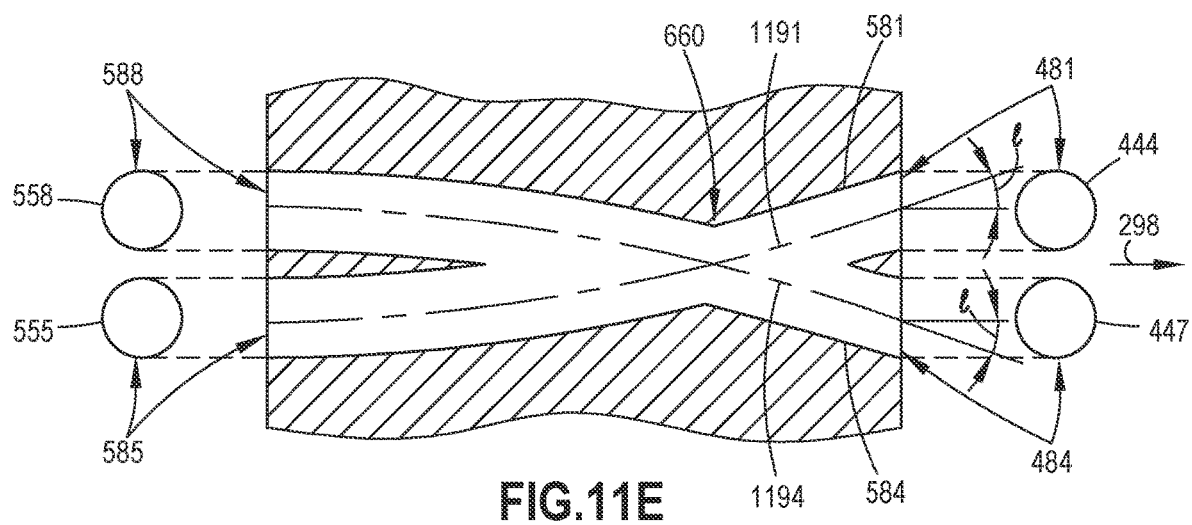
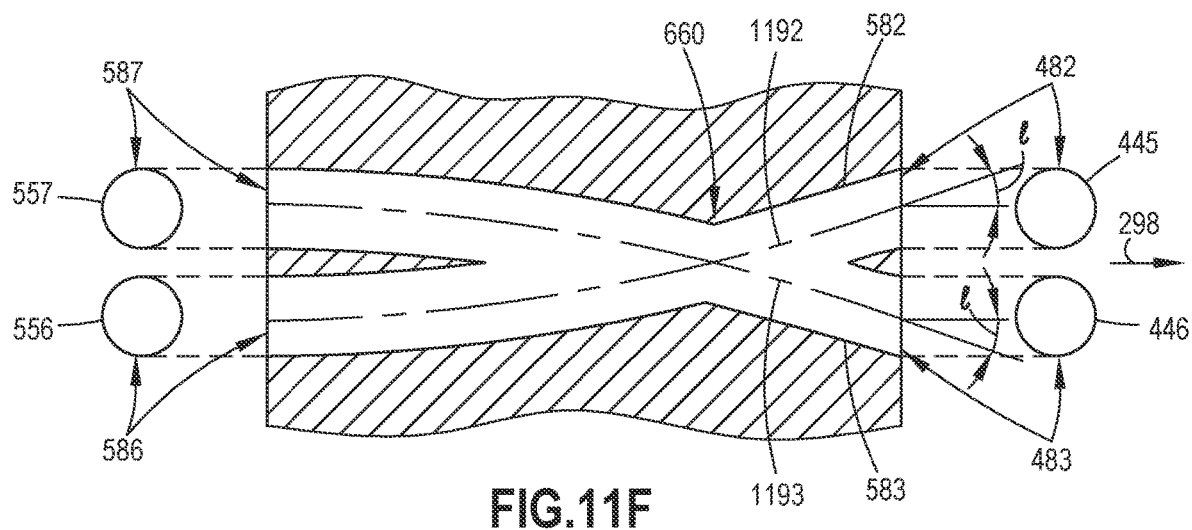

FLUID-FLOW-MODIFICATION PLATE AND EXTRUDER, COMPRISING THE SAME

CROSS-REFERENCE TO RELATED APPLICATION

This application is related to U.S. patent application Ser. No. 16/824,996 filed on Mar. 20, 2020 (titled "Fluid-Flow-Modification Plate and Extruder, Comprising the Same"), the disclosure of which is incorporated herein by reference in its entirety.

TECHNICAL FIELD

The subject matter, disclosed herein, relates to apparatuses and methods for depositing an extrudable substance onto a surface.

BACKGROUND

During assembly of a structure, such as an aircraft or a component thereof, parts, made of highly filled composite materials, may be utilized. These highly filled composite materials are semi-liquid solid compounds (referred to herein as "fluids"), comprising highly viscous resin(s), filled with short reinforcing fibers. Examples of the highly filled composite materials include, but are not limited to, thermoset resin materials and thermoplastic materials that have reinforcing fibers therein. These materials are considered "highly filled composite materials" because, in some examples, such materials have a saturation of reinforcing fibers of at least about 40% fiber to about 60% fiber. In other examples, the highly filled composite material has a saturation of reinforcing fibers of less than about 40% or more than about 60%. The reinforcing fibers may be any suitable reinforcing fibers including, but not limited to, glass fibers and carbon fibers that have a suitable length, such as a high aspect-ratio fiber strand with a length of several millimeters. However, extrusion of the highly filled composite materials with high aspect-ratio fibers tends to align the fibers in the flow direction of the fluid along a length or longitudinal axis of the extruded material, resulting in an anisotropic material. For example, upon passage of the highly filled composite material through an extrusion die, the longitudinal axis of the fiber strands tends to be aligned with the longitudinal axis of the extrusion, rather than randomized or unaligned with respect to the longitudinal axis of the extruded material.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is a fluid-flow-modification plate. The fluid-flow-modification plate comprises a monolithic body, a first passage, a second passage, a third passage, and a fourth passage. The monolithic body has an inlet-side surface and an outlet-side surface. The first passage extends between the inlet-side surface and the outlet-side surface and comprises a first-passage inlet opening and a first-passage outlet opening. The first-passage inlet opening has a first-passage-inlet-opening perimeter boundary, defined in the inlet-side surface of the monolithic body. The first-passage outlet opening has a first-passage-outlet-opening perimeter boundary, defined in the outlet-side surface of the monolithic body. The second passage extends between the inlet-side surface and the outlet-side surface and comprises a second-passage inlet opening and a second-passage outlet opening. The second-passage inlet opening has a second-passage-inlet-opening perimeter boundary, defined in the inlet-side surface of the monolithic body. The second-passage outlet opening has a second-passage-outlet-opening perimeter boundary, defined in the outlet-side surface of the monolithic body. The third passage extends between the inlet-side surface and the outlet-side surface and comprises a third-passage inlet opening and a third-passage outlet opening. The third-passage inlet opening has a third-passage-inlet-opening perimeter boundary, defined in the inlet-side surface of the monolithic body. The third-passage outlet opening has a third-passage-outlet-opening perimeter boundary, defined in the outlet-side surface of the monolithic body. The fourth passage extends between the inlet-side surface and the outlet-side surface and comprises a fourth-passage inlet opening and a fourth-passage outlet opening. The fourth-passage inlet opening has a fourth-passage-inlet-opening perimeter boundary, defined in the inlet-side surface of the monolithic body. The fourth-passage outlet opening has a fourth-passage-outlet-opening perimeter boundary, defined in the outlet-side surface of the monolithic body. The first passage and the second passage intersect each other at a first intersection boundary. The third passage and the fourth passage intersect each other at a second intersection boundary. The first passage and the third passage do not intersect each other. The second passage and the fourth passage do not intersect each other. The first-passage-inlet-opening perimeter boundary has only two points of intersection with the fourth-passage-inlet-opening perimeter boundary. The first-passage inlet opening and the second-passage inlet opening are separated from each other at least by a portion of the inlet-side surface. The first-passage inlet opening and the third-passage inlet opening are separated from each other at least by a portion of the inlet-side surface. The second-passage inlet opening and the third-passage inlet opening are separated from each other at least by a portion of the inlet-side surface. The third-passage inlet opening and the fourth-passage inlet opening are separated from each other at least by a portion of the inlet-side surface. The second-passage-outlet-opening perimeter boundary has only two points of intersection with the third-passage-outlet-opening perimeter boundary. The first-passage outlet opening and the second-passage outlet opening are separated from each other at least by a portion of the outlet-side surface. The first-passage outlet opening and the third-passage outlet opening are separated from each other at least by a portion of the outlet-side surface. The first-passage outlet opening and the fourth-passage outlet opening are separated from each other at least by a portion of the outlet-side surface. The third-passage outlet opening and the fourth-passage outlet opening are separated from each other at least by a portion of the outlet-side surface.

The fluid-flow-modification plate randomizes orientations of the fibers of the highly filled composite material during extrusion so as to produce an isotropic material and structure formed therewith, having substantially similar mechanical properties in substantially all directions.

Also disclosed herein is an extruder that comprises a material-feed chamber, a nozzle, and a fluid-flow-modification plate, coupled to the material-feed chamber and to the nozzle. The fluid-flow-modification plate comprises a monolithic body, a first passage, a second passage, a third passage, and a fourth passage. The monolithic body has an inlet-side surface and an outlet-side surface. The first passage extends between the inlet-side surface and the outlet-side surface and comprises a first-passage inlet opening and a first-passage outlet opening. The first-passage inlet opening has a first-passage-inlet-opening perimeter boundary, defined in the inlet-side surface of the monolithic body. The first-passage outlet opening has a first-passage-outlet-opening perimeter boundary, defined in the outlet-side surface of the monolithic body. The second passage extends between the inlet-side surface and the outlet-side surface and comprises a second-passage inlet opening and a second-passage outlet opening. The second-passage inlet opening has a second-passage-inlet-opening perimeter boundary, defined in the inlet-side surface of the monolithic body. The second-passage outlet opening has a second-passage-outlet-opening perimeter boundary, defined in the outlet-side surface of the monolithic body. The third passage extends between the inlet-side surface and the outlet-side surface and comprises a third-passage inlet opening and a third-passage outlet opening. The third-passage inlet opening has a third-passage-inlet-opening perimeter boundary, defined in the inlet-side surface of the monolithic body. The third-passage outlet opening has a third-passage-outlet-opening perimeter boundary, defined in the outlet-side surface of the monolithic body. The fourth passage extends between the inlet-side surface and the outlet-side surface and comprises a fourth-passage inlet opening and a fourth-passage outlet opening. The fourth-passage inlet opening has a fourth-passage-inlet-opening perimeter boundary, defined in the inlet-side surface of the monolithic body. The fourth-passage outlet opening has a fourth-passage-outlet-opening perimeter boundary, defined in the outlet-side surface of the monolithic body. The first passage and the second passage intersect each other at a first intersection boundary. The third passage and the fourth passage intersect each other at a second intersection boundary. The first passage and the third passage do not intersect each other. The second passage and the fourth passage do not intersect each other. The first-passage-inlet-opening perimeter boundary has only two points of intersection with the fourth-passage-inlet-opening perimeter boundary. The first-passage inlet opening and the second-passage inlet opening are separated from each other at least by a portion of the inlet-side surface. The first-passage inlet opening and the third-passage inlet opening are separated from each other at least by a portion of the inlet-side surface. The second-passage inlet opening and the third-passage inlet opening are separated from each other at least by a portion of the inlet-side surface. The third-passage inlet opening and the fourth-passage inlet opening are separated from each other at least by a portion of the inlet-side surface. The second-passage-outlet-opening perimeter boundary has only two points of intersection with the third-passage-outlet-opening perimeter boundary. The first-passage outlet opening and the second-passage outlet opening are separated from each other at least by a portion of the outlet-side surface. The first-passage outlet opening and the third-passage outlet opening are separated from each other at least by a portion of the outlet-side surface. The first-passage outlet opening and the fourth-passage outlet opening are separated from each other at least by a portion of the outlet-side surface. The third-passage outlet opening and the fourth-passage outlet opening are separated from each other at least by a portion of the outlet-side surface.

The extruder, comprising the fluid-flow-modification plate, forces highly filled composite material through the fluid-flow-modification plate, and the fluid-flow-modification plate randomizes orientations of the fibers of the highly filled composite material during extrusion to produce an isotropic material.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIG. 2A is a schematic illustration of the extruder of FIGS. 1A-1, 1A-2, 1B-1, 1B-2, 1C-1, and 1C-2, according to one or more examples of the subject matter, disclosed herein;

FIG. 2B is a schematic end view N-N of the extruder of FIG. 2A illustrating a shape of an extrusion nozzle outlet, according to one or more examples of the subject matter, disclosed herein;

FIG. 2C is a schematic end view N-N of the extruder of FIG. 2A illustrating a shape of an extrusion nozzle outlet, according to one or more examples of the subject matter, disclosed herein;

FIGS. 8A, 8B, and 8C are schematic, perspective illustrations of intersections between passages of the fluid-flow-modification plate of the extruder of FIG. 2A, according to one or more examples of the subject matter, disclosed herein;

FIG. 11E is a schematic, sectional side-view illustration of the fluid-flow-modification plate of the extruder of FIG. 2A, taken along circle 379 in FIG. 3, according to one or more examples of the subject matter, disclosed herein;

FIG. 11F is a schematic, sectional side-view illustration of the fluid-flow-modification plate of the extruder of FIG. 2A, taken along circle 379 in FIG. 3, according to one or more examples of the subject matter, disclosed herein;

DETAILED DESCRIPTION

In FIGS. 1A-1, 1A-2, 1B-1, 1B-2, 1C-1, and 1C-2, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1A-1, 1A-2, 1B-1, 1B-2, 1C-1, and 1C-2 may be combined in various ways without the need to include other features described in FIGS. 1A-1, 1A-2, 1B-1, 1B-2, 1C-1, and 1C-2, other drawing figures, and/or the accompanying disclosure, even though such combination or combinations are not explicitly illustrated herein. Similarly, additional features not limited to the examples presented, may be combined with some or all of the features shown and described herein.

Figure 12:
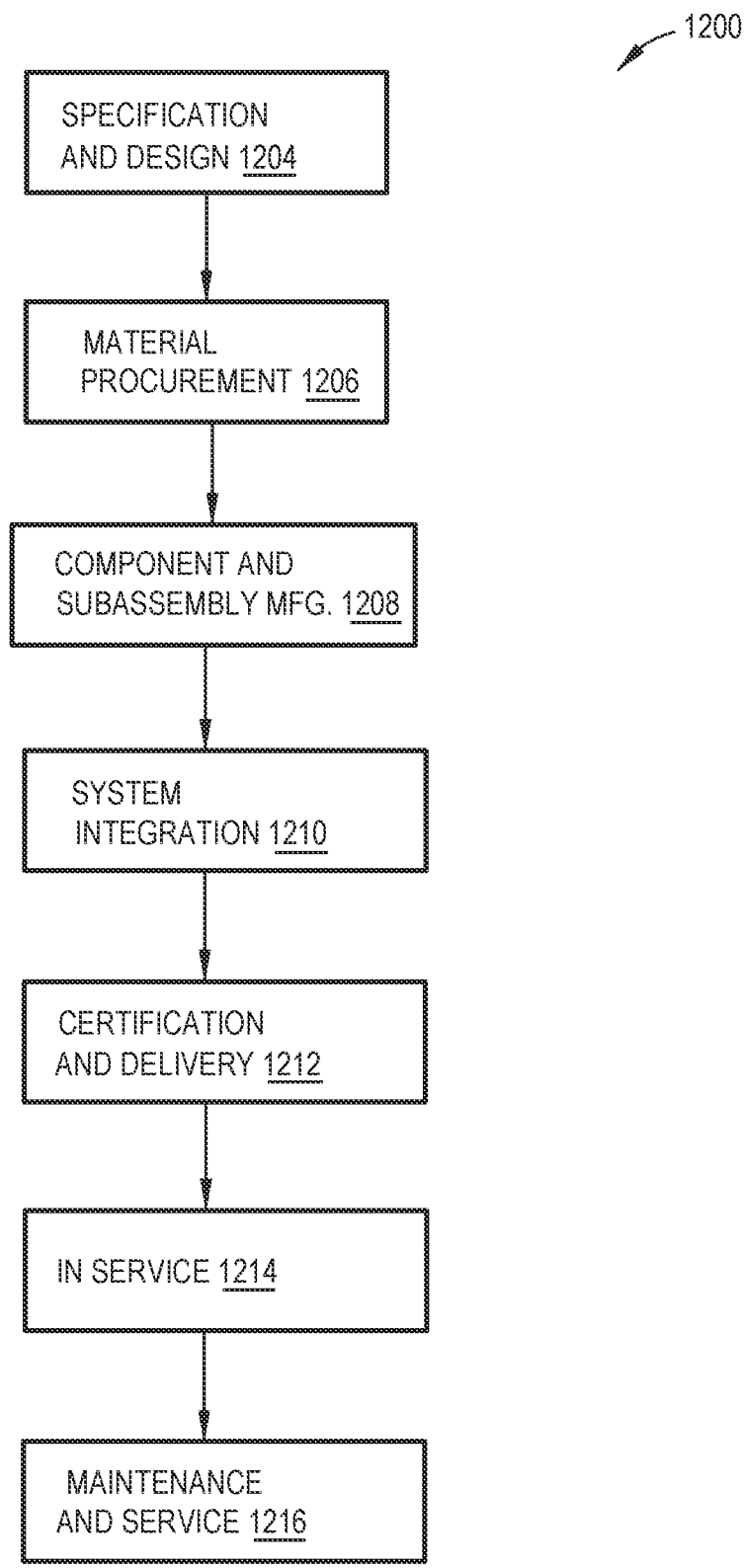
FIG. 12 is a block diagram of aircraft production and service methodology.

In FIG. 12, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIGS. 1A-1, 1A-2, 1B-1, 1B-2, 1C-1, 1C-2, and 2 and particularly to, e.g., FIGS. 3-6, 7A, 7B, 7C, and 7D for illustrative purposes only and not by way of limitation, fluid-flow-modification plate 200 is disclosed. Fluid-flow-modification plate 200 comprises monolithic body 300, first passage 501, second passage 502, third passage 503, and fourth passage 504. Monolithic body 300 has inlet-side surface 301 and outlet-side surface 302. First passage 501 extends between inlet-side surface 301 and outlet-side surface 302 and comprises first-passage inlet opening 511 and first-passage outlet opening 521. First-passage inlet opening 511 has first-passage-inlet-opening perimeter boundary 311, defined in inlet-side surface 301 of monolithic body 300. First-passage outlet opening 521 has first-passage-outlet-opening perimeter boundary 411, defined in outlet-side surface 302 of monolithic body 300. Second passage 502 extends between inlet-side surface 301 and outlet-side surface 302 and comprises second-passage inlet opening 512 and second-passage outlet opening 522. Second-passage inlet opening 512 has second-passage-inlet-opening perimeter boundary 312, defined in inlet-side surface 301 of monolithic body 300. Second-passage outlet opening 522 has second-passage-outlet-opening perimeter boundary 412, defined in outlet-side surface 302 of monolithic body 300. Third passage 503 extends between inlet-side surface 301 and outlet-side surface 302 and comprises third-passage inlet opening 513 and third-passage outlet opening 523. Third-passage inlet opening 513 has third-passage-inlet-opening perimeter boundary 313, defined in inlet-side surface 301 of monolithic body 300. Third-passage outlet opening 523 has third-passage-outlet-opening perimeter boundary 413, defined in outlet-side surface 302 of monolithic body 300. Fourth passage 504 extends between inlet-side surface 301 and outlet-side surface 302 and comprises fourth-passage inlet opening 514 and fourth-passage outlet opening 524. Fourth-passage inlet opening 514 has fourth-passage-inlet-opening perimeter boundary 314, defined in inlet-side surface 301 of monolithic body 300. Fourth-passage outlet opening 524 has fourth-passage-outlet-opening perimeter boundary 414, defined in outlet-side surface 302 of monolithic body 300. First passage 501 and second passage 502 intersect each other at first intersection boundary 530. Third passage 503 and fourth passage 504 intersect each other at second intersection boundary 531. First passage 501 and third passage 503 do not intersect each other. Second passage 502 and fourth passage 504 do not intersect each other. First-passage-inlet-opening perimeter boundary 311 has only two points 700, 701 of intersection with fourth-passage-inlet-opening perimeter boundary 314. First-passage inlet opening 511 and second-passage inlet opening 512 are separated from each other at least by a portion of inlet-side surface 301. First-passage inlet opening 511 and third-passage inlet opening 513 are separated from each other at least by a portion of inlet-side surface 301. Second-passage inlet opening 512 and third-passage inlet opening 513 are separated from each other at least by a portion of inlet-side surface 301. Third-passage inlet opening 513 and fourth-passage inlet opening 514 are separated from each other at least by a portion of inlet-side surface 301. Second-passage-outlet-opening perimeter boundary 412 has only two points 702, 703 of intersection with third-passage-outlet-opening perimeter boundary 413. First-passage outlet opening 521 and second-passage outlet opening 522 are separated from each other at least by a portion of outlet-side surface 302. First-passage outlet opening 521 and third-passage outlet opening 523 are separated from each other at least by a portion of outlet-side surface 302. First-passage outlet opening 521 and fourth-passage outlet opening 524 are separated from each other at least by a portion of outlet-side surface 302. Third-passage outlet opening 523 and fourth-passage outlet opening 524 are separated from each other at least by a portion of outlet-side surface 302. The preceding portion of this paragraph characterizes example 1 of the subject matter, disclosed herein.

The arrangement of first passage 501, second passage 502, third passage 503, and fourth passage 504 of fluid-flow-modification plate randomizes orientations of reinforcing fibers 212 of highly filled composite material 211 during extrusion to produce an isotropic material.

As noted above, highly filled composite material 211 is a semi-liquid solid compound that consists of highly viscous resin(s) filled with short reinforcing fibers. Examples of highly filled composite material 211 include, but are not limited to thermoset resin materials and thermoplastic materials that have reinforcing fibers 212 therein. In some examples, highly filled composite material 211 has a saturation of reinforcing fibers 212 of at least about 40% fiber to about 60% fiber. In other examples, highly filled composite material 211 may have a saturation of reinforcing fibers of less than about 40% or more than about 60%. In one or more examples, reinforcing fibers 212 are of any suitable type of reinforcing fiber including, but not limited to, glass fiber and carbon fiber that have any suitable length, such as a high aspect-ratio fiber strand with a length of about a few millimeters.

At least first passage 501, second passage 502, third passage 503, and fourth passage 504 are angled relative to one another and fluid-flow direction 298 of highly filled composite material 211 through extruder 299, which will be described in greater detail herein.

In one or more examples, at least first passage 501, second passage 502, third passage 503, and fourth passage 504 are angled relative to each other and fluid-flow direction 298, where highly filled composite material 211 exits each of first passage 501, second passage 502, third passage 503, and fourth passage 504 as a respective fluid-flow stream that is intertwined and mixed with other fluid-flow streams from first passage 501, second passage 502, third passage 503, and fourth passage 504. The intertwining and mixing of the respective fluid-flow streams randomizes orientations of reinforcing fibers 212 in highly filled composite material 211 as highly filled composite material 211 exits nozzle 202. In one or more examples, the randomized orientation of reinforcing fibers 212 results in reinforcing fibers 212 extending at various angles relative to each other and fluid-flow direction 298 as illustrated in FIG. 2A, thereby producing an isotropic material.

In some examples, first passage 501, second passage 502, third passage 503, and fourth passage 504 have smooth surfaces, so that a laminar flow of highly filled composite material 211 passes through a respective one of first passage 501, second passage 502, third passage 503, and fourth passage 504. In other examples, first passage 501, second passage 502, third passage 503, and fourth passage 504 have textured surfaces that induce turbulence in the flow of highly filled composite material 211 passes through a respective one of first passage 501, second passage 502, third passage 503, and fourth passage 504. In one or more examples, turbulent flow within first passage 501, second passage 502, third passage 503, and fourth passage 504 causes further randomization of orientations of reinforcing fibers 212 of highly filled composite material 211 during extrusion to produce the isotropic material.

Referring also to FIGS. 8A-8C, in one or more examples, first passage 501 intersects second passage 502 at first intersection boundary 530 in any suitable manner. In some examples, referring to FIG. 8A, the intersection between first passage 501 and second passage 502 is a single-branch curve, which occurs when one passage (e.g., first passage 501 or second passage 502) passes only partially through another passage (e.g., the other of first passage 501 or second passage 502). In some examples, referring to FIG. 8B, the intersection between first passage 501 and second passage 502 is a two-branch curve, which occurs when one passage (e.g., first passage 501 or second passage 502) passes completely through another passage (e.g., the other of first passage 501 or second passage 502). Here, second passage 502 passes completely through first passage 501 so that second passage 502 forms circumferentially closed curves with first passage 501 (or vice versa), where the circumferentially closed curve (and hence the passage cross-section) can be circular, oval, elliptical, polygonal, irregular, etc. In some examples, referring to FIG. 8C, the intersection between first passage 501 and second passage 502 is a curve of the fourth order with one double point, which occurs when two cylinders (e.g., first passage 501 and second passage 502) have a common tangent plane. In one or more examples, the intersection between third passage 503 and fourth passage 504 is a single-branch curve, a two-branch curve, or a curve of the fourth order.

Referring generally to FIGS. 1A-1, 1A-2, 1B-1, 1B-2, 1C-1, 1C-2, and 2 and particularly to, e.g., FIGS. 5, 7A, 7B, 7C, and 7D for illustrative purposes only and not by way of limitation, outlet-side surface 302 is parallel to inlet-side surface 301. The preceding portion of this paragraph characterizes example 2 of the subject matter, disclosed herein, where example 2 also encompasses example 1, above.

Outlet-side surface 302 being parallel to inlet-side surface 301 provides for ease of manufacture of fluid-flow-modification plate 200.

Referring generally to FIGS. 1A-1, 1A-2, 1B-1, 1B-2, 1C-1, 1C-2, and 2 and particularly to, e.g., FIGS. 7A, 7B, 7C, and 7D for illustrative purposes only and not by way of limitation, a sum of a smallest cross-sectional area of first passage 501 and a smallest cross sectional area of fourth passage 504 is greater than an area, circumscribed by first-passage-inlet-opening perimeter boundary 311 and fourth-passage-inlet-opening perimeter boundary 314. The preceding portion of this paragraph characterizes example 3 of the subject matter, disclosed herein, where example 3 also encompasses example 1 or 2, above.

The sum of a smallest cross-sectional area of first passage 501 and a smallest cross sectional area of fourth passage 504 being greater than the area, circumscribed by first-passage-inlet-opening perimeter boundary 311 and fourth-passage-inlet-opening perimeter boundary 314 decreases a surface area of inlet-side surface 301. Decreasing the surface area of inlet-side surface 301 allows highly filled composite material 211 to enter fluid-flow-modification plate 200 with decreased fluid-flow stagnation adjacent first-passage-inlet-opening perimeter boundary 311 and fourth-passage-inlet-opening perimeter boundary 314.

Referring generally to FIGS. 1A-1, 1A-2, 1B-1, 1B-2, 1C-1, 1C-2, and 2 and particularly to, e.g., FIGS. 7A, 7B, 7C, and 7D for illustrative purposes only and not by way of limitation, the sum of the smallest cross-sectional area of first passage 501 and the smallest cross sectional area of fourth passage 504 is no more than 50% greater than the area, circumscribed by first-passage-inlet-opening perimeter boundary 311 and fourth-passage-inlet-opening perimeter boundary 314. The preceding portion of this paragraph characterizes example 4 of the subject matter, disclosed herein, where example 4 also encompasses example 3, above.

The sum of the smallest cross-sectional area of first passage 501 and the smallest cross sectional area of fourth passage 504 being no more than 50% greater than the area, circumscribed by first-passage-inlet-opening perimeter boundary 311 and fourth-passage-inlet-opening perimeter boundary 314 prevents over-restriction of highly filled composite material 211 into first passage 501 and fourth passage 504.

Figure 5:
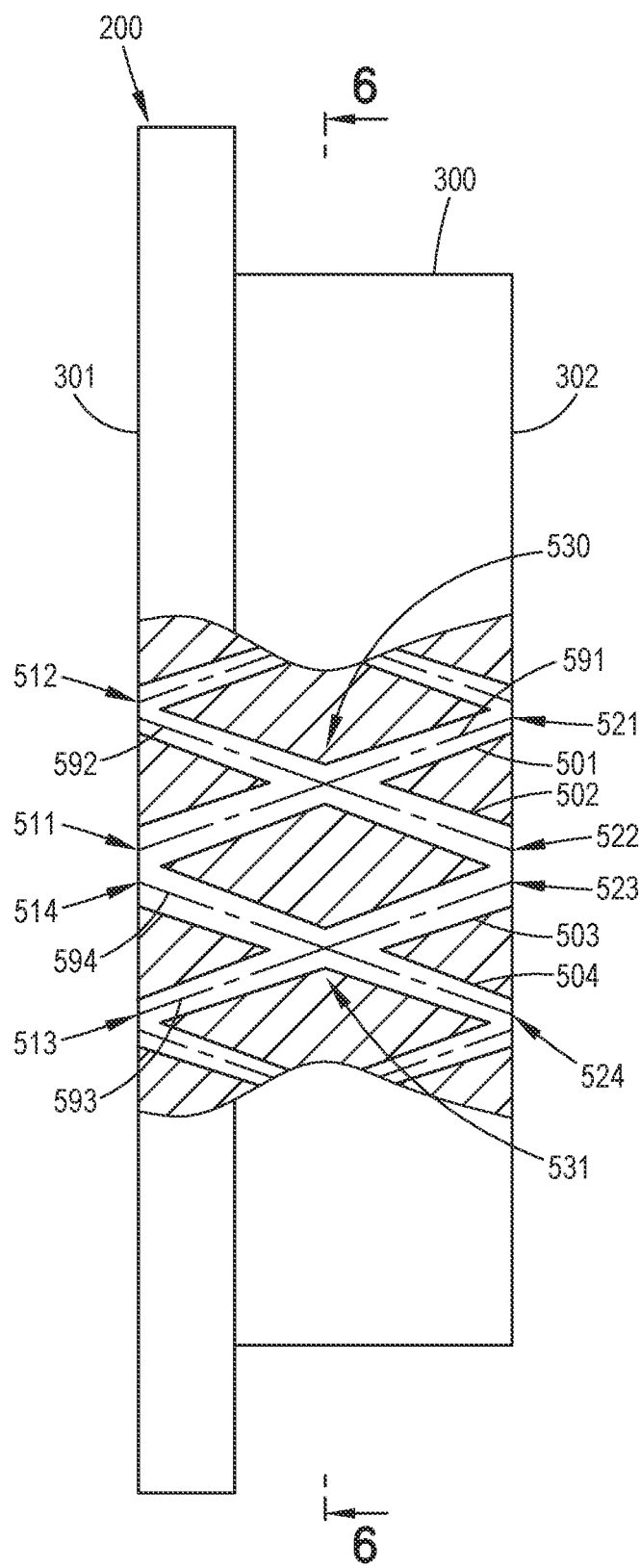
FIG. 5 is a schematic side view, illustrating a partial cross-section of the fluid-flow-modification plate of the extruder of FIG. 2A, taken along circle 377 in FIG. 3, according to one or more examples of the subject matter, disclosed herein.
Figure 7A:
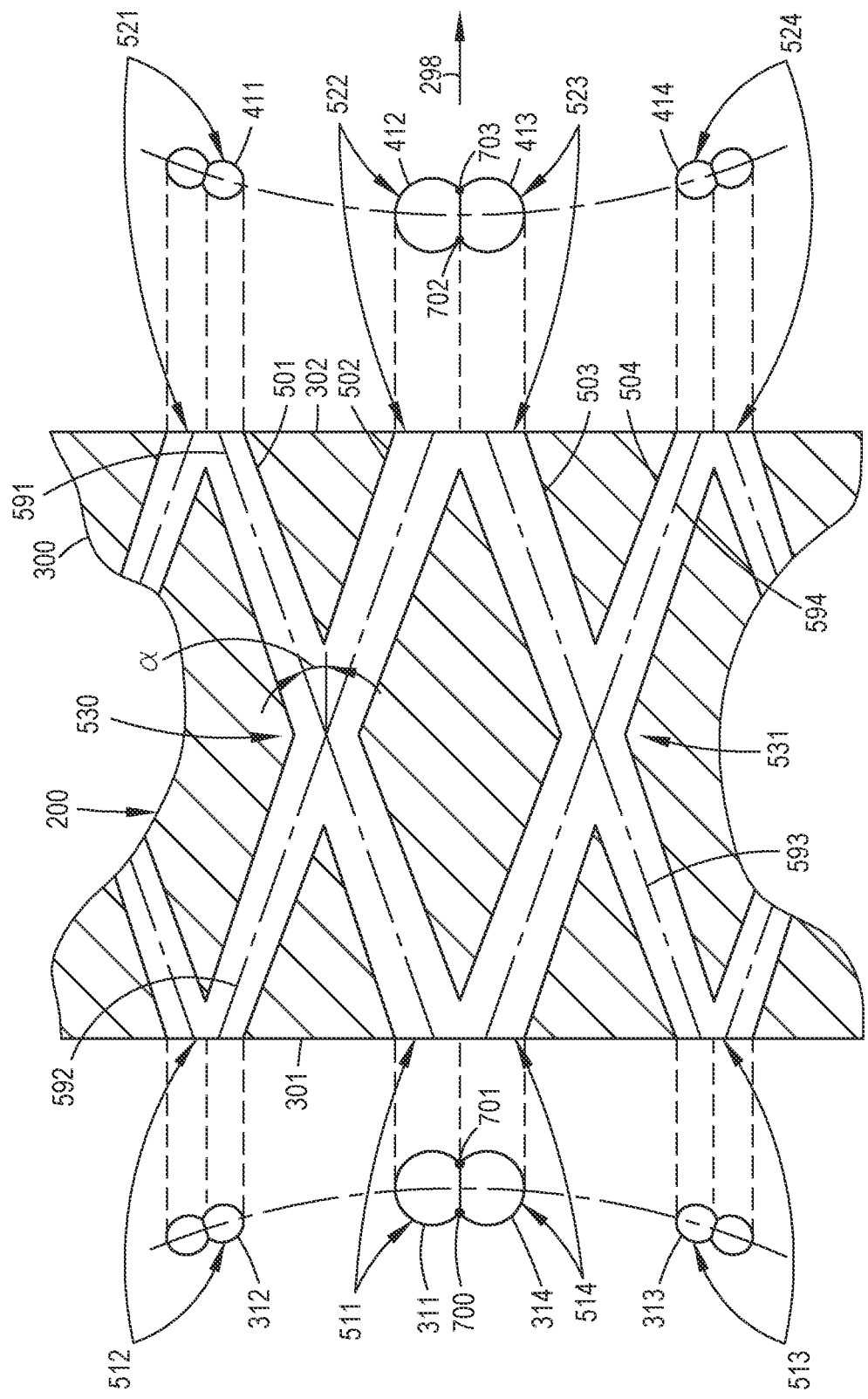
FIG. 7A is a schematic, sectional side-view illustration of the fluid-flow-modification plate of the extruder of FIG. 2A, taken along circle 377 in FIG. 3, according to one or more examples of the subject matter, disclosed herein.
Figure 7B:
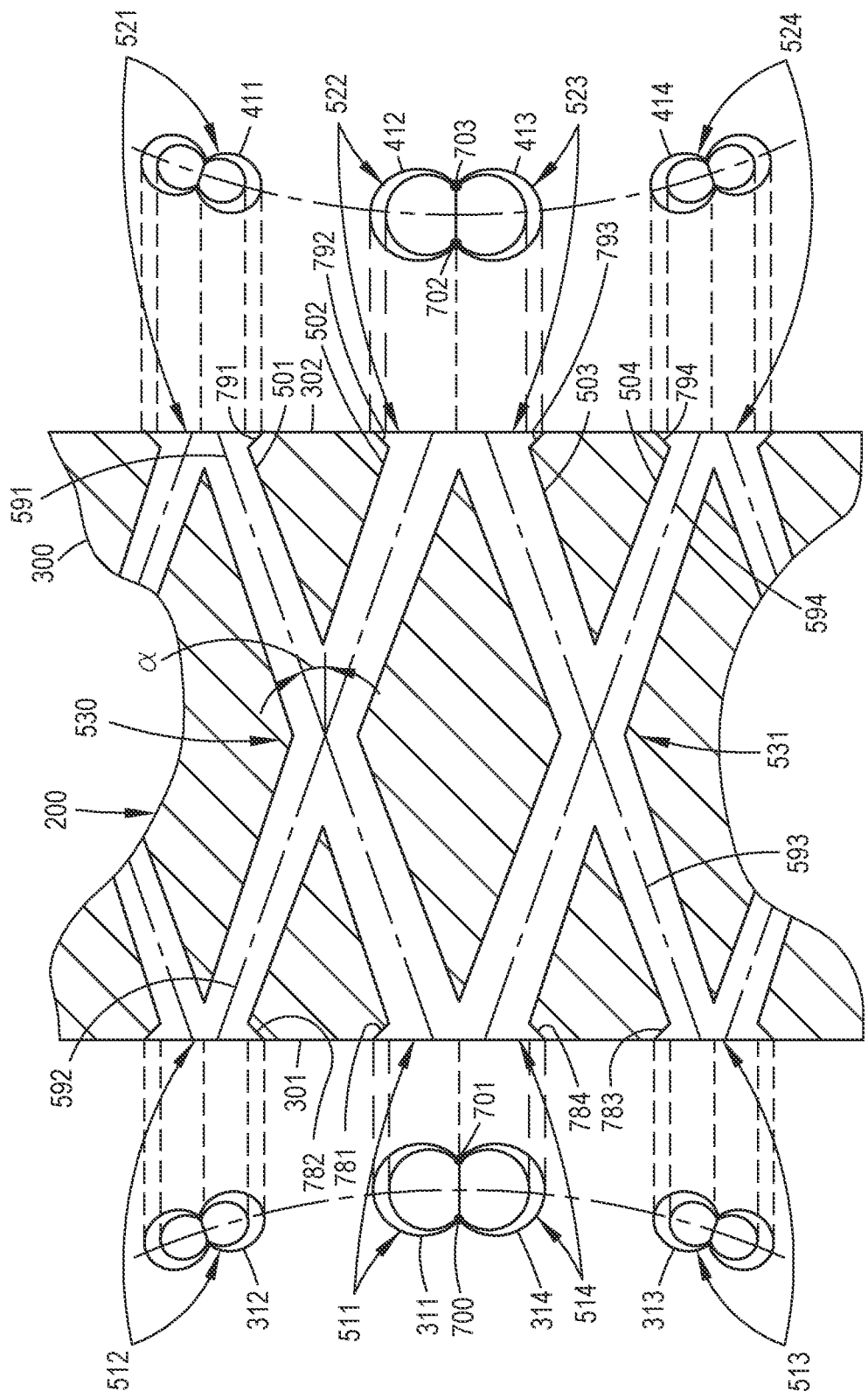
FIG. 7B is a schematic, sectional side-view illustration of the fluid-flow-modification plate of the extruder of FIG. 2A, taken along circle 377 in FIG. 3, according to one or more examples of the subject matter, disclosed herein.

Referring generally to FIGS. 1A-1, 1A-2, 1B-1, 1B-2, 1C-1, 1C-2, and 2 and particularly to, e.g., FIGS. 5, 7A, and 7B for illustrative purposes only and not by way of limitation, first passage 501 has first-passage centerline 591, and first-passage centerline 591 is a straight line. The preceding portion of this paragraph characterizes example 5 of the subject matter, disclosed herein, where example 5 also encompasses any one of examples 1 to 4, above.

First-passage centerline 591 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 5, 7A, and 7B for illustrative purposes only and not by way of limitation, second passage 502 has second-passage centerline 592, and second-passage centerline 592 is a straight line. The preceding portion of this paragraph characterizes example 6 of the subject matter, disclosed herein, where example 6 also encompasses any one of examples 1 to 5, above.

Second-passage centerline 592 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 5, 7A, and 7B for illustrative purposes only and not by way of limitation, third passage 503 has third-passage centerline 593, and third-passage centerline 593 is a straight line. The preceding portion of this paragraph characterizes example 7 of the subject matter, disclosed herein, where example 7 also encompasses any one of examples 1 to 6, above.

Third-passage centerline 593 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 5, 7A, and 7B for illustrative purposes only and not by way of limitation, fourth passage 504 has fourth-passage centerline 594, and fourth-passage centerline 594 is a straight line. The preceding portion of this paragraph characterizes example 8 of the subject matter, disclosed herein, where example 8 also encompasses any one of examples 1 to 7, above.

Fourth-passage centerline 594 being a straight line provides for each of manufacture of fluid-flow-modification plate 200 with conventional manufacturing techniques, including but not limited to drilling and boring.

Referring to FIGS. 7A and 7B, in one or more examples, first-passage centerline 591, second-passage centerline 592, third-passage centerline 593, and fourth-passage centerline 594 are angled relative to fluid-flow direction 298 by any suitable angle α that facilitates the intertwined and mixed fluid-flow streams from first passage 501, second passage 502, third passage 503, and fourth passage 504. For example, angle α produces highly filled-material flow, exiting each of first passage 501, second passage 502, third passage 503, and fourth passage 504, that has a fluid-flow component in a direction transverse to fluid-flow direction 298 and a fluid-flow component in a direction of fluid-flow direction 298. In one or more examples, angle α is about 30° to about 45°; however, in one or more other examples, angle α is about 30° or more than about 45°.

Figure 7C:
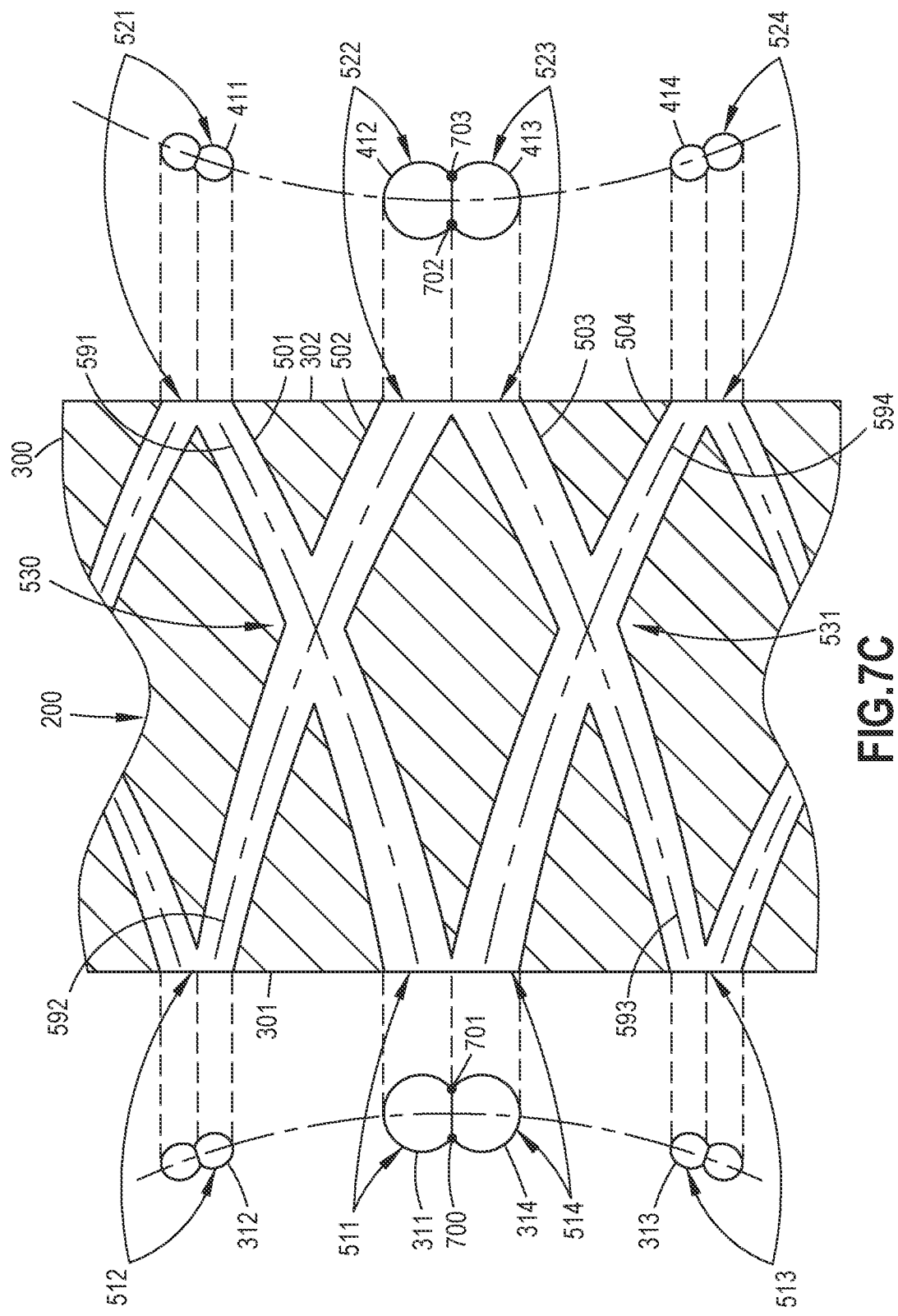
FIG. 7C is a schematic, sectional side-view illustration of the fluid-flow-modification plate of the extruder of FIG. 2A, taken along circle 377 in FIG. 3, according to one or more examples of the subject matter, disclosed herein.
Figure 7D:
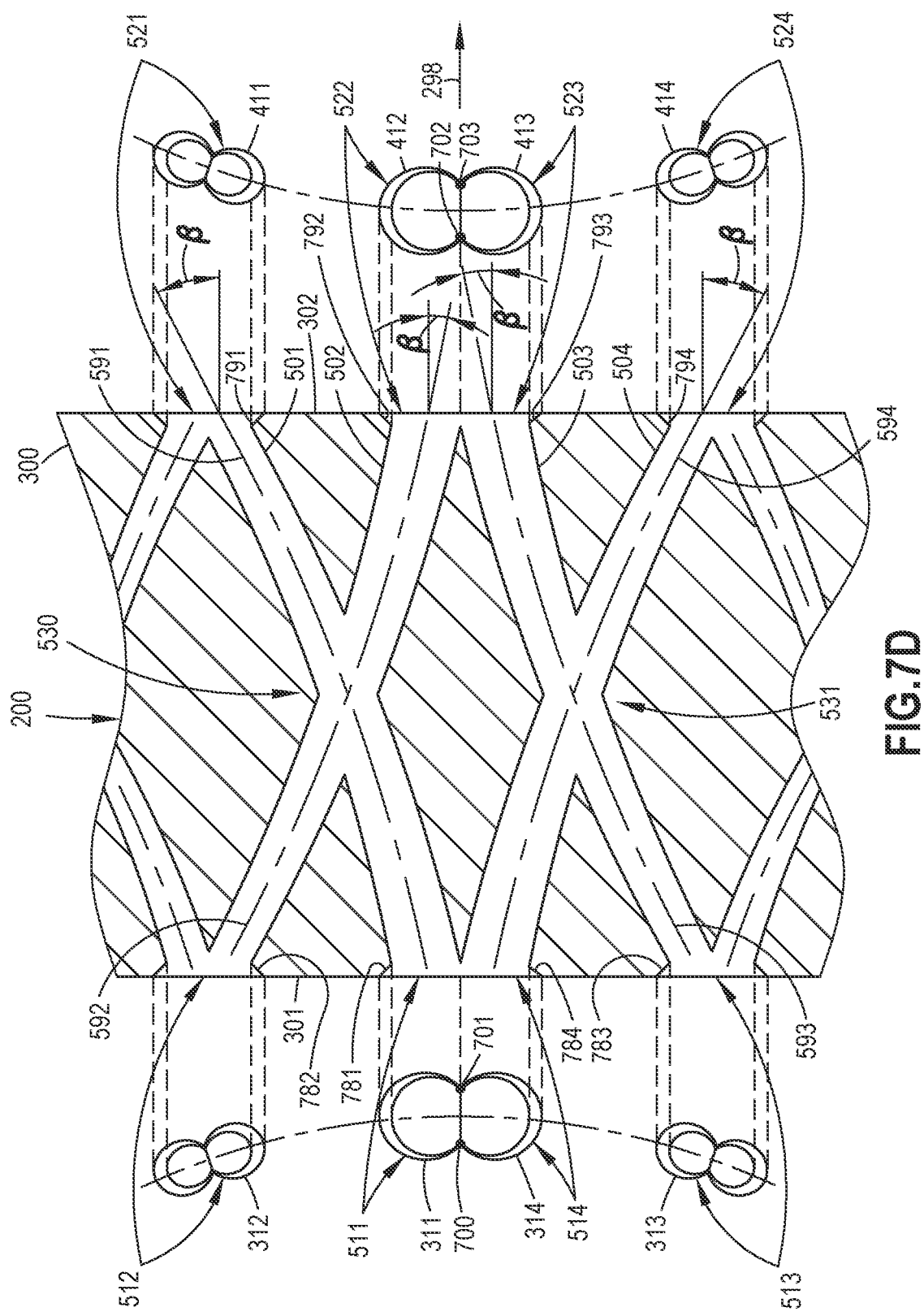
FIG. 7D is a schematic, sectional side-view illustration of the fluid-flow-modification plate of the extruder of FIG. 2A, taken along circle 377 in FIG. 3, according to one or more examples of the subject matter, disclosed herein.

Referring generally to FIGS. 1A-1, 1A-2, 1B-1, 1B-2, 1C-1, 1C-2, and 2 and particularly to, e.g., FIGS. 7C and 7D for illustrative purposes only and not by way of limitation, first passage 501 has first-passage centerline 591, and first-passage centerline 591 is a curved line. The preceding portion of this paragraph characterizes example 9 of the subject matter, disclosed herein, where example 9 also encompasses any one of examples 1 to 4, above.

First-passage centerline 591 being a curved line increases exit angle β of highly filled composite material 211 (see FIG. 2A) exiting first passage 501 relative to fluid-flow direction 298. For example, the more first-passage centerline 591 is curved, the larger is exit angle β. Increased exit angle β causes intertwining and mixing of the respective fluid-flow streams from first passage 501, second passage 502, third passage 503, and fourth passage 504 and randomizes orientations of reinforcing fibers 212 in highly filled composite material 211 as highly filled composite material 211 exits nozzle 202 (see FIG. 2A). In some examples, first-passage centerline 591 being a curved line provides for first passage 501, having an inlet that is substantially parallel with fluid-flow direction 298, while providing exit angle β.

Referring generally to FIGS. 1A-1, 1A-2, 1B-1, 1B-2, 1C-1, 1C-2, and 2 and particularly to, e.g., FIGS. 7C and 7D for illustrative purposes only and not by way of limitation, first-passage centerline 591 has no inflection points. The preceding portion of this paragraph characterizes example 10 of the subject matter, disclosed herein, where example 10 also encompasses example 9, above.

In one or more examples, first-passage centerline 591 having no inflection points substantially prevents fluid-flow stagnation through first passage 501. For purposes of this disclosure, an inflection point is defined as a transition point between a concave portion and a convex portion of a curvilinear line or segment, adjoining each other, as viewed from one side of the curvilinear line or segment.

Referring generally to FIGS. 1A-1, 1A-2, 1B-1, 1B-2, 1C-1, 1C-2, and 2 and particularly to, e.g., FIGS. 7C and 7D for illustrative purposes only and not by way of limitation, second passage 502 has second-passage centerline 592, and second-passage centerline 592 is a curved line. The preceding portion of this paragraph characterizes example 11 of the subject matter, disclosed herein, where example 11 also encompasses any one of examples 1 to 4, 9, and 10, above.

In one or more examples, second-passage centerline 592 being a curved line increases exit angle β of highly filled composite material 211 (see FIG. 2A) exiting second passage 502 relative to fluid-flow direction 298. For instance, the more second-passage centerline 592 is curved, the larger is exit angle β. Increased exit angle β causes intertwining and mixing of the respective fluid-flow streams from first passage 501, second passage 502, third passage 503, and fourth passage 504 and randomizes orientations of reinforcing fibers 212 in highly filled composite material 211 as highly filled composite material 211 exits nozzle 202 (see FIG. 2A). In one or more examples, second-passage centerline 592 being a curved line also provides for second passage 502 having an inlet that is substantially parallel with fluid-flow direction 298, while providing exit angle β.

Referring generally to FIGS. 1A-1, 1A-2, 1B-1, 1B-2, 1C-1, 1C-2, and 2 and particularly to, e.g., FIGS. 7C, and 7D for illustrative purposes only and not by way of limitation, second-passage centerline 592 has no inflection points. The preceding portion of this paragraph characterizes example 12 of the subject matter, disclosed herein, where example 12 also encompasses example 11, above.

In one or more examples, second-passage centerline 592 having no inflection points substantially prevents fluid-flow stagnation through second passage 502.

Referring generally to FIGS. 1A-1, 1A-2, 1B-1, 1B-2, 1C-1, 1C-2, and 2 and particularly to, e.g., FIGS. 7C and 7D for illustrative purposes only and not by way of limitation, third passage 503 has third-passage centerline 593, and third-passage centerline 593 is a curved line. The preceding portion of this paragraph characterizes example 13 of the subject matter, disclosed herein, where example 13 also encompasses any one of examples 1 to 4 and 9 to 12, above.

In one or more examples, third-passage centerline 593 being a curved line increases exit angle β of highly filled composite material 211 (see FIG. 2A) exiting third passage 503 relative to fluid-flow direction 298. For example, the more third-passage centerline 593 is curved, the larger is exit angle β. Increased exit angle β causes intertwining and mixing of the respective fluid-flow streams from first passage 501, second passage 502, third passage 503, and fourth passage 504 and randomizes orientations of reinforcing fibers 212 in highly filled composite material 211 as highly filled composite material 211 exits nozzle 202 (see FIG. 2A). In one or more examples, third-passage centerline 593 being a curved line also provides for third passage 503 having an inlet that is substantially parallel with fluid-flow direction 298, while providing exit angle β.

Referring generally to FIGS. 1A-1, 1A-2, 1B-1, 1B-2, 1C-1, 1C-2, and 2 and particularly to, e.g., FIGS. 7C and 7D for illustrative purposes only and not by way of limitation, third-passage centerline 593 has no inflection points. The preceding portion of this paragraph characterizes example 14 of the subject matter, disclosed herein, where example 14 also encompasses example 13, above.

In one or more examples, third-passage centerline 593 having no inflection points substantially prevents fluid-flow stagnation through third passage 503.

Referring generally to FIGS. 1A-1, 1A-2, 1B-1, 1B-2, 1C-1, 1C-2, and 2 and particularly to, e.g., FIGS. 7C, and 7D for illustrative purposes only and not by way of limitation, fourth passage 504 has fourth-passage centerline 594, and fourth-passage centerline 594 is a curved line. The preceding portion of this paragraph characterizes example 15 of the subject matter, disclosed herein, where example 15 also encompasses any one of examples 1 to 4 and 9 to 14, above.

In one or more examples, fourth-passage centerline 594 being a curved line increases exit angle β of highly filled composite material 211 (see FIG. 2A) exiting fourth passage 504 relative to fluid-flow direction 298. For example, the more fourth-passage centerline 594 is curved, the larger is exit angle β. Increased exit angle β causes intertwining and mixing of the respective fluid-flow streams from first passage 501, second passage 502, third passage 503, and fourth passage 504 and randomizes orientations of reinforcing fibers 212 in highly filled composite material 211 as highly filled composite material 211 exits nozzle 202 (see FIG. 2A). In one or more examples, fourth-passage centerline 594 being a curved line also provides for fourth passage 504 having an inlet that is substantially parallel with fluid-flow direction 298, while providing exit angle β.

While exit angle β is illustrated as being substantially the same for first passage 501, second passage 502, third passage 503, and fourth passage 504, in one or more examples, the exit angle for one or more of first passage 501, second passage 502, third passage 503, and fourth passage 504 is different than the exit angle of another of first passage 501, second passage 502, third passage 503, and fourth passage 504. In one or more examples, exit angle β is about 30° to about 45°; however, in one or more other examples, exit angle β is less than about 30° or more than about 45°.

In one or more examples, first-passage centerline 591, second-passage centerline 592, third-passage centerline 593, and fourth-passage centerline 594 are curved lines, and hence first passage 501, second passage 502, third passage 503, and fourth passage 504 are be curved passages, formed using any suitable manufacturing technique, including, but not limited to, additive manufacturing, lost wax casting, sand casting, etc.

Referring generally to FIGS. 1A-1, 1A-2, 1B-1, 1B-2, 1C-1, 1C-2, and 2 and particularly to, e.g., FIGS. 7C, and 7D for illustrative purposes only and not by way of limitation, fourth-passage centerline 594 has no inflection points. The preceding portion of this paragraph characterizes example 16 of the subject matter, disclosed herein, where example 16 also encompasses example 15, above.

In one or more examples, fourth-passage centerline 594 having no inflection points substantially prevents fluid-flow stagnation through fourth passage 504.

Figures 1, 1A:
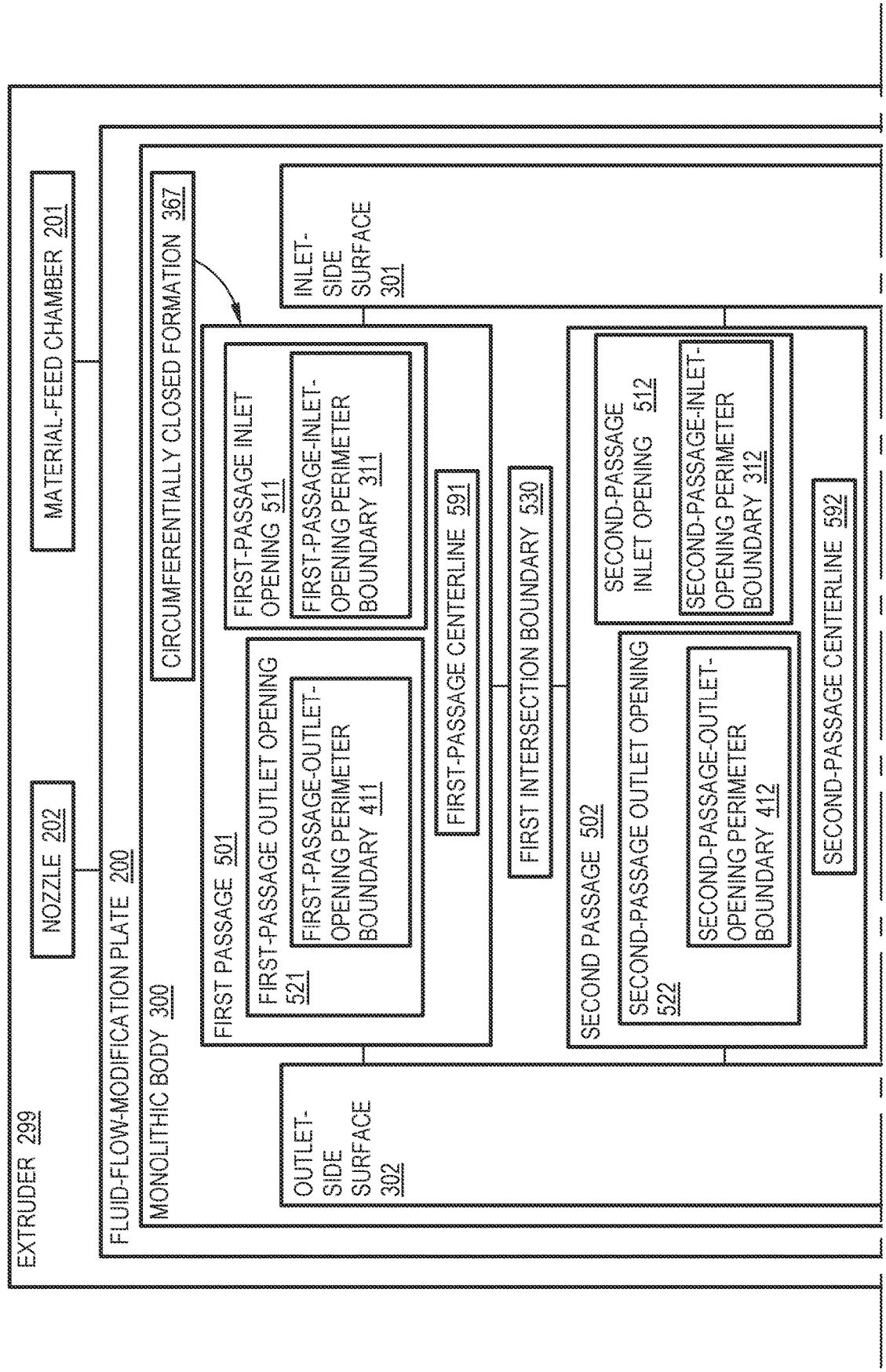
FIGS. 1A-1, 1A-2, 1B-1, 1B-2, 1C-1, and 1C-2, collectively, are a block diagram of an extruder, including a fluid-flow-modification plate, for depositing an extrudable substance, according to one or more examples of the subject matter, disclosed herein.
Figures 1, 1A, 2:
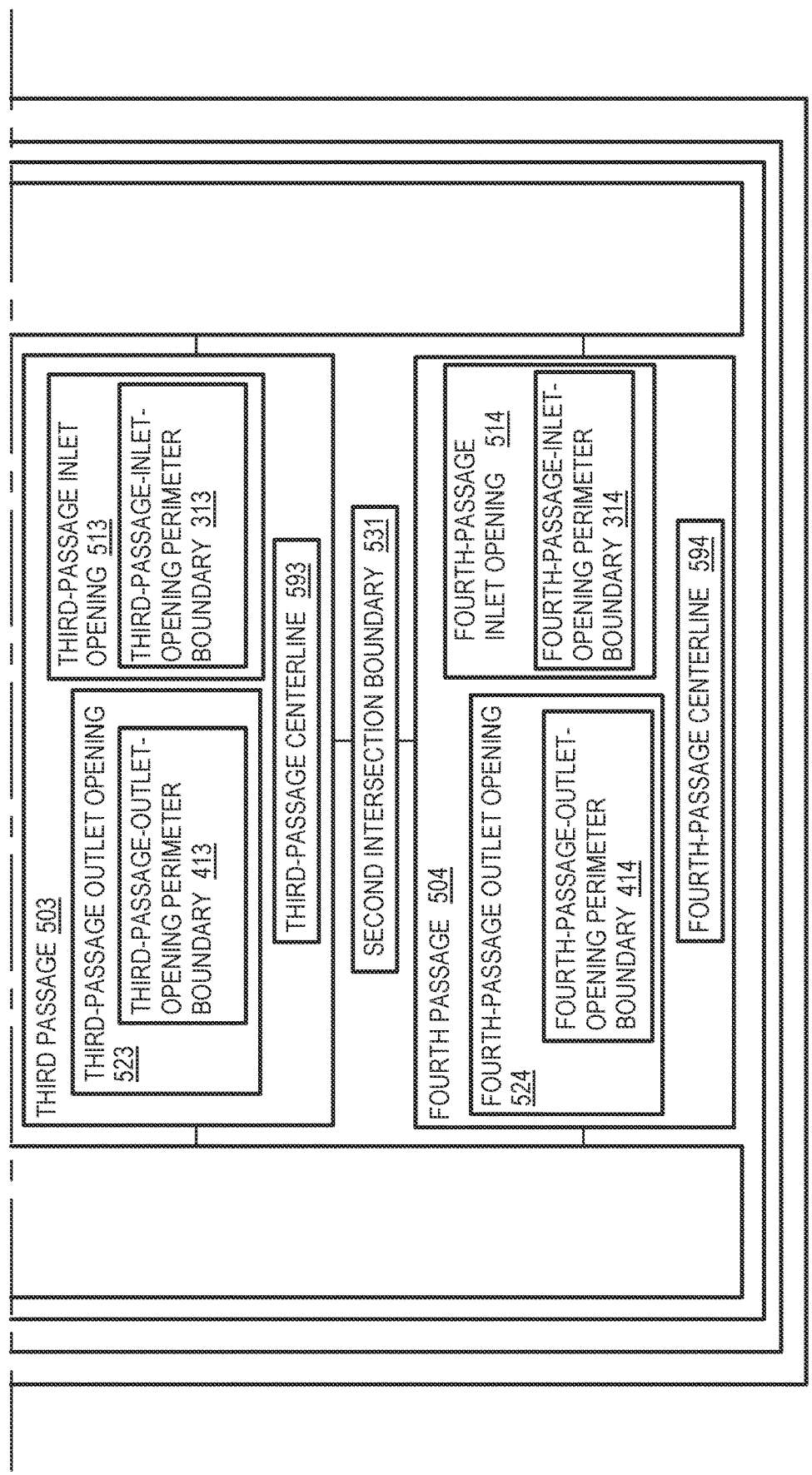
Figures 1, 1B:
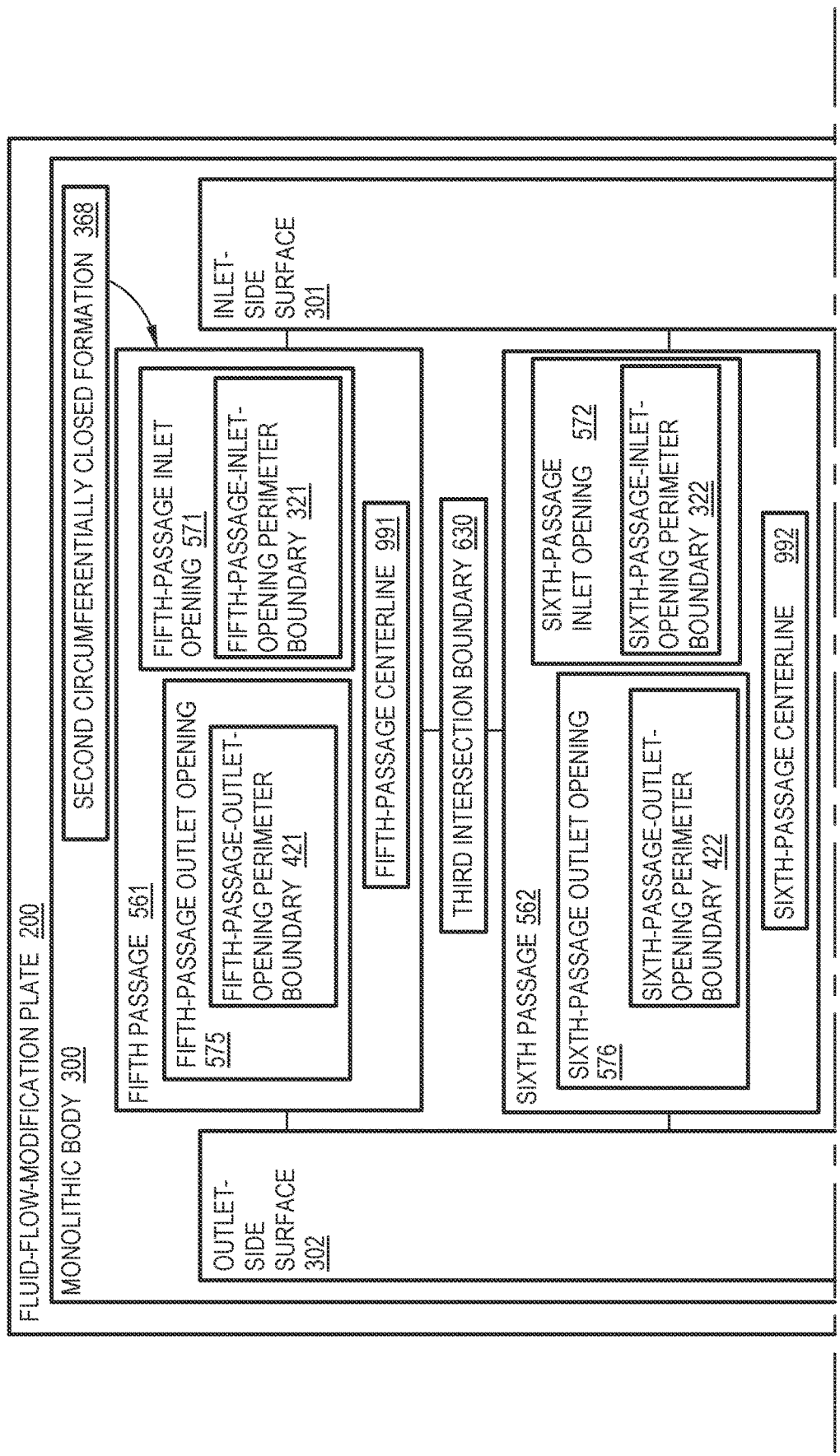
Figures 1, 1B, 2:
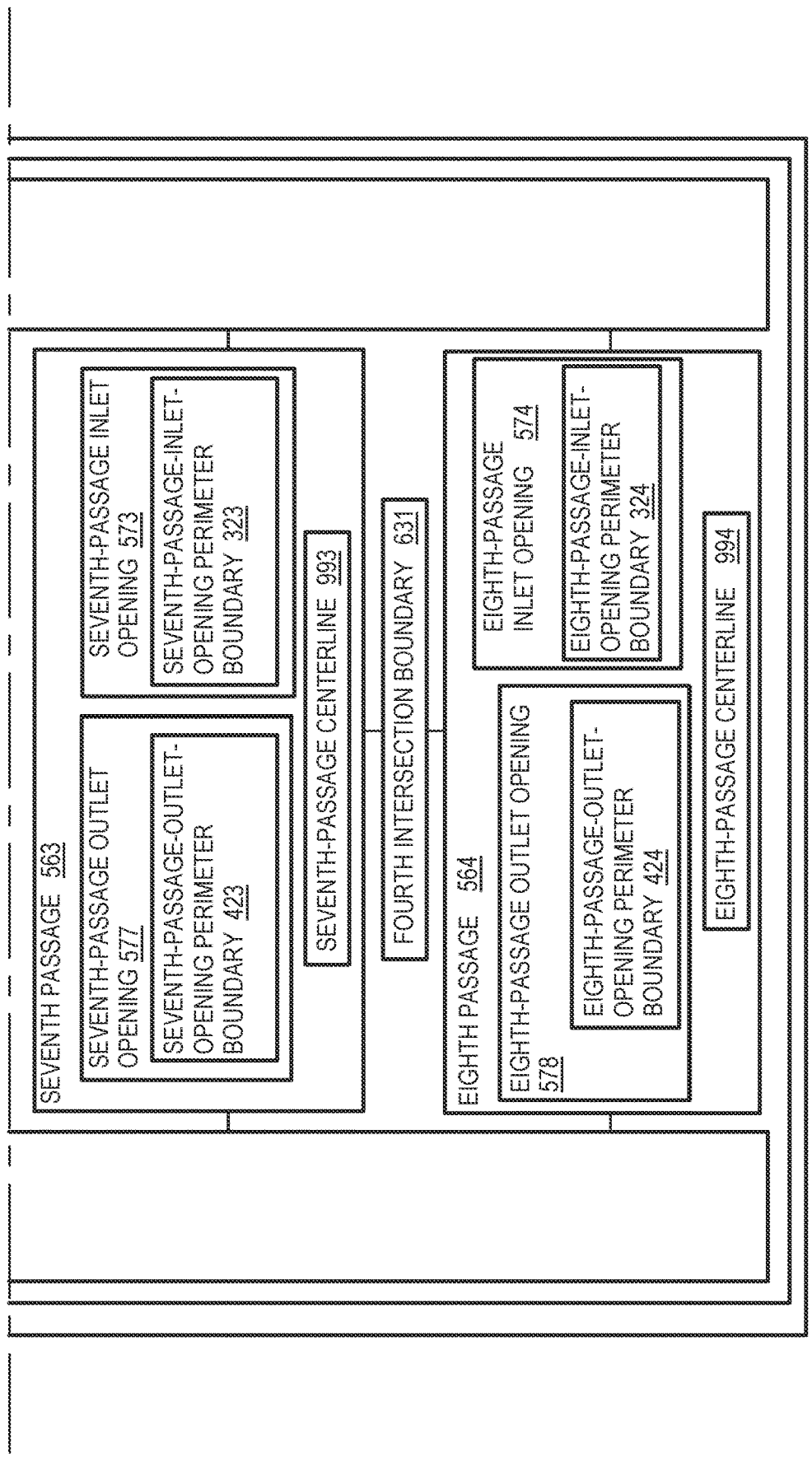
Figures 1, 1C:
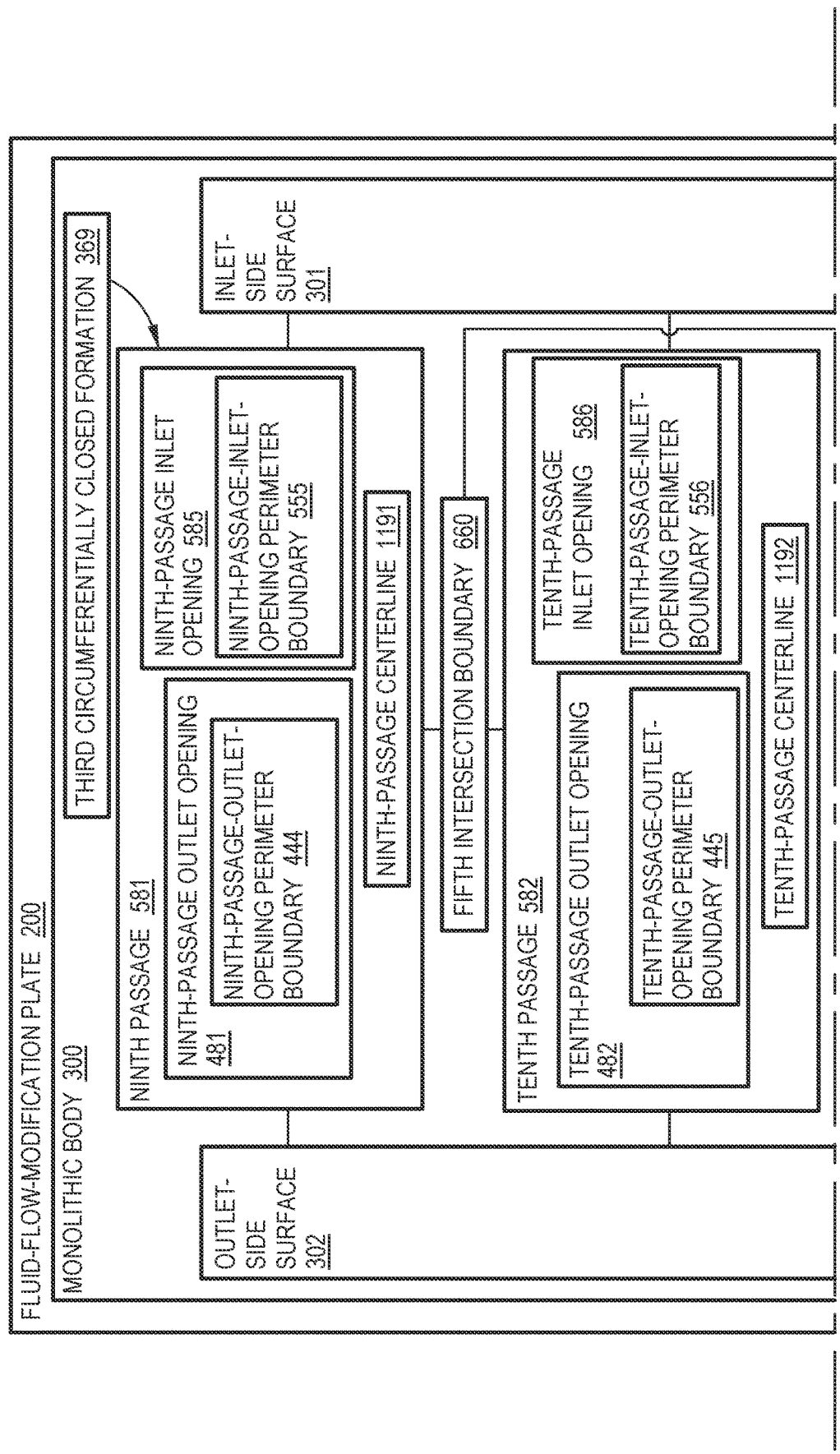
Figures 1, 1C, 2:
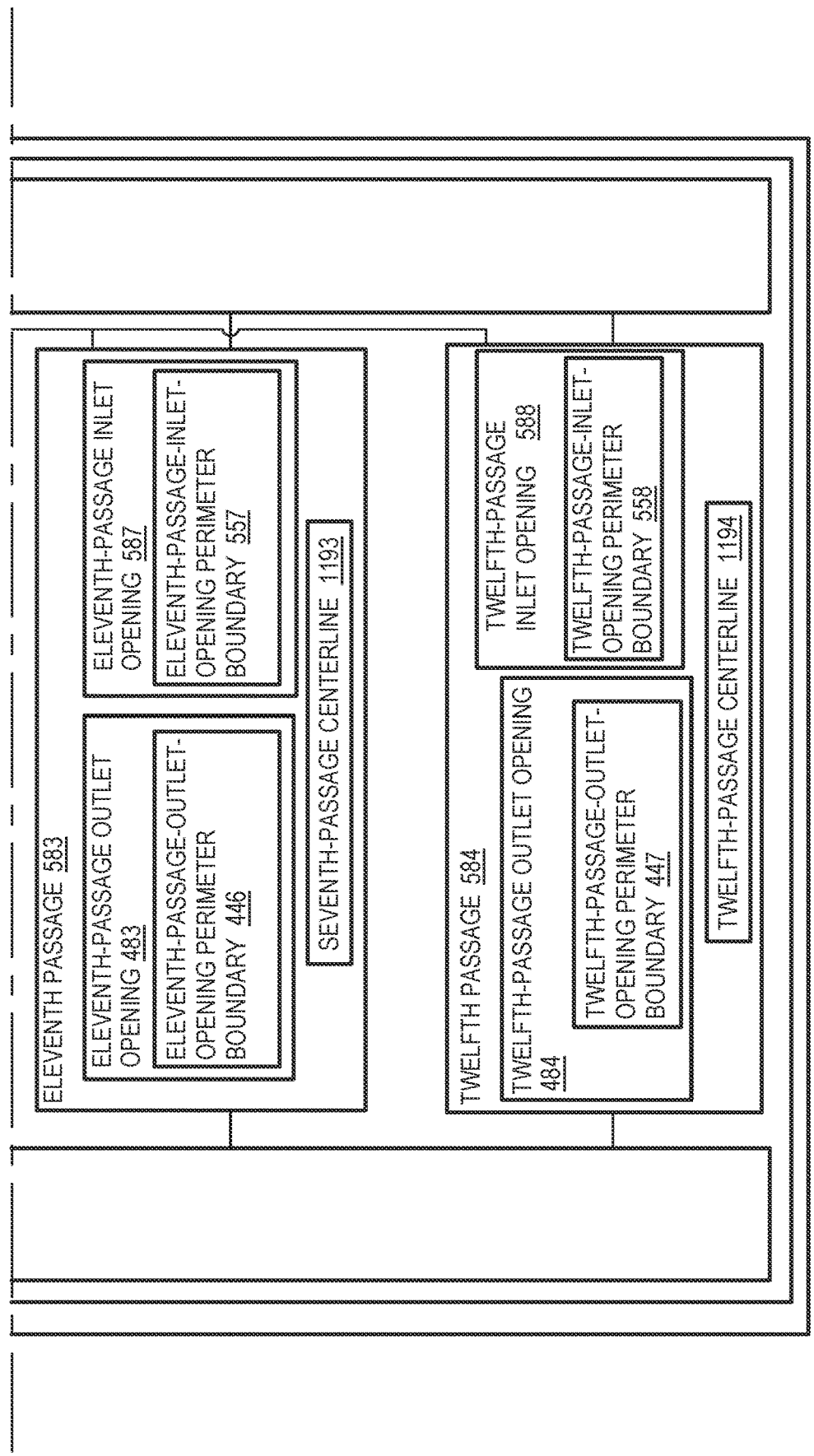
Figure 3:
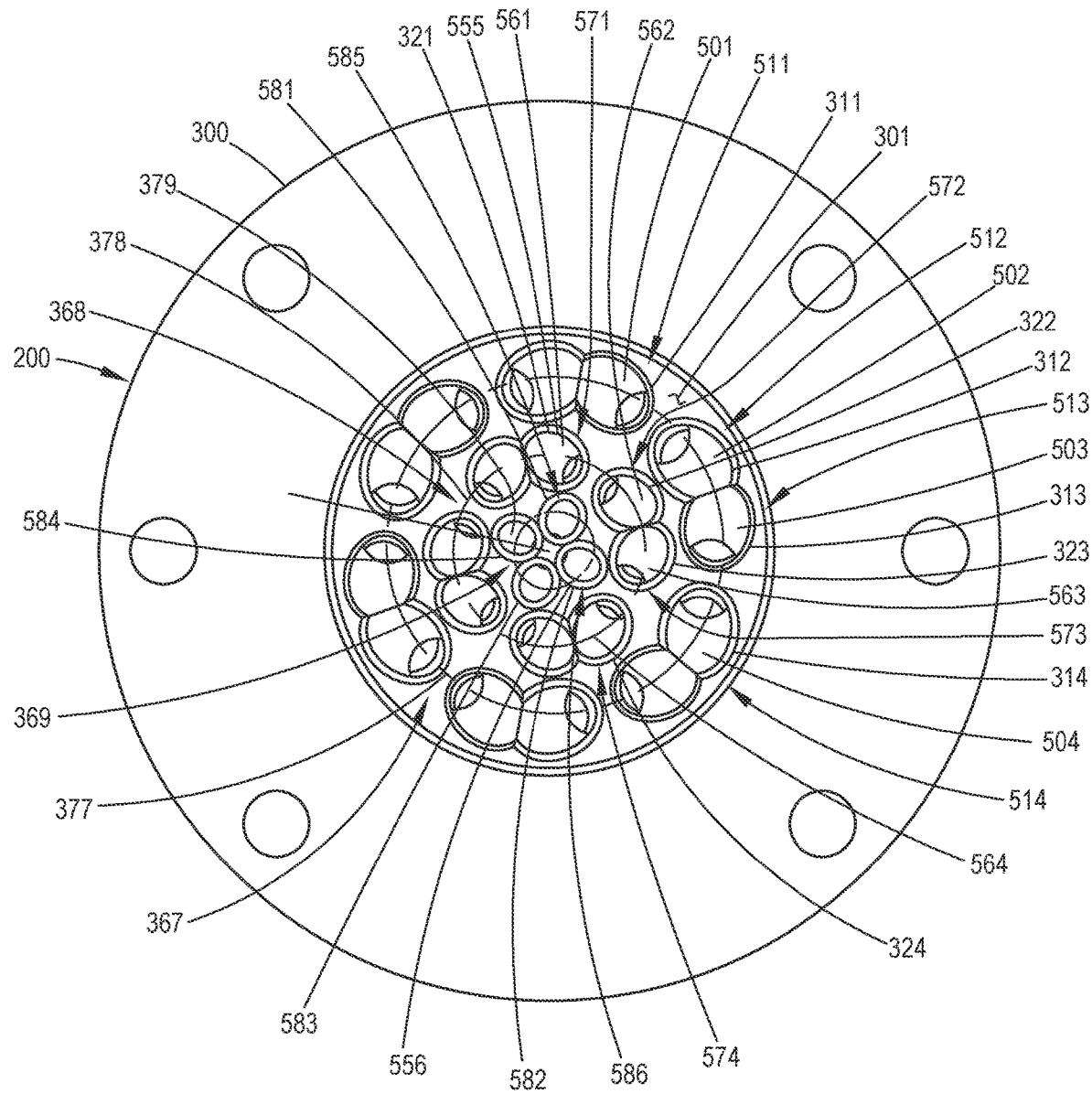
FIG. 3 is a schematic illustration of an inlet side of the fluid-flow-modification plate of the extruder of FIG. 2A, according to one or more examples of the subject matter, disclosed herein.
Figure 4:
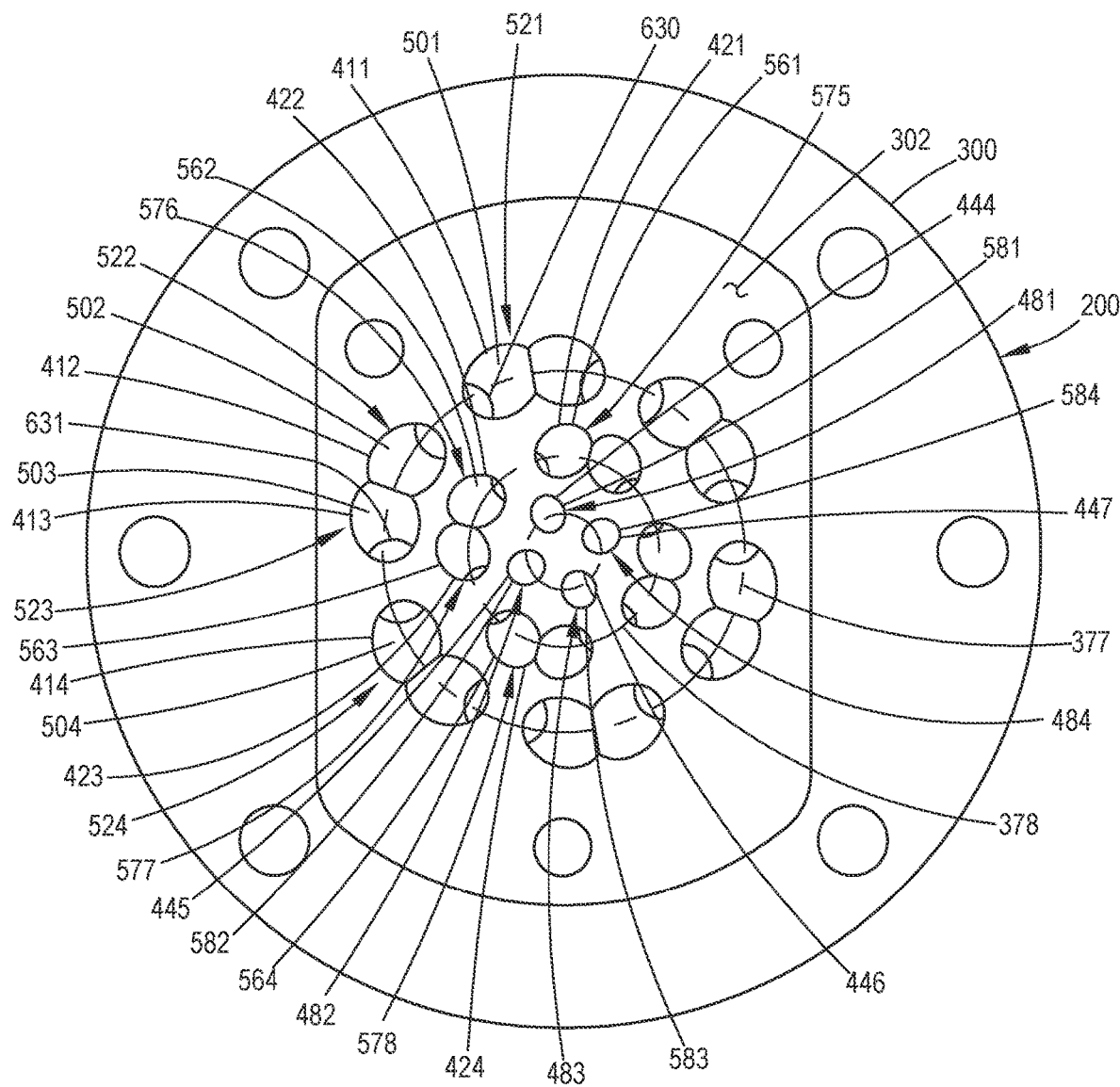
FIG. 4 is a schematic illustration of an outlet side of the fluid-flow-modification plate of the extruder of FIG. 2A, according to one or more examples of the subject matter, disclosed herein.

Referring generally to FIGS. 1A-1, 1A-2, 1B-1, 1B-2, 1C-1, 1C-2, and 2 and particularly to, e.g., FIGS. 3, 7B, and 7D for illustrative purposes only and not by way of limitation, at least one of first-passage inlet opening 511, second-passage inlet opening 512, third-passage inlet opening 513, and fourth-passage inlet opening 514 is chamfered. The preceding portion of this paragraph characterizes example 17 of the subject matter, disclosed herein, where example 17 also encompasses any one of examples 1 to 16, above.

At least one of first-passage inlet opening 511, second-passage inlet opening 512, third-passage inlet opening 513, and fourth-passage inlet opening 514 being chamfered decreases a surface area of inlet-side surface 301. Decreasing the surface area of inlet-side surface 301 allows highly filled composite material 211 to enter fluid-flow-modification plate 200 with decreased fluid-flow stagnation.

In the examples shown in FIGS. 7B and 7D, first-passage inlet opening 511 has chamfer 781, second-passage inlet opening 512 has chamfer 782, third-passage inlet opening 513 has chamfer 783, and fourth-passage inlet opening 514 has chamfer 784. In one or more other examples, one or more of first-passage inlet opening 511, second-passage inlet opening 512, third-passage inlet opening 513, and fourth-passage inlet opening 514 are not chamfered.

Referring generally to FIGS. 1A-1, 1A-2, 1B-1, 1B-2, 1C-1, 1C-2, and 2 and particularly to, e.g., FIGS. 7B and 7D for illustrative purposes only and not by way of limitation, at least one of first-passage outlet opening 521, second-passage outlet opening 522, third-passage outlet opening 523, and fourth-passage outlet opening 524 is chamfered. The preceding portion of this paragraph characterizes example 18 of the subject matter, disclosed herein, where example 18 also encompasses any one of examples 1 to 17, above.

In one or more examples, at least one of first-passage outlet opening 521, second-passage outlet opening 522, third-passage outlet opening 523, and fourth-passage outlet opening 524 being chamfered increases a size of an outlet area of the at least one of first-passage outlet opening 521, second-passage outlet opening 522, third-passage outlet opening 523, and fourth-passage outlet opening 524, facilitating changes in fluid-flow directions and mixing of respective fluid-flow streams from first passage 501, second passage 502, third passage 503, and fourth passage 504.

In the examples shown in FIGS. 7B and 7D, first-passage outlet opening 521 has chamfer 791, second-passage outlet opening 522 has chamfer 792, third-passage outlet opening 523 has chamfer 793, and fourth-passage outlet opening 524 has chamfer 794. In one or more other examples, one or more of first-passage outlet opening 521, second-passage outlet opening 522, third-passage outlet opening 523, and fourth-passage outlet opening 524 are not chamfered.

Figure 6:
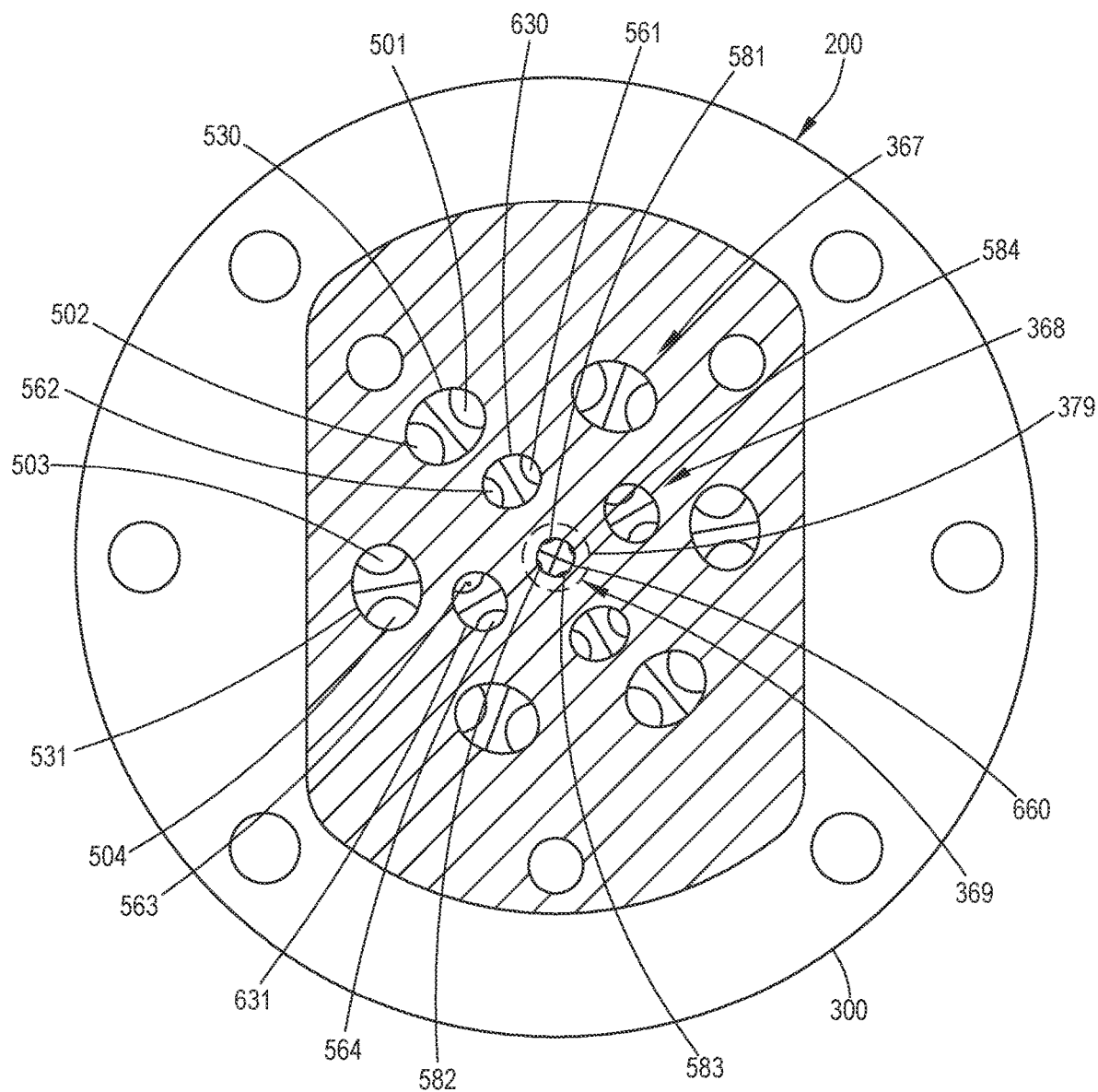
FIG. 6 is a schematic sectional view, taken along section 6-6 of the fluid-flow-modification plate of the extruder of FIG. 2A, according to one or more examples of the subject matter, disclosed herein.

Referring generally to FIGS. 1A-1, 1A-2, 1B-1, 1B-2, 1C-1, 1C-2, and 2 and particularly to, e.g., FIGS. 3 and 6 for illustrative purposes only and not by way of limitation, first-passage inlet opening 511, second-passage inlet opening 512, third-passage inlet opening 513, and fourth-passage inlet opening 514 are collectively arranged in circumferentially closed formation 367. The preceding portion of this paragraph characterizes example 19 of the subject matter, disclosed herein, where example 19 also encompasses any one of examples 1 to 18, above.

Arranging first-passage inlet opening 511, second-passage inlet opening 512, third-passage inlet opening 513, and fourth-passage inlet opening 514 in circumferentially closed formation 367 provides for ease of manufacture of fluid-flow-modification plate 200. Arranging first-passage inlet opening 511, second-passage inlet opening 512, third-passage inlet opening 513, and fourth-passage inlet opening 514 in circumferentially closed formation 367 also decreases the surface area of inlet-side surface 301.

Circumferentially closed formation 367 is illustrated in FIGS. 3 and 6 as being circular for exemplary purposes only. In one or more other examples, circumferentially closed formation 367 is circular, oval, elliptical, polygonal, irregular, or of any other suitable shape.

Referring generally to FIGS. 1A-1, 1A-2, 1B-1, 1B-2, 1C-1, 1C-2, and 2 and particularly to, e.g., FIGS. 3, 4, 9, 10A, 10B, 10C, and 10D for illustrative purposes only and not by way of limitation, fluid-flow-modification plate 200 further comprises fifth passage 561, sixth passage 562, seventh passage 563, and eighth passage 564. Fifth passage 561 extends between inlet-side surface 301 and outlet-side surface 302 and comprises fifth-passage inlet opening 571 and fifth-passage outlet opening 575. Fifth-passage inlet opening 571 has fifth-passage-inlet-opening perimeter boundary 321, defined in inlet-side surface 301 of monolithic body 300. Fifth-passage outlet opening 575 has fifth-passage-outlet-opening perimeter boundary 421, defined in outlet-side surface 302 of monolithic body 300. Sixth passage 562 extends between inlet-side surface 301 and outlet-side surface 302 and comprises sixth-passage inlet opening 572 and sixth-passage outlet opening 576. Sixth-passage inlet opening 572 has sixth-passage-inlet-opening perimeter boundary 322, defined in inlet-side surface 301 of monolithic body 300. Sixth-passage outlet opening 576 has sixth-passage-outlet-opening perimeter boundary 422, defined in outlet-side surface 302 of monolithic body 300. Seventh passage 563 extends between inlet-side surface 301 and outlet-side surface 302 and comprises seventh-passage inlet opening 573 and seventh-passage outlet opening 577. Seventh-passage inlet opening 573 has seventh-passage-inlet-opening perimeter boundary 323, defined in inlet-side surface 301 of monolithic body 300. Seventh-passage outlet opening 577 has seventh-passage-outlet-opening perimeter boundary 423, defined in outlet-side surface 302 of monolithic body 300. Eighth passage 564 extends between inlet-side surface 301 and outlet-side surface 302 and comprises eighth-passage inlet opening 574 and eighth-passage outlet opening 578. Eighth-passage inlet opening 574 has eighth-passage-inlet-opening perimeter boundary 324, defined in inlet-side surface 301 of monolithic body 300. Eighth-passage outlet opening 578 has eighth-passage-outlet-opening perimeter boundary 424, defined in outlet-side surface 302 of monolithic body 300. Fifth passage 561 and sixth passage 562 intersect each other at third intersection boundary 630. Seventh passage 563 and eighth passage 564 intersect each other at fourth intersection boundary 631. Fifth passage 561 and seventh passage 563 do not intersect each other. Sixth passage 562 and eighth passage 564 do not intersect each other. Fifth-passage-inlet-opening perimeter boundary 321 has only two points 1000, 1001 of intersection with eighth-passage-inlet-opening perimeter boundary 324. Fifth-passage inlet opening 571 and sixth-passage inlet opening 572 are separated from each other at least by a portion of inlet-side surface 301. Fifth-passage inlet opening 571 and seventh-passage inlet opening 573 are separated from each other at least by a portion of inlet-side surface 301. Sixth-passage inlet opening 572 and seventh-passage inlet opening 573 are separated from each other at least by a portion of inlet-side surface 301. Seventh-passage inlet opening 573 and eighth-passage inlet opening 574 are separated from each other at least by a portion of inlet-side surface 301. Sixth-passage-outlet-opening perimeter boundary 422 has only two points 1002, 1003 of intersection with seventh-passage-outlet-opening perimeter boundary 423. Fifth-passage outlet opening 575 and sixth-passage outlet opening 576 are separated from each other at least by a portion of outlet-side surface 302. Fifth-passage outlet opening 575 and seventh-passage outlet opening 577 are separated from each other at least by a portion of outlet-side surface 302. Fifth-passage outlet opening 575 and eighth-passage outlet opening 578 are separated from each other at least by a portion of outlet-side surface 302. Seventh-passage outlet opening 577 and eighth-passage outlet opening 578 are separated from each other at least by a portion of outlet-side surface 302. The preceding portion of this paragraph characterizes example 20 of the subject matter, disclosed herein, where example 20 also encompasses example 19, above.

The arrangement of fifth passage 561, sixth passage 562, seventh passage 563, and eighth passage 564 of fluid-flow-modification plate randomizes orientations of reinforcing fibers 212 of highly filled composite material 211 during extrusion to produce an isotropic material.

At least fifth passage 561, sixth passage 562, seventh passage 563, and eighth passage 564 are angled relative to one another and fluid-flow direction 298 of highly filled composite material 211 through extruder 299 in a manner similar to that described herein with respect to first passage 501 through fourth passage 504. At least fifth passage 561, sixth passage 562, seventh passage 563, and eighth passage 564 are, in one or more examples, angled relative to each other and fluid-flow direction 298, where highly filled composite material 211 exits each of first passage 501, second passage 502, third passage 503, and fourth passage 504 as a respective fluid-flow stream that is intertwined and mixed with other fluid-flow streams from first passage 501, second passage 502, third passage 503, and fourth passage 504. The intertwining and mixing of the respective fluid-flow streams randomizes orientations of reinforcing fibers 212 in highly filled composite material 211 as highly filled composite material 211 exits nozzle 202. In one or more examples, the randomized orientation of reinforcing fibers 212 results in reinforcing fibers 212 extending at various angles relative to each other and fluid-flow direction 298 as illustrated in FIG. 2A, thereby producing an isotropic material.

In one or more examples, fifth passage 561, sixth passage 562, seventh passage 563, and eighth passage 564 have smooth surfaces so that a laminar flow of highly filled composite material 211 passes through a respective one of fifth passage 561, sixth passage 562, seventh passage 563, and eighth passage 564. In one or more other examples, fifth passage 561, sixth passage 562, seventh passage 563, and eighth passage 564 have textured surfaces that induce turbulence in the flow of highly filled composite material 211 passes through a respective one of fifth passage 561, sixth passage 562, seventh passage 563, and eighth passage 564. In one or more examples, turbulent flow within fifth passage 561, sixth passage 562, seventh passage 563, and eighth passage 564 causes further randomization of orientations of reinforcing fibers 212 of highly filled composite material 211 during extrusion so as to produce the isotropic material.

In one or more examples, the intersection between fifth passage 561 and sixth passage 562 is a single-branch curve, a two-branch curve, or a curve of the fourth order, as described herein with respect to FIGS. 8A-8C. In one or more examples, the intersection between seventh passage 563 and eighth passage 564 is a single-branch curve, a two-branch curve, or a curve of the fourth order.

Referring generally to FIGS. 1A-1, 1A-2, 1B-1, 1B-2, 1C-1, 1C-2, and 2 and particularly to, e.g., FIGS. 3 and 6 for illustrative purposes only and not by way of limitation, fifth-passage inlet opening 571, sixth-passage inlet opening 572, seventh-passage inlet opening 573, and eighth-passage inlet opening 574 are arranged in second circumferentially closed formation 368 that is circumscribed by circumferentially closed formation 367. The preceding portion of this paragraph characterizes example 21 of the subject matter, disclosed herein, where example 21 also encompasses example 20, above.

Arranging fifth-passage inlet opening 571, sixth-passage inlet opening 572, seventh-passage inlet opening 573, and eighth-passage inlet opening 574 are arranged in second circumferentially closed formation 368 provides for ease of manufacture of fluid-flow-modification plate 200. Arranging first-passage inlet opening 511, second-passage inlet opening 512, third-passage inlet opening 513, and fourth-passage inlet opening 514 in circumferentially closed formation 367 also decreases the surface area of inlet-side surface 301. In one or more examples, second circumferentially closed formation 368 being circumscribed by circumferentially closed formation 367 also decreases the surface area of inlet-side surface 301.

Second circumferentially closed formation 368 is illustrated in FIGS. 3 and 6 as being circular for exemplary purposes only. In one or more other examples, second circumferentially closed formation 368 is circular, oval, elliptical, polygonal, irregular, or of any other suitable shape.

Referring generally to FIGS. 1A-1, 1A-2, 1B-1, 1B-2, 1C-1, 1C-2, and 2 and particularly to, e.g., FIGS. 3 and 6 for illustrative purposes only and not by way of limitation, second circumferentially closed formation 368 is concentric with circumferentially closed formation 367. The preceding portion of this paragraph characterizes example 22 of the subject matter, disclosed herein, where example 22 also encompasses example 21, above.

Second circumferentially closed formation 368 being concentric with circumferentially closed formation 367 decreases the surface area of inlet-side surface 301.

Referring generally to FIGS. 1A-1, 1A-2, 1B-1, 1B-2, 1C-1, 1C-2, and 2 and particularly to, e.g., FIGS. 3, 4, 6, and 11A-11H for illustrative purposes only and not by way of limitation, fluid-flow-modification plate 200 further comprises ninth passage 581, tenth passage 582, eleventh passage 583, and twelfth passage 584. Ninth passage 581 extends between inlet-side surface 301 and outlet-side surface 302 and comprises ninth-passage inlet opening 585 and ninth-passage outlet opening 481. Ninth-passage inlet opening 585 has ninth-passage-inlet-opening perimeter boundary 555, defined in inlet-side surface 301 of monolithic body 300. Ninth-passage outlet opening 481 has ninth-passage-outlet-opening perimeter boundary 444, defined in outlet-side surface 302 of monolithic body 300. Tenth passage 582 extends between inlet-side surface 301 and outlet-side surface 302 and comprises tenth-passage inlet opening 586 and tenth-passage outlet opening 482. Tenth-passage inlet opening 586 has tenth-passage-inlet-opening perimeter boundary 556, defined in inlet-side surface 301 of monolithic body 300. Tenth-passage outlet opening 482 has tenth-passage-outlet-opening perimeter boundary 445, defined in outlet-side surface 302 of monolithic body 300. Eleventh passage 583 extends between inlet-side surface 301 and outlet-side surface 302 and comprises eleventh-passage inlet opening 587 and eleventh-passage outlet opening 483. Eleventh-passage inlet opening 587 has eleventh-passage-inlet-opening perimeter boundary 557, defined in inlet-side surface 301 of monolithic body 300. Eleventh-passage outlet opening 483 has eleventh-passage-outlet-opening perimeter boundary 446, defined in outlet-side surface 302 of monolithic body 300. Twelfth passage 584 extends between inlet-side surface 301 and outlet-side surface 302 and comprises twelfth-passage inlet opening 588 and twelfth-passage outlet opening 484. Twelfth-passage inlet opening 588 has twelfth-passage-inlet-opening perimeter boundary 558, defined in inlet-side surface 301 of monolithic body 300. Twelfth-passage outlet opening 484 has twelfth-passage-outlet-opening perimeter boundary 447, defined in outlet-side surface 302 of monolithic body 300. Ninth passage 581, tenth passage 582, eleventh passage 583, and twelfth passage 584 intersect each other at fifth intersection boundary 660. The preceding portion of this paragraph characterizes example 23 of the subject matter, disclosed herein, where example 23 also encompasses example 21 or 22, above.

The arrangement of ninth passage 581, tenth passage 582, eleventh passage 583, and twelfth passage 584 of fluid-flow-modification plate randomizes orientations of reinforcing fibers 212 of highly filled composite material 211 during extrusion to produce an isotropic material.

At least ninth passage 581, tenth passage 582, eleventh passage 583, and twelfth passage 584 are angled relative to one another and fluid-flow direction 298 of highly filled composite material 211 through extruder 299 in a manner similar to that described herein with respect to first passage 501 through fourth passage 504. At least ninth passage 581, tenth passage 582, eleventh passage 583, and twelfth passage 584, in one or more examples, are angled relative to each other and fluid-flow direction 298, where highly filled composite material 211 exits each of ninth passage 581, tenth passage 582, eleventh passage 583, and twelfth passage 584 as a respective fluid-flow stream that is intertwined and mixed with other fluid-flow streams from ninth passage 581, tenth passage 582, eleventh passage 583, and twelfth passage 584. The intertwining and mixing of the respective fluid-flow streams randomizes orientations of reinforcing fibers 212 in highly filled composite material 211 as highly filled composite material 211 exits nozzle 202. In one or more examples, the randomized orientation of reinforcing fibers 212 results in reinforcing fibers 212 extending at various angles relative to each other and fluid-flow direction 298 as illustrated in FIG. 2A, thereby producing an isotropic material.

In one or more examples, ninth passage 581, tenth passage 582, eleventh passage 583, and twelfth passage 584 have smooth surfaces so that a laminar flow of highly filled composite material 211 passes through a respective one of ninth passage 581, tenth passage 582, eleventh passage 583, and twelfth passage 584. In one or more other examples, ninth passage 581, tenth passage 582, eleventh passage 583, and twelfth passage 584 have textured surfaces that induce turbulence in the flow of highly filled composite material 211 passes through a respective one of ninth passage 581, tenth passage 582, eleventh passage 583, and twelfth passage 584. Turbulent flow within ninth passage 581, tenth passage 582, eleventh passage 583, and twelfth passage 584, in one or more examples, causes further randomization of orientations of reinforcing fibers 212 of highly filled composite material 211 during extrusion to produce the isotropic material.

In one or more examples, the intersection between ninth passage 581, tenth passage 582, eleventh passage 583, and twelfth passage 584 includes one or more of a single-branch curve, a two-branch curve, or a curve of the fourth order as described herein with respect to FIGS. 8A-8C.

Referring generally to FIGS. 1A-1, 1A-2, 1B-1, 1B-2, 1C-1, 1C-2, and 2 and particularly to, e.g., FIGS. 11A, 11B, 11E, and 11F for illustrative purposes only and not by way of limitation, any one of ninth-passage-inlet-opening perimeter boundary 555, tenth-passage-inlet-opening perimeter boundary 556, eleventh-passage-inlet-opening perimeter boundary 557, and twelfth-passage-inlet-opening perimeter boundary 558 has no contact point with any other one of ninth-passage-inlet-opening perimeter boundary 555, tenth-passage-inlet-opening perimeter boundary 556, eleventh-passage-inlet-opening perimeter boundary 557, and twelfth-passage-inlet-opening perimeter boundary 558. The preceding portion of this paragraph characterizes example 24 of the subject matter, disclosed herein, where example 24 also encompasses example 23, above.

Any one of ninth-passage-inlet-opening perimeter boundary 555, tenth-passage-inlet-opening perimeter boundary 556, eleventh-passage-inlet-opening perimeter boundary 557, and twelfth-passage-inlet-opening perimeter boundary 558 not having contact points with any other one of ninth-passage-inlet-opening perimeter boundary 555, tenth-passage-inlet-opening perimeter boundary 556, eleventh-passage-inlet-opening perimeter boundary 557, and twelfth-passage-inlet-opening perimeter boundary 558 spaces ninth-passage-inlet-opening perimeter boundary 555, tenth-passage-inlet-opening perimeter boundary 556, eleventh-passage-inlet-opening perimeter boundary 557, and twelfth-passage-inlet-opening perimeter boundary 558 away from each other to create stagnation in fluid flow to turbulently mix highly filled composite material 211 prior to entering ninth passage 581, tenth passage 582, eleventh passage 583, and twelfth passage 584.

Referring also to FIGS. 3, 11C, 11D, 11G, and 11H, in other examples ninth-passage-inlet-opening perimeter boundary 555 has single-point contact with each of tenth-passage-inlet-opening perimeter boundary 556 and twelfth-passage-inlet-opening perimeter boundary 558. Twelfth-passage-inlet-opening perimeter boundary 558 has single-point contact with each of ninth-passage-inlet-opening perimeter boundary 555 and eleventh-passage-inlet-opening perimeter boundary 557. Eleventh-passage-inlet-opening perimeter boundary 557 has single-point contact with each of twelfth-passage-inlet-opening perimeter boundary 558 and tenth-passage-inlet-opening perimeter boundary 556. Tenth-passage-inlet-opening perimeter boundary 556 has single-point contact with each of eleventh-passage-inlet-opening perimeter boundary 557 and ninth-passage-inlet-opening perimeter boundary 555. In one or more examples, this single-point-contact arrangement of ninth-passage-inlet-opening perimeter boundary 555 with each of tenth-passage-inlet-opening perimeter boundary 556 and twelfth-passage-inlet-opening perimeter boundary 558 decreases the surface area of outlet-side surface 302 to reduce stagnation of highly filled composite material 211 prior to entering ninth passage 581, tenth passage 582, eleventh passage 583, and twelfth passage 584, compared to examples shown in FIGS. 11A, 11B, 11E, and 11F.

Referring generally to FIGS. 1A-1, 1A-2, 1B-1, 1B-2, 1C-1, 1C-2, and 2 and particularly to, e.g., FIGS. 11A, 11B, 11E, and 11F for illustrative purposes only and not by way of limitation, any one of ninth-passage-outlet-opening perimeter boundary 444, tenth-passage-outlet-opening perimeter boundary 445, eleventh-passage-outlet-opening perimeter boundary 446, and twelfth-passage-outlet-opening perimeter boundary 447 has no contact point with any other one of ninth-passage-outlet-opening perimeter boundary 444, tenth-passage-outlet-opening perimeter boundary 445, eleventh-passage-outlet-opening perimeter boundary 446, and twelfth-passage-outlet-opening perimeter boundary 447. The preceding portion of this paragraph characterizes example 25 of the subject matter, disclosed herein, where example 25 also encompasses example 23 or 24, above.

Any one of ninth-passage-outlet-opening perimeter boundary 444, tenth-passage-outlet-opening perimeter boundary 445, eleventh-passage-outlet-opening perimeter boundary 446, and twelfth-passage-outlet-opening perimeter boundary 447 not having contact points with any other one of ninth-passage-outlet-opening perimeter boundary 444, tenth-passage-outlet-opening perimeter boundary 445, eleventh-passage-outlet-opening perimeter boundary 446, and twelfth-passage-outlet-opening perimeter boundary 447 spaces ninth-passage-outlet-opening perimeter boundary 444, tenth-passage-outlet-opening perimeter boundary 445, eleventh-passage-outlet-opening perimeter boundary 446, and twelfth-passage-outlet-opening perimeter boundary 447 away from each other to create turbulent mixing of respective fluid-flow streams from ninth passage 581, tenth passage 582, eleventh passage 583, and twelfth passage 584.

Referring also to FIGS. 3, 11C, 11D, 11G, and 11H, in other examples ninth-passage-outlet-opening perimeter boundary 444 has single-point contact with each of tenth-passage-outlet-opening perimeter boundary 445 and twelfth-passage-outlet-opening perimeter boundary 447. Twelfth-passage-outlet-opening perimeter boundary 447 has single-point contact with each of ninth-passage-outlet-opening perimeter boundary 444 and eleventh-passage-outlet-opening perimeter boundary 446. Eleventh-passage-outlet-opening perimeter boundary 446 has single-point contact with each of twelfth-passage-outlet-opening perimeter boundary 447 and tenth-passage-outlet-opening perimeter boundary 445. Tenth-passage-outlet-opening perimeter boundary 445 has a single-point contact with each of eleventh-passage-outlet-opening perimeter boundary 446 and ninth-passage-outlet-opening perimeter boundary 444. In one or more examples, this single-point-contact arrangement of ninth-passage-outlet-opening perimeter boundary 444, tenth-passage-outlet-opening perimeter boundary 445, eleventh-passage-outlet-opening perimeter boundary 446, and twelfth-passage-outlet-opening perimeter boundary 447 decreases the surface area of outlet-side surface 302 to effect a higher density intertwining and mixing of respective fluid-flow streams from ninth passage 581, tenth passage 582, eleventh passage 583, and twelfth passage 584 compared to FIGS. 11A, 11B, 11E, and 11F.

Referring generally to FIGS. 1A-1, 1A-2, 1B-1, 1B-2, 1C-1, 1C-2, and 2 and particularly to, e.g., FIGS. 3 and 6 for illustrative purposes only and not by way of limitation, any one of ninth-passage inlet opening 585, tenth-passage inlet opening 586, eleventh-passage inlet opening 587, and twelfth-passage inlet opening 588 is arranged in third circumferentially closed formation 369 that is circumscribed by circumferentially closed formation 367 and second circumferentially closed formation 368. The preceding portion of this paragraph characterizes example 26 of the subject matter, disclosed herein, where example 26 also encompasses any one of examples 23 to 25, above.

Arranging ninth-passage inlet opening 585, tenth-passage inlet opening 586, eleventh-passage inlet opening 587, and twelfth-passage inlet opening 588 in third circumferentially closed formation 369 provides for ease of manufacture of fluid-flow-modification plate 200. Arranging ninth-passage inlet opening 585, tenth-passage inlet opening 586, eleventh-passage inlet opening 587, and twelfth-passage inlet opening 588 also decreases the surface area of inlet-side surface 301. In one or more examples, third circumferentially closed formation 369 being circumscribed by circumferentially closed formation 367 and second circumferentially closed formation 368 also decreases the surface area of inlet-side surface 301.

Third circumferentially closed formation 369 is illustrated in FIGS. 3 and 6 as being circular for exemplary purposes only. In one or more other examples, third circumferentially closed formation 369 is circular, oval, elliptical, polygonal, irregular, or of any other suitable shape.

Referring generally to FIGS. 1A-1, 1A-2, 1B-1, 1B-2, 1C-1, 1C-2, and 2 and particularly to, e.g., FIGS. 3 and 6 for illustrative purposes only and not by way of limitation, third circumferentially closed formation 369 is concentric with circumferentially closed formation 367 and second circumferentially closed formation 368. The preceding portion of this paragraph characterizes example 27 of the subject matter, disclosed herein, where example 27 also encompasses example 26, above.

Third circumferentially closed formation 369 being concentric with circumferentially closed formation 367 and second circumferentially closed formation 368 decreases the surface area of inlet-side surface 301.

Referring generally to FIGS. 1A-1, 1A-2, 1B-1, 1B-2, 1C-1, 1C-2, and 2 and particularly to, e.g., FIGS. 3 and 6 for illustrative purposes only and not by way of limitation, fifth intersection boundary 660 is centered about an axis that extends through a center of third circumferentially closed formation. The preceding portion of this paragraph characterizes example 28 of the subject matter, disclosed herein, where example 28 also encompasses example 26 or 27, above.

Fifth intersection boundary 660 being centered about an axis that extends through a center of third circumferentially closed formation reduces fluid-flow stagnation in a central region of fluid-flow-modification plate 200.

Referring generally to FIGS. 1A-1, 1A-2, 1B-1, 1B-2, 1C-1, 1C-2, and 2 and particularly to, e.g., FIGS. 11A-11D for illustrative purposes only and not by way of limitation, ninth passage 581 has ninth-passage centerline 1191, and ninth-passage centerline 1191 is a straight line. The preceding portion of this paragraph characterizes example 29 of the subject matter, disclosed herein, where example 29 also encompasses any one of examples 23 to 28, above.

Ninth-passage centerline 1191 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 11A-11D for illustrative purposes only and not by way of limitation, tenth passage 582 has tenth-passage centerline 1192, and tenth-passage centerline 1192 is a straight line. The preceding portion of this paragraph characterizes example 30 of the subject matter, disclosed herein, where example 30 also encompasses any one of examples 23 to 29, above.

Tenth-passage centerline 1192 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 11A-11D for illustrative purposes only and not by way of limitation, eleventh passage 583 has eleventh-passage centerline 1193, and eleventh-passage centerline 1193 is a straight line. The preceding portion of this paragraph characterizes example 31 of the subject matter, disclosed herein, where example 31 also encompasses any one of examples 23 to 30, above.

Eleventh-passage centerline 1193 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 11A-11D for illustrative purposes only and not by way of limitation, twelfth passage 584 has twelfth-passage centerline 1194, and twelfth-passage centerline 1194 is a straight line. The preceding portion of this paragraph characterizes example 32 of the subject matter, disclosed herein, where example 32 also encompasses any one of examples 23 to 31, above.

Twelfth-passage centerline 1194 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, ninth passage 581 has ninth-passage centerline 1191, and ninth-passage centerline 1191 is a curved line. The preceding portion of this paragraph characterizes example 33 of the subject matter, disclosed herein, where example 33 also encompasses any one of examples 23 to 28, above.

In one or more examples, ninth-passage centerline 1191 being a curved line increases an exit angle $\ell$ of highly filled composite material 211 (see FIG. 2A) exiting ninth passage 581 relative to fluid-flow direction 298. For example, the more ninth-passage centerline 1191 is curved, the larger is exit angle $\ell$. Increased exit angle $\ell$ causes intertwining and mixing of the respective fluid-flow streams from ninth passage 581, tenth passage 582, eleventh passage 583, and twelfth passage 584 and randomizes orientations of reinforcing fibers 212 in highly filled composite material 211 as highly filled composite material 211 exits nozzle 202 (see FIG. 2A). In one or more examples, ninth-passage centerline 1191 being a curved line also provides for ninth passage 581 having an inlet that is substantially parallel with fluid-flow direction 298, while providing exit angle $\ell$.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, ninth-passage centerline 1191 has no inflection points. The preceding portion of this paragraph characterizes example 34 of the subject matter, disclosed herein, where example 34 also encompasses example 33, above.

In one or more examples, ninth-passage centerline 1191 having no inflection points substantially prevents fluid-flow stagnation through ninth passage 581.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, tenth passage 582 has tenth-passage centerline 1192, and tenth-passage centerline 1192 is a curved line. The preceding portion of this paragraph characterizes example 35 of the subject matter, disclosed herein, where example 35 also encompasses any one of examples 23 to 28, 33, and 34, above.

In one or more examples, tenth-passage centerline 1192 being a curved line increases exit angle $\ell$ of highly filled composite material 211 (see FIG. 2A) exiting tenth passage 582 relative to fluid-flow direction 298. For example, the more tenth-passage centerline 1192 is curved, the larger is exit angle $\ell$. Increased exit angle $\ell$ causes intertwining and mixing of the respective fluid-flow streams from ninth passage 581, tenth passage 582, eleventh passage 583, and twelfth passage 584 and randomizes orientations of reinforcing fibers 212 in highly filled composite material 211 as highly filled composite material 211 exits nozzle 202 (see FIG. 2A). In one or more examples, tenth-passage centerline 1192 being a curved line also provides for tenth passage 582 having an inlet that is substantially parallel with fluid-flow direction 298, while providing exit angle $\ell$.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, tenth-passage centerline 1192 has no inflection points. The preceding portion of this paragraph characterizes example 36 of the subject matter, disclosed herein, where example 36 also encompasses example 35, above.

In one or more examples, tenth-passage centerline 1192 having no inflection points substantially prevents fluid-flow stagnation through tenth passage 582.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, eleventh passage 583 has eleventh-passage centerline 1193, and eleventh-passage centerline 1193 is a curved line. The preceding portion of this paragraph characterizes example 37 of the subject matter, disclosed herein, where example 37 also encompasses any one of examples 23 to 28 and 33 to 36, above.

In one or more examples, eleventh-passage centerline 1193 being a curved line increases exit angle $\ell$ of highly filled composite material 211 (see FIG. 2A), exiting eleventh passage 583 relative to fluid-flow direction 298. For instance, the more eleventh-passage centerline 1193 is curved, the larger is exit angle $\ell$. Increased exit angle $\ell$ causes intertwining and mixing of the respective fluid-flow streams from ninth passage 581, tenth passage 582, eleventh passage 583, and twelfth passage 584 and randomizes orientations of reinforcing fibers 212 in highly filled composite material 211 as highly filled composite material 211 exits nozzle 202 (see FIG. 2A). In one or more examples, eleventh-passage centerline 1193 being a curved line also provides for eleventh passage 583 having an inlet that is substantially parallel with fluid-flow direction 298, while providing exit angle $\ell$.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, eleventh-passage centerline 1193 has no inflection points. The preceding portion of this paragraph characterizes example 38 of the subject matter, disclosed herein, where example 38 also encompasses example 37, above.

In one or more examples, eleventh-passage centerline 1193 having no inflection points substantially prevents fluid-flow stagnation through eleventh passage 583.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, twelfth passage 584 has twelfth-passage centerline 1194, and twelfth-passage centerline 1194 is a curved line. The preceding portion of this paragraph characterizes example 39 of the subject matter, disclosed herein, where example 39 also encompasses any one of examples 23 to 28 and 33 to 38, above.

In one or more examples, twelfth-passage centerline 1194 being a curved line increases exit angle $\ell$ of highly filled composite material 211 (see FIG. 2A) exiting twelfth passage 584 relative to fluid-flow direction 298. For example, the more twelfth-passage centerline 1194 is curved, the larger is exit angle $\ell$. Increased exit angle $\ell$ causes intertwining and mixing of the respective fluid-flow streams from ninth passage 581, tenth passage 582, eleventh passage 583, and twelfth passage 584 and randomizes orientations of reinforcing fibers 212 in highly filled composite material 211 as highly filled composite material 211 exits nozzle 202 (see FIG. 2A). In one or more examples, twelfth-passage centerline 1194 being a curved line also provides for twelfth passage 584 having an inlet that is substantially parallel with fluid-flow direction 298, while providing exit angle $\ell$.

While exit angle $\ell$ is illustrated as being substantially the same for ninth passage 581, tenth passage 582, eleventh passage 583, and twelfth passage 584, in one or more examples, the exit angle for one or more of ninth passage 581, tenth passage 582, eleventh passage 583, and twelfth passage 584 is different than the exit angle of another of ninth passage 581, tenth passage 582, eleventh passage 583, and twelfth passage 584. In one or more examples, exit angle $\ell$ is about 30° to about 45°; however, in one or more other examples, exit angle $\ell$ is less than about 30° or more than about 45°.

In one or more examples, ninth-passage centerline 1191, tenth-passage centerline 1192, eleventh-passage centerline 1193, and twelfth-passage centerline 1194 are curved lines, and hence ninth passage 581, tenth passage 582, eleventh passage 583, and twelfth passage 584 are curved passages, formed using any suitable manufacturing technique, including, but not limited to additive manufacturing, lost wax casting, sand casting, etc.

Referring generally to FIGS. 1A-1, 1A-2, 1B-1, 1B-2, 1C-1, 1C-2, and 2 and particularly to, e.g., FIGS. 11E-11H for illustrative purposes only and not by way of limitation, twelfth-passage centerline 1194 has no inflection points. The preceding portion of this paragraph characterizes example 40 of the subject matter, disclosed herein, where example 40 also encompasses example 39, above.

In one or more examples, twelfth-passage centerline 1194 having no inflection points substantially prevents fluid-flow stagnation through twelfth passage 584.

Referring generally to FIGS. 1A-1, 1A-2, 1B-1, 1B-2, 1C-1, 1C-2, and 2 and particularly to, e.g., FIGS. 3, 11C, 11D, 11G, and 11H for illustrative purposes only and not by way of limitation, at least one of ninth-passage inlet opening 585, tenth-passage inlet opening 586, eleventh-passage inlet opening 587, and twelfth-passage inlet opening 588 is chamfered. The preceding portion of this paragraph characterizes example 41 of the subject matter, disclosed herein, where example 41 also encompasses any one of examples 23 to 40, above.

At least one of ninth-passage inlet opening 585, tenth-passage inlet opening 586, eleventh-passage inlet opening 587, and twelfth-passage inlet opening 588 being chamfered decreases a surface area of inlet-side surface 301. Decreasing the surface area of inlet-side surface 301 allows highly filled composite material 211 to enter fluid-flow-modification plate 200 with decreased fluid-flow stagnation.

In the example shown, ninth-passage inlet opening 585 has chamfer 1104, tenth-passage inlet opening 586 has chamfer 1108, eleventh-passage inlet opening 587 has chamfer 1107, and twelfth-passage inlet opening 588 has chamfer 1103. In one or more examples, one or more of ninth-passage inlet opening 585, tenth-passage inlet opening 586, eleventh-passage inlet opening 587, and twelfth-passage inlet opening 588 are not chamfered.

Referring generally to FIGS. 1A-1, 1A-2, 1B-1, 1B-2, 1C-1, 1C-2, and 2 and particularly to, e.g., FIGS. 11C, 11D, 11G, and 11H for illustrative purposes only and not by way of limitation, at least one of ninth-passage outlet opening 481, tenth-passage outlet opening 482, eleventh-passage outlet opening 483, and twelfth-passage outlet opening 484 is chamfered. The preceding portion of this paragraph characterizes example 42 of the subject matter, disclosed herein, where example 42 also encompasses any one of examples 23 to 41, above.

At least one of ninth-passage outlet opening 481, tenth-passage outlet opening 482, eleventh-passage outlet opening 483, and twelfth-passage outlet opening 484 being chamfered, in one or more examples, increases the size of an outlet area of at least one of ninth-passage outlet opening 481, tenth-passage outlet opening 482, eleventh-passage outlet opening 483, and twelfth-passage outlet opening 484, facilitating changes in fluid-flow directions and mixing of respective fluid-flow streams from ninth passage 581, tenth passage 582, eleventh passage 583, and twelfth passage 584.

In the example shown in FIGS. 11C, 11D, 11G, and 11H, ninth-passage outlet opening 481 has chamfer 1102, tenth-passage outlet opening 482 has chamfer 1106, eleventh-passage outlet opening 483 has chamfer 1105, and twelfth-passage outlet opening 484 has chamfer 1101. In one or more examples, one or more of ninth-passage outlet opening 481, tenth-passage outlet opening 482, eleventh-passage outlet opening 483, and twelfth-passage outlet opening 484 are not chamfered.

Referring generally to FIGS. 1A-1, 1A-2, 1B-1, 1B-2, 1C-1, 1C-2, and 2 and particularly to, e.g., FIGS. 3, 9, and 10A-10D for illustrative purposes only and not by way of limitation, a sum of a smallest cross-sectional area of fifth passage 561 and a smallest cross-sectional area of eighth passage 564 is greater than an area, circumscribed by fifth-passage-inlet-opening perimeter boundary 321 and eighth-passage-inlet-opening perimeter boundary 324. The preceding portion of this paragraph characterizes example 43 of the subject matter, disclosed herein, where example 43 also encompasses any one of examples 20 to 42, above.

The sum of a smallest cross-sectional area of fifth passage 561 and a smallest cross sectional area of eighth passage 564 being greater than the area, circumscribed by fifth-passage-inlet-opening perimeter boundary 321 and eighth-passage-inlet-opening perimeter boundary 324 decreases a surface area of inlet-side surface 301. Decreasing the surface area of inlet-side surface 301 allows highly filled composite material 211 to enter fluid-flow-modification plate 200 with decreased fluid-flow stagnation adjacent fifth-passage-inlet-opening perimeter boundary 321 and eighth-passage-inlet-opening perimeter boundary 324.

Referring generally to FIGS. 1A-1, 1A-2, 1B-1, 1B-2, 1C-1, 1C-2, and 2 and particularly to, e.g., FIGS. 3, 9, and 10A-10D for illustrative purposes only and not by way of limitation, the sum of the smallest cross-sectional area of fifth passage 561 and the smallest cross-sectional area of eighth passage 564 is no more than 50% greater than the area, circumscribed by fifth-passage-inlet-opening perimeter boundary 321 and eighth-passage-inlet-opening perimeter boundary 324. The preceding portion of this paragraph characterizes example 44 of the subject matter, disclosed herein, where example 44 also encompasses example 43, above.

The sum of the smallest cross-sectional area of fifth passage 561 and the smallest cross sectional area of eighth passage 564 being no more than 50% greater than the area, circumscribed by fifth-passage-inlet-opening perimeter boundary 321 and eighth-passage-inlet-opening perimeter boundary 324 prevents over-restriction of highly filled composite material 211 into fifth passage 561 and eighth passage 564.

Figure 9:
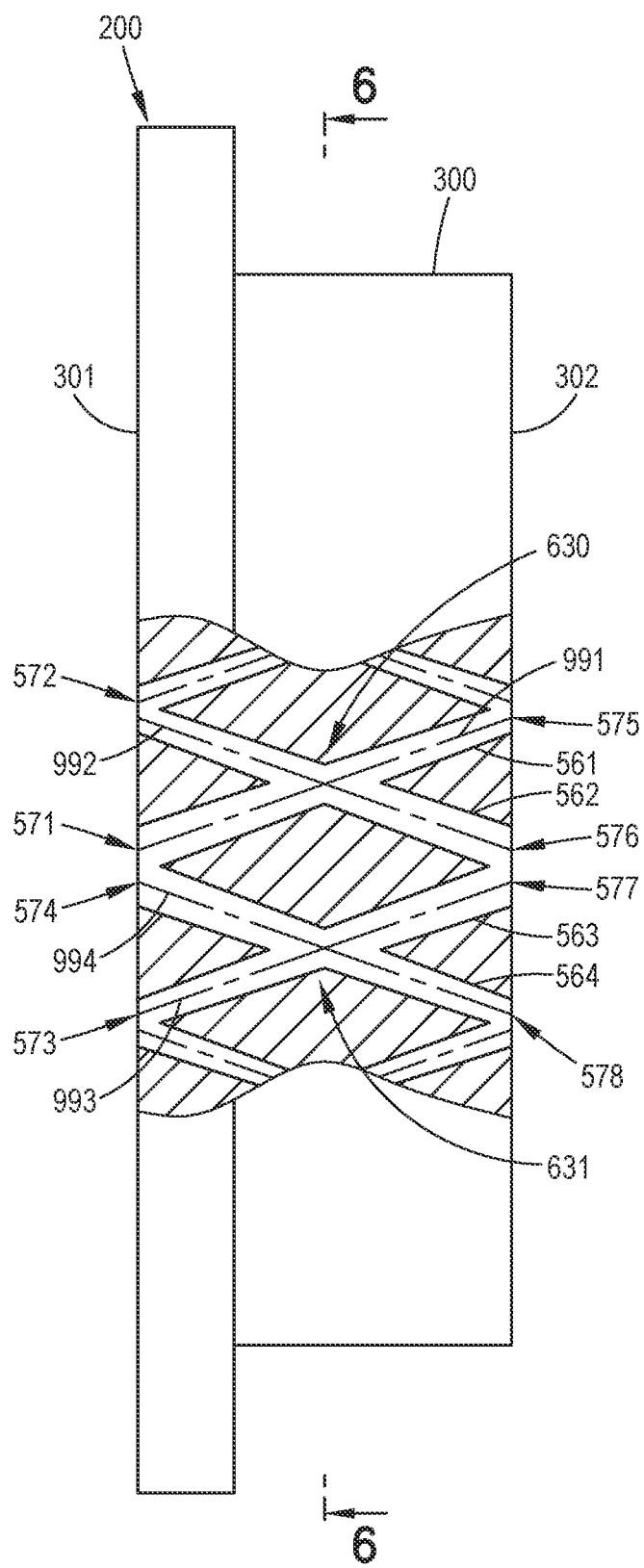
FIG. 9 is a schematic side view, illustrating a partial cross-section of the fluid-flow-modification plate of the extruder of FIG. 2A, taken along circle 378 in FIG. 3, according to one or more examples of the subject matter, disclosed herein.
Figure 10A:
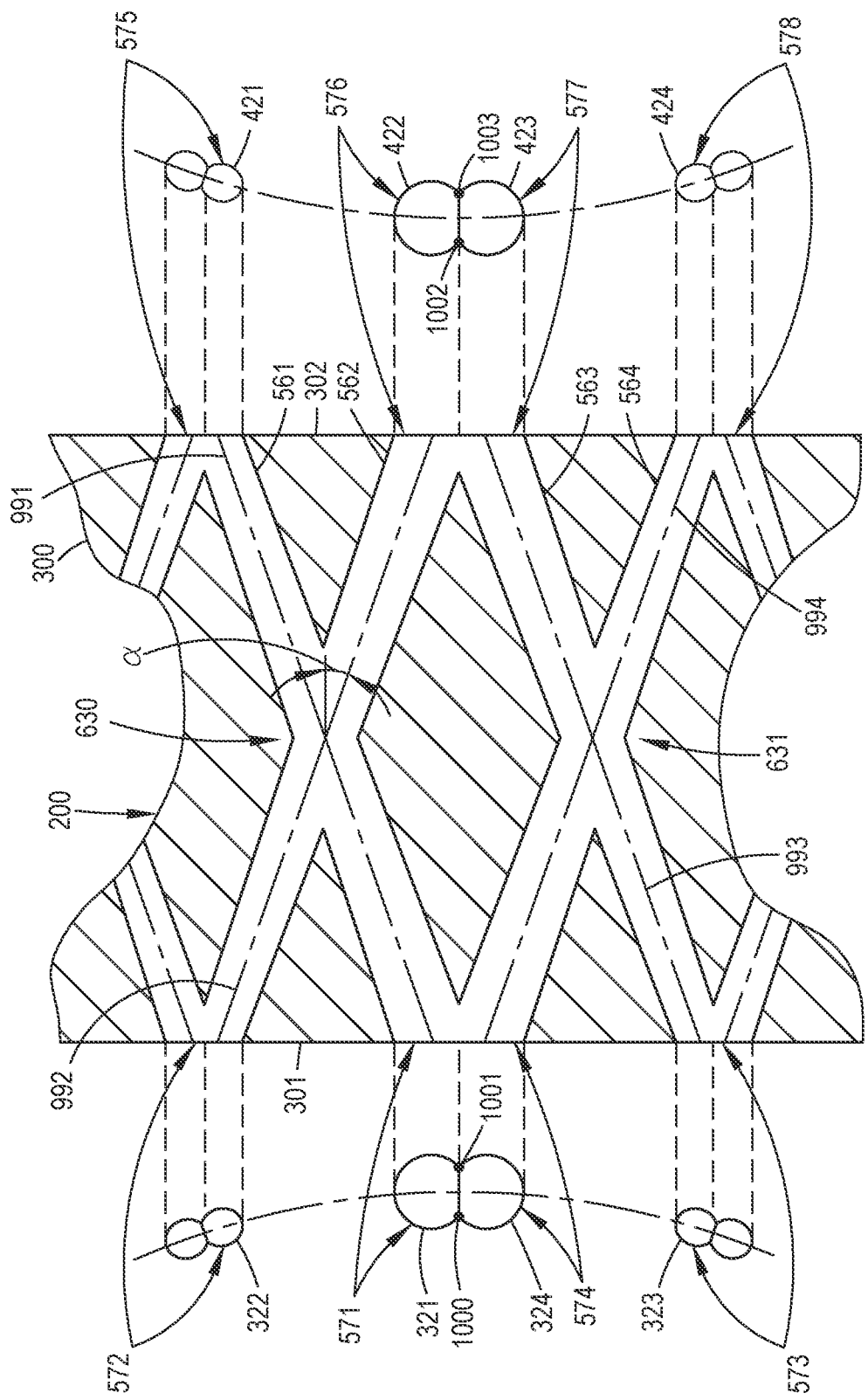
FIG. 10A is a schematic, sectional side-view illustration of the fluid-flow-modification plate of the extruder of FIG. 2A, taken along circle 378 in FIG. 3, according to one or more examples of the subject matter, disclosed herein.
Figure 10B:
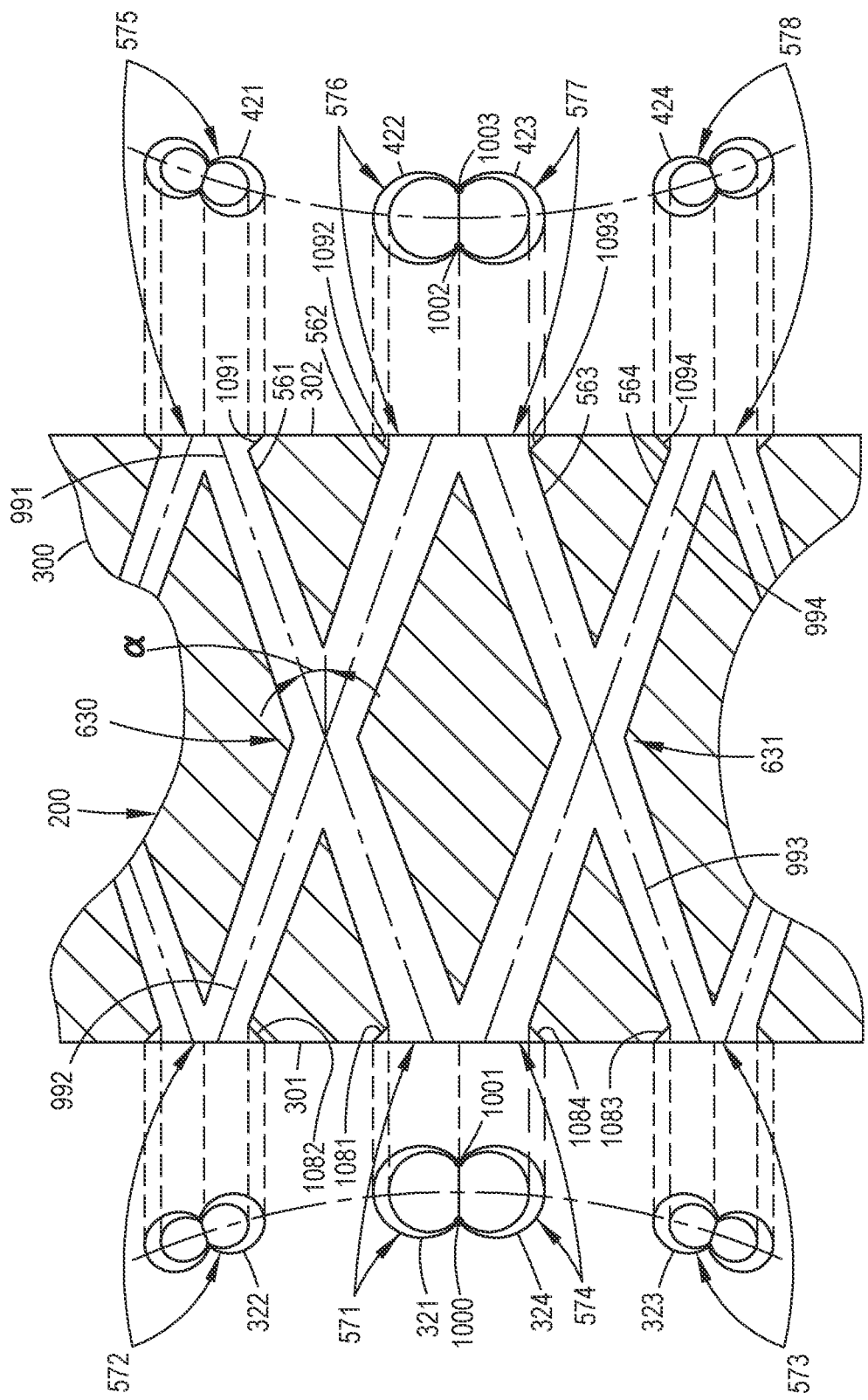
FIG. 10B is a schematic, sectional side-view illustration of the fluid-flow-modification plate of the extruder of FIG. 2A, taken along circle 378 in FIG. 3, according to one or more examples of the subject matter, disclosed herein.

Referring generally to FIGS. 1A-1, 1A-2, 1B-1, 1B-2, 1C-1, 1C-2, and 2 and particularly to, e.g., FIGS. 9, 10A, and 10B for illustrative purposes only and not by way of limitation, fifth passage 561 has fifth-passage centerline 991, and fifth-passage centerline 991 is a straight line. The preceding portion of this paragraph characterizes example 45 of the subject matter, disclosed herein, where example 45 also encompasses any one of examples 20 to 44, above.

Fifth-passage centerline 991 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 9, 10A, and 10B for illustrative purposes only and not by way of limitation, sixth passage 562 has sixth-passage centerline 992, and sixth-passage centerline 992 is a straight line. The preceding portion of this paragraph characterizes example 46 of the subject matter, disclosed herein, where example 46 also encompasses any one of examples 20 to 45, above.

Sixth-passage centerline 992 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 9, 10A, and 10B for illustrative purposes only and not by way of limitation, seventh passage 563 has seventh-passage centerline 993, and seventh-passage centerline 993 is a straight line. The preceding portion of this paragraph characterizes example 47 of the subject matter, disclosed herein, where example 47 also encompasses any one of examples 20 to 46, above.

Seventh-passage centerline 993 being a straight line provides for each of manufacture of fluid-flow-modification plate 200 with conventional manufacturing techniques, including but not limited to drilling and boring.

Referring generally to FIGS. 1A-1, 1A-2, 1B-1, 1B-2, 1C-1, 1C-2, and 2 and particularly to, e.g., FIGS. 9, 10A, and 10B for illustrative purposes only and not by way of limitation, eighth passage 564 has eighth-passage centerline 994, and eighth-passage centerline 994 is a straight line. The preceding portion of this paragraph characterizes example 48 of the subject matter, disclosed herein, where example 48 also encompasses any one of examples 20 to 47, above.

Eighth-passage centerline 994 being a straight line provides for each of manufacture of fluid-flow-modification plate 200 with conventional manufacturing techniques, including but not limited to drilling and boring.

Referring to FIGS. 10A and 10B, fifth-passage centerline 991, sixth-passage centerline 992, seventh-passage centerline 993, and eighth-passage centerline 994, in one or more examples, are each angled relative to fluid-flow direction 298 by any suitable angle, such as a, which facilitates the intertwined and mixed fluid-flow streams from fifth passage 561, sixth passage 562, seventh passage 563, and eighth passage 564 in the manner, described above with respect to first passage 501, second passage 502, third passage 503, and fourth passage 504. While the angles of fifth-passage centerline 991, sixth-passage centerline 992, seventh-passage centerline 993, and eighth-passage centerline 994 are illustrated as being the same as the angles of first-passage centerline 591, second-passage centerline 592, third-passage centerline 593, and fourth-passage centerline 594, in one or more other examples, the angles are different.

Figure 10C:
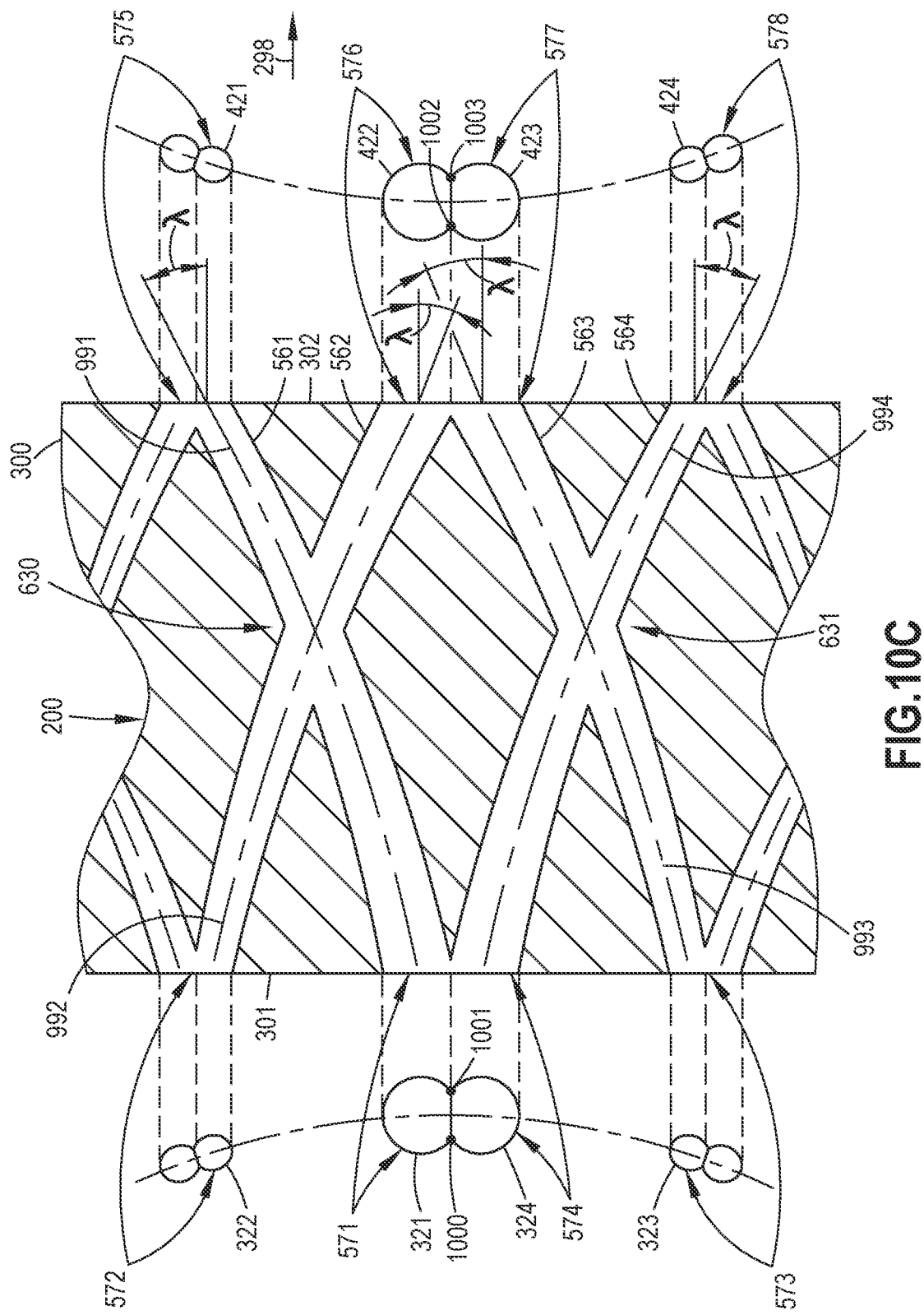
FIG. 10C is a schematic, sectional side view illustration of the fluid-flow-modification plate of the extruder of FIG. 2A, taken along circle 378 in FIG. 3, according to one or more examples of the subject matter, disclosed herein.
Figure 10D:
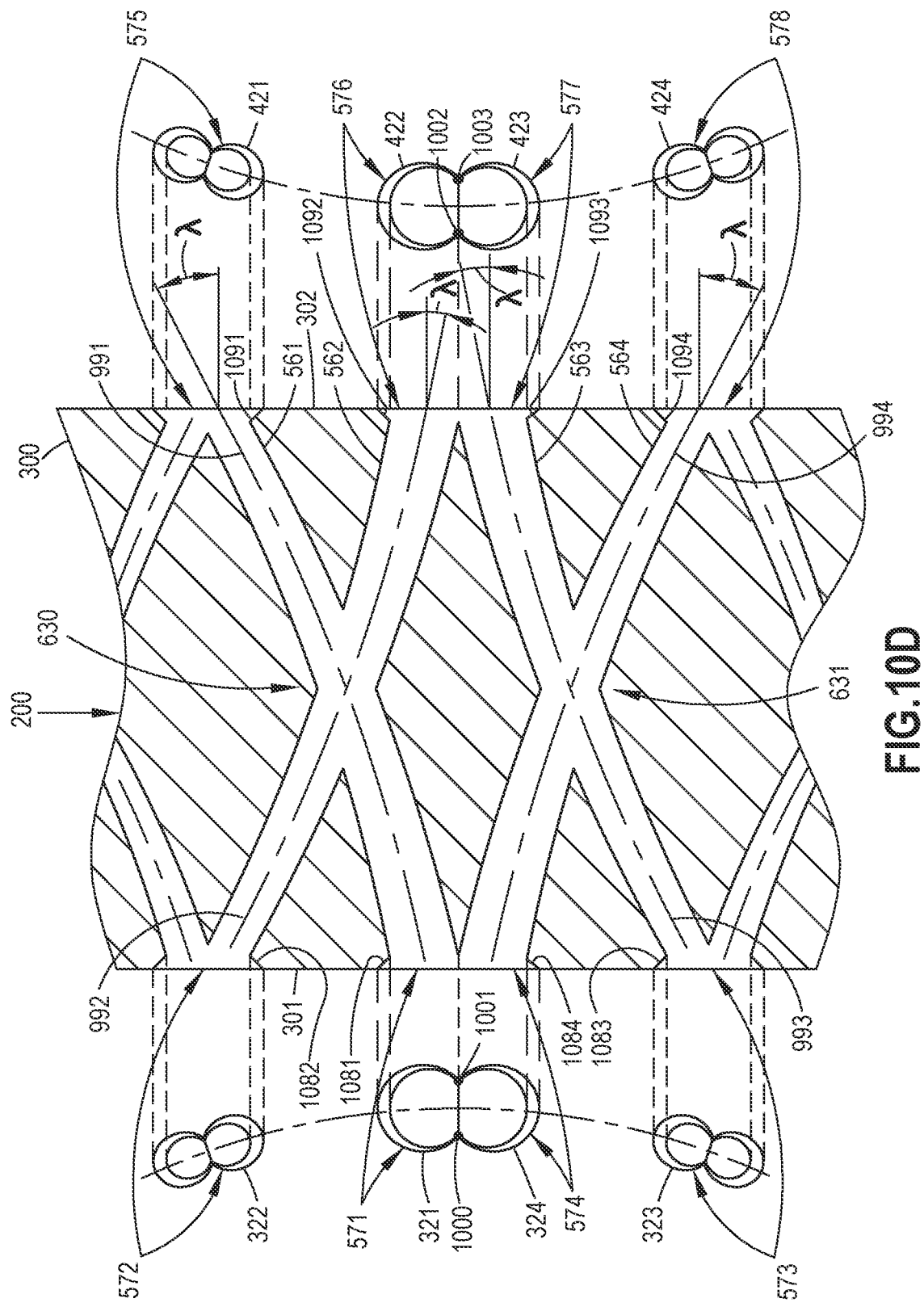
FIG. 10D is a schematic, sectional side view illustration of the fluid-flow-modification plate of the extruder of FIG. 2A, taken along circle 378 in FIG. 3, according to one or more examples of the subject matter, disclosed herein.
Figure 11A:
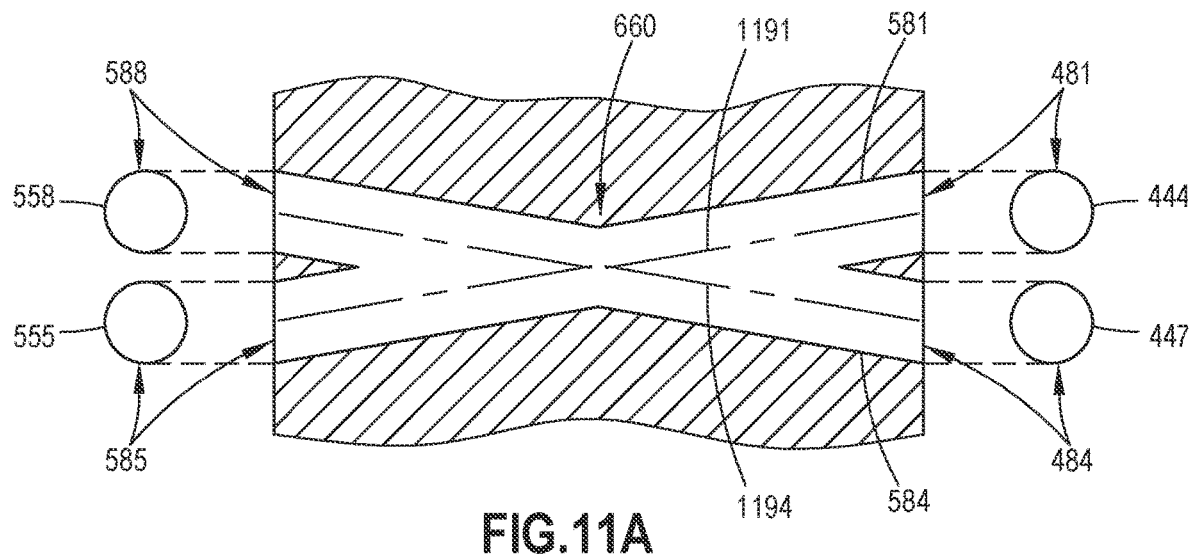
FIG. 11A is a schematic, sectional side-view illustration of the fluid-flow-modification plate of the extruder of FIG. 2A, taken along circle 379 in FIG. 3, according to one or more examples of the subject matter, disclosed herein.
Figure 11B:
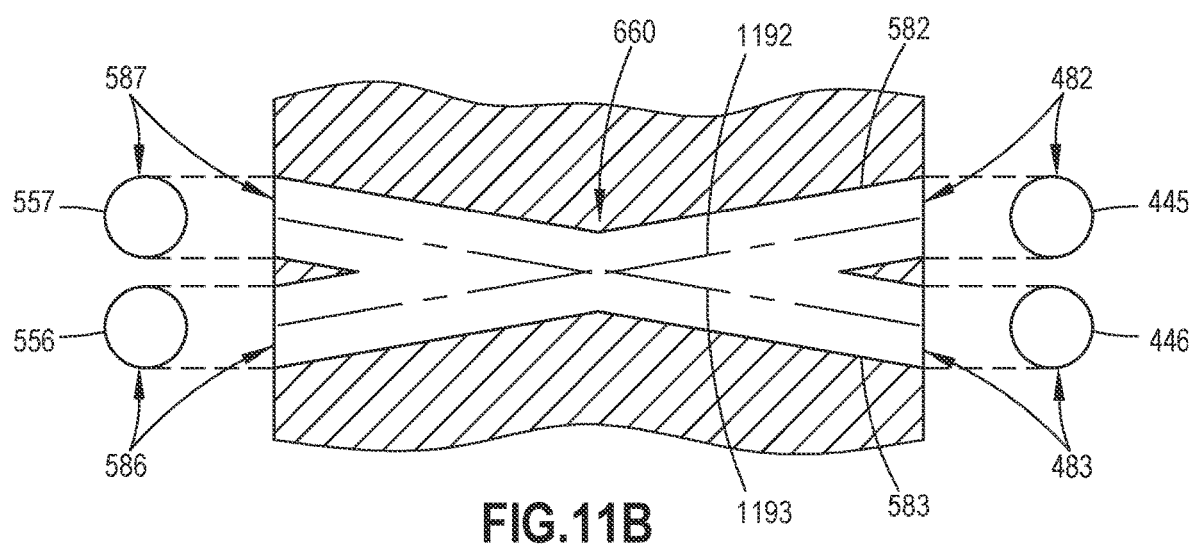
FIG. 11B is a schematic, sectional side-view illustration of the fluid-flow-modification plate of the extruder of FIG. 2A, taken along circle 379 in FIG. 3, according to one or more examples of the subject matter, disclosed herein.
Figure 11C:
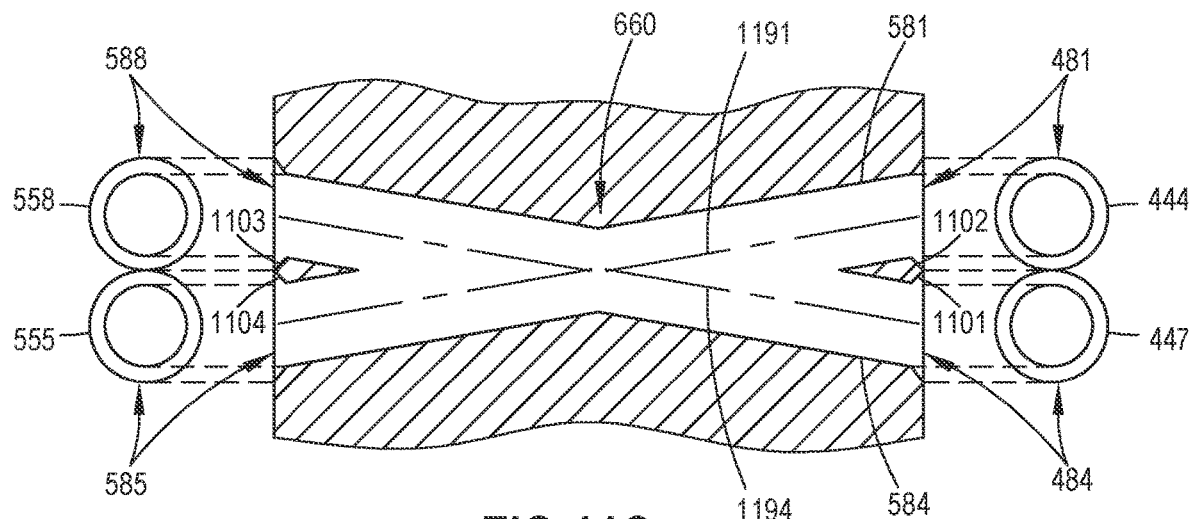
FIG. 11C is a schematic, sectional side-view illustration of the fluid-flow-modification plate of the extruder of FIG. 2A, taken along circle 379 in FIG. 3, according to one or more examples of the subject matter, disclosed herein.
Figure 11D:
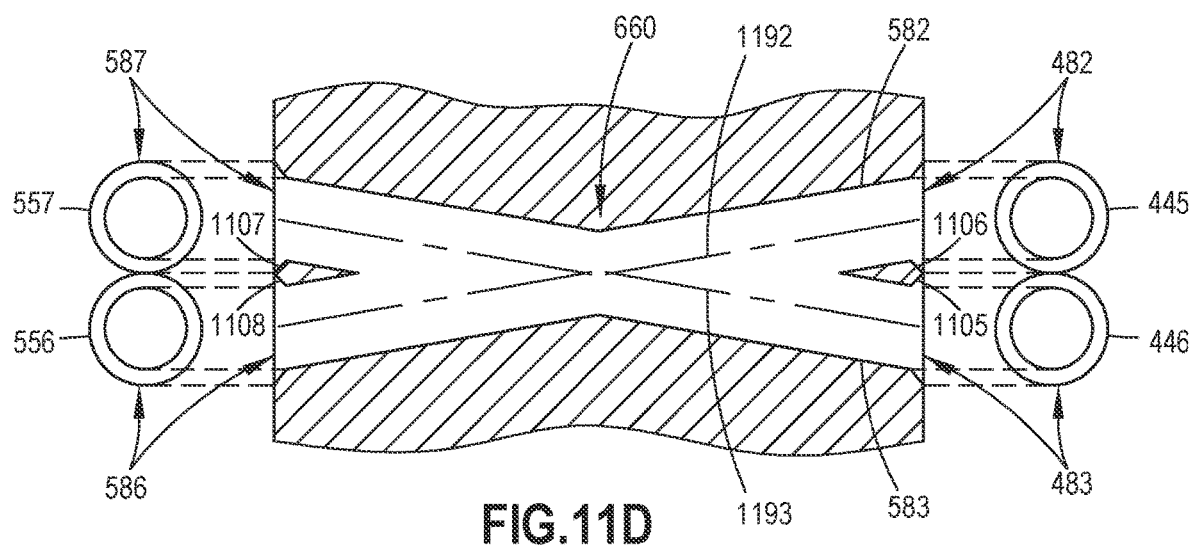
FIG. 11D is a schematic, sectional side-view illustration of the fluid-flow-modification plate of the extruder of FIG. 2A, taken along circle 379 in FIG. 3, according to one or more examples of the subject matter, disclosed herein.
Figure 11G:
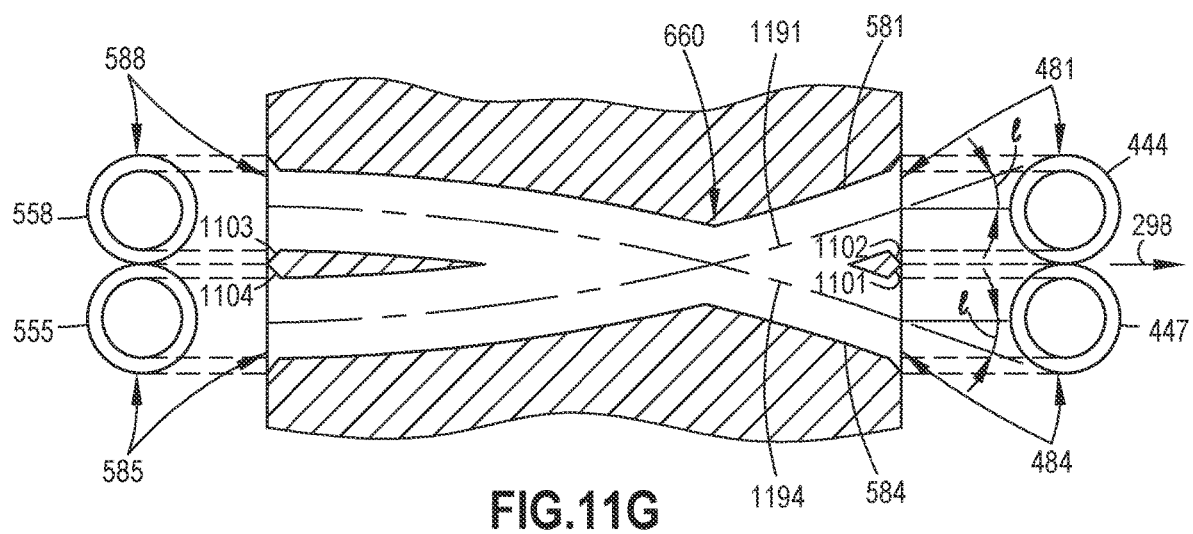
FIG. 11G is a schematic, sectional side-view illustration of the fluid-flow-modification plate of the extruder of FIG. 2A, taken along circle 379 in FIG. 3, according to one or more examples of the subject matter, disclosed herein.
Figure 11H:
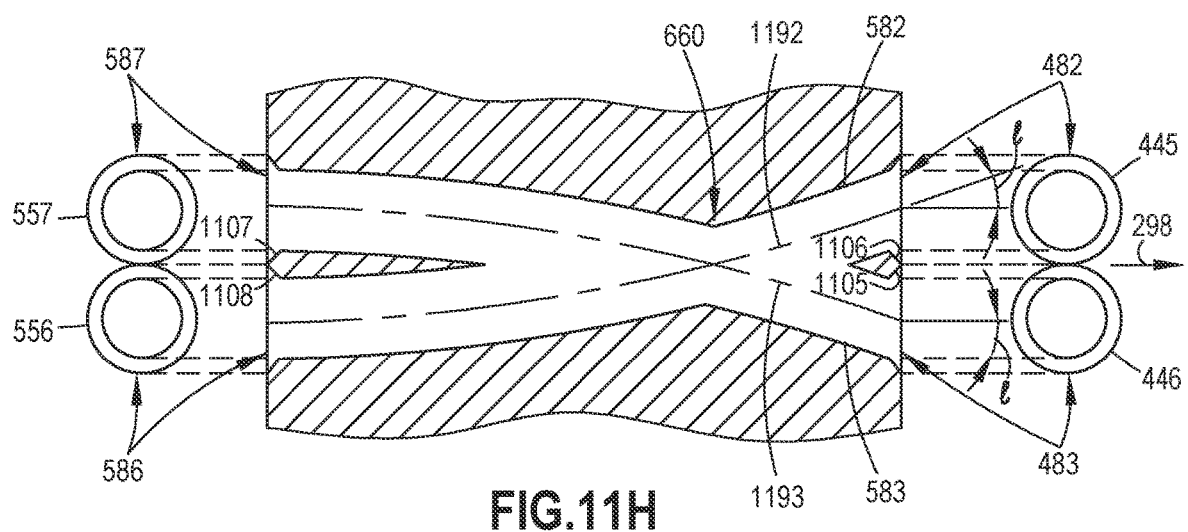
FIG. 11H is a schematic, sectional side-view illustration of the fluid-flow-modification plate of the extruder of FIG. 2A, taken along circle 379 in FIG. 3, according to one or more examples of the subject matter, disclosed herein.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, fifth passage 561 has fifth-passage centerline 991, and fifth-passage centerline 991 is a curved line. The preceding portion of this paragraph characterizes example 49 of the subject matter, disclosed herein, where example 49 also encompasses any one of examples 20 to 44, above.

In one or more examples, fifth-passage centerline 991 being a curved line increases exit angle $\lambda$ of highly filled composite material 211 (see FIG. 2A), exiting fifth passage 561 relative to fluid-flow direction 298. For example, the more fifth-passage centerline 991 is curved, the larger is exit angle $\lambda$. Increased exit angle $\lambda$ causes intertwining and mixing of the respective fluid-flow streams from fifth passage 561, sixth passage 562, seventh passage 563, and eighth passage 564 and randomizes orientations of reinforcing fibers 212 in highly filled composite material 211 as highly filled composite material 211 exits nozzle 202 (see FIG. 2A). In one or more examples, fifth-passage centerline 991 being a curved line also provides for fifth passage 561 having an inlet that is substantially parallel with fluid-flow direction 298, while providing exit angle λ.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, fifth-passage centerline 991 has no inflection points. The preceding portion of this paragraph characterizes example 50 of the subject matter, disclosed herein, where example 50 also encompasses example 49, above.

In one or more examples, fifth-passage centerline 991 having no inflection points substantially prevents fluid-flow stagnation through fifth passage 561.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, sixth passage 562 has sixth-passage centerline 992, and sixth-passage centerline 992 is a curved line. The preceding portion of this paragraph characterizes example 51 of the subject matter, disclosed herein, where example 51 also encompasses any one of examples 20 to 44, 49, and 50, above.

In one or more examples, sixth-passage centerline 992 being a curved line increases exit angle λ of highly filled composite material 211 (see FIG. 2A), exiting sixth passage 562 relative to fluid-flow direction 298. For example, the more sixth-passage centerline 992 is curved, the larger is exit angle λ. Increased exit angle λ causes intertwining and mixing of the respective fluid-flow streams from fifth passage 561, sixth passage 562, seventh passage 563, and eighth passage 564 and randomizes orientations of reinforcing fibers 212 in highly filled composite material 211 as highly filled composite material 211 exits nozzle 202 (see FIG. 2A). In one or more examples, sixth-passage centerline 992 being a curved line also provides for sixth passage 562 having an inlet that is substantially parallel with fluid-flow direction 298, while providing exit angle λ.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, sixth-passage centerline 992 has no inflection points. The preceding portion of this paragraph characterizes example 52 of the subject matter, disclosed herein, where example 52 also encompasses example 51, above.

In one or more examples, sixth-passage centerline 992 having no inflection points substantially prevents fluid-flow stagnation through sixth passage 562.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, seventh passage 563 has seventh-passage centerline 993, and seventh-passage centerline 993 is a curved line. The preceding portion of this paragraph characterizes example 53 of the subject matter, disclosed herein, where example 53 also encompasses any one of examples 20 to 44 and 49 to 52, above.

In one or more examples, seventh-passage centerline 993 being a curved line increases exit angle λ of highly filled composite material 211 (see FIG. 2A), exiting seventh passage 563 relative to fluid-flow direction 298. For example, the more seventh-passage centerline 993 is curved, the larger is exit angle λ. Increased exit angle λ causes intertwining and mixing of the respective fluid-flow streams from fifth passage 561, sixth passage 562, seventh passage 563, and eighth passage 564 and randomizes orientations of reinforcing fibers 212 in highly filled composite material 211 as highly filled composite material 211 exits nozzle 202 (see FIG. 2A). In one or more examples, seventh-passage centerline 993 being a curved line also provides for seventh passage 563 having an inlet that is substantially parallel with fluid-flow direction 298, while providing exit angle λ.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, seventh-passage centerline 993 has no inflection points. The preceding portion of this paragraph characterizes example 54 of the subject matter, disclosed herein, where example 54 also encompasses example 53, above.

In one or more examples, seventh-passage centerline 993 having no inflection points substantially prevents fluid-flow stagnation through seventh passage 563.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, eighth passage 564 has eighth-passage centerline 994, and eighth-passage centerline 994 is a curved line. The preceding portion of this paragraph characterizes example 55 of the subject matter, disclosed herein, where example 55 also encompasses any one of examples 20 to 44 and 49 to 54, above.

In one or more examples, eighth-passage centerline 994 being a curved line increases exit angle λ of highly filled composite material 211 (see FIG. 2A), exiting eighth passage 564 relative to fluid-flow direction 298. For example, the more eighth-passage centerline 994 is curved, the larger is exit angle λ. Increased exit angle λ causes intertwining and mixing of the respective fluid-flow streams from fifth passage 561, sixth passage 562, seventh passage 563, and eighth passage 564 and randomizes orientations of reinforcing fibers 212 in highly filled composite material 211 as highly filled composite material 211 exits nozzle 202 (see FIG. 2A). In one or more examples, eighth-passage centerline 994 being a curved line also provides for eighth passage 564 having an inlet that is substantially parallel with fluid-flow direction 298, while providing exit angle λ.

While exit angle λ is illustrated as being substantially the same for fifth passage 561, sixth passage 562, seventh passage 563, and eighth passage 564, in one or more examples the exit angle for one or more of fifth passage 561, sixth passage 562, seventh passage 563, and eighth passage 564 is different than the exit angle of another of fifth passage 561, sixth passage 562, seventh passage 563, and eighth passage 564. In one or more examples, exit angle λ is about 30° to about 45°; however, in one or more other examples, exit angle λ is less than about 30° or more than about 45°.

Fifth-passage centerline 991, sixth-passage centerline 992, seventh-passage centerline 993, and eighth-passage centerline 994, in one or more examples, are be curved lines, and hence fifth passage 561, sixth passage 562, seventh passage 563, and eighth passage 564 are curved passages, formed using any suitable manufacturing technique, including, but not limited to, additive manufacturing, lost wax casting, sand casting, etc.

Referring generally to FIGS. 1A-1, 1A-2, 1B-1, 1B-2, 1C-1, 1C-2, and 2 and particularly to, e.g., FIGS. 10C and 10D for illustrative purposes only and not by way of limitation, eighth-passage centerline 994 has no inflection points. The preceding portion of this paragraph characterizes example 56 of the subject matter, disclosed herein, where example 56 also encompasses example 55, above.

In one or more example, eighth-passage centerline 994 having no inflection points substantially prevents fluid-flow stagnation through eighth passage 564.

Referring generally to FIGS. 1A-1, 1A-2, 1B-1, 1B-2, 1C-1, 1C-2, and 2 and particularly to, e.g., FIGS. 3, 10B, and 10D for illustrative purposes only and not by way of limitation, at least one of fifth-passage inlet opening 571, sixth-passage inlet opening 572, seventh-passage inlet opening 573, and eighth-passage inlet opening 574 is chamfered. The preceding portion of this paragraph characterizes example 57 of the subject matter, disclosed herein, where example 57 also encompasses any one of examples 20 to 56, above.

At least one of fifth-passage inlet opening 571, sixth-passage inlet opening 572, seventh-passage inlet opening 573, and eighth-passage inlet opening 574 being chamfered decreases a surface area of inlet-side surface 301. Decreasing the surface area of inlet-side surface 301 allows highly filled composite material 211 to enter fluid-flow-modification plate 200 with decreased fluid-flow stagnation.

In the example shown, fifth-passage inlet opening 571 has chamfer 1081, sixth-passage inlet opening 572 has chamfer 1082, seventh-passage inlet opening 573 has chamfer 1083, and eighth-passage inlet opening 574 has chamfer 1084. In one or more examples, one or more of fifth-passage inlet opening 571, sixth-passage inlet opening 572, seventh-passage inlet opening 573, and eighth-passage inlet opening 574 are not chamfered.

Referring generally to FIGS. 1A-1, 1A-2, 1B-1, 1B-2, 1C-1, 1C-2, and 2 and particularly to, e.g., FIGS. 10B and 10D for illustrative purposes only and not by way of limitation, at least one of fifth-passage outlet opening 575, sixth-passage outlet opening 576, seventh-passage outlet opening 577, and eighth-passage outlet opening 578 is chamfered. The preceding portion of this paragraph characterizes example 58 of the subject matter, disclosed herein, where example 58 also encompasses any one of examples 20 to 57, above.

In one or more examples, at least one of fifth-passage outlet opening 575, sixth-passage outlet opening 576, seventh-passage outlet opening 577, and eighth-passage outlet opening 578 being chamfered increases the size of an outlet area of the at least one of fifth-passage outlet opening 575, sixth-passage outlet opening 576, seventh-passage outlet opening 577, and eighth-passage outlet opening 578, facilitating changes in fluid-flow directions and mixing of respective fluid-flow streams from fifth passage 561, sixth passage 562, seventh passage 563, and eighth passage 564.

In the example shown, fifth-passage outlet opening 575 has chamfer 1091, sixth-passage outlet opening 576 has chamfer 1092, seventh-passage outlet opening 577 has chamfer 1093, and eighth-passage outlet opening 578 has chamfer 1094. In one or more examples, one or more of fifth-passage outlet opening 575, sixth-passage outlet opening 576, seventh-passage outlet opening 577, and eighth-passage outlet opening 578 are not chamfered.

Referring generally to FIGS. 1A-1, 1A-2, 1B-1, 1B-2, 1C-1, 1C-2, and 2 and particularly to, e.g., FIGS. 3-6 and 7A for illustrative purposes only and not by way of limitation, extruder 299 is disclosed. Extruder 299 comprises material-feed chamber 201, nozzle 202, and fluid-flow-modification plate 200, coupled to material-feed chamber 201 and to nozzle 202. Fluid-flow-modification plate 200 comprises monolithic body 300, first passage 501, second passage 502, third passage 503, and fourth passage 504. Monolithic body 300 has inlet-side surface 301 and outlet-side surface 302. First passage 501 extends between inlet-side surface 301 and outlet-side surface 302 and comprises first-passage inlet opening 511 and first-passage outlet opening 521. First-passage inlet opening 511 has first-passage-inlet-opening perimeter boundary 311, defined in inlet-side surface 301 of monolithic body 300. First-passage outlet opening 521 has first-passage-outlet-opening perimeter boundary 411, defined in outlet-side surface 302 of monolithic body 300. Second passage 502 extends between inlet-side surface 301 and outlet-side surface 302 and comprises second-passage inlet opening 512 and second-passage outlet opening 522. Second-passage inlet opening 512 has second-passage-inlet-opening perimeter boundary 312, defined in inlet-side surface 301 of monolithic body 300. Second-passage outlet opening 522 has second-passage-outlet-opening perimeter boundary 412, defined in outlet-side surface 302 of monolithic body 300. Third passage 503 extends between inlet-side surface 301 and outlet-side surface 302 and comprises third-passage inlet opening 513 and third-passage outlet opening 523. Third-passage inlet opening 513 has third-passage-inlet-opening perimeter boundary 313, defined in inlet-side surface 301 of monolithic body 300. Third-passage outlet opening 523 has third-passage-outlet-opening perimeter boundary 413, defined in outlet-side surface 302 of monolithic body 300. Fourth passage 504 extends between inlet-side surface 301 and outlet-side surface 302 and comprises fourth-passage inlet opening 514 and fourth-passage outlet opening 524. Fourth-passage inlet opening 514 has fourth-passage-inlet-opening perimeter boundary 314, defined in inlet-side surface 301 of monolithic body 300. Fourth-passage outlet opening 524 has fourth-passage-outlet-opening perimeter boundary 414, defined in outlet-side surface 302 of monolithic body 300. First passage 501 and second passage 502 intersect each other at first intersection boundary 530. Third passage 503 and fourth passage 504 intersect each other at second intersection boundary 531. First passage 501 and third passage 503 do not intersect each other. Second passage 502 and fourth passage 504 do not intersect each other. First-passage-inlet-opening perimeter boundary 311 has only two points 700, 701 of intersection with fourth-passage-inlet-opening perimeter boundary 314. First-passage inlet opening 511 and second-passage inlet opening 512 are separated from each other at least by a portion of inlet-side surface 301. First-passage inlet opening 511 and third-passage inlet opening 513 are separated from each other at least by a portion of inlet-side surface 301. Second-passage inlet opening 512 and third-passage inlet opening 513 are separated from each other at least by a portion of inlet-side surface 301. Third-passage inlet opening 513 and fourth-passage inlet opening 514 are separated from each other at least by a portion of inlet-side surface 301. Second-passage-outlet-opening perimeter boundary 412 has only two points 702, 703 of intersection with third-passage-outlet-opening perimeter boundary 413. First-passage outlet opening 521 and second-passage outlet opening 522 are separated from each other at least by a portion of outlet-side surface 302. First-passage outlet opening 521 and third-passage outlet opening 523 are separated from each other at least by a portion of outlet-side surface 302. First-passage outlet opening 521 and fourth-passage outlet opening 524 are separated from each other at least by a portion of outlet-side surface 302. Third-passage outlet opening 523 and fourth-passage outlet opening 524 are separated from each other at least by a portion of outlet-side surface 302. The preceding portion of this paragraph characterizes example 59 of the subject matter, disclosed herein.

Extruder 299, comprising fluid-flow-modification plate 200, forces highly filled composite material through the fluid-flow-modification plate 200, and the fluid-flow-modification plate 200 randomizes orientations of the fibers of the highly filled composite material 211 during extrusion to produce an isotropic material.

Extruder 299 also includes any suitable motor for driving piston 271 through material-feed chamber 201 to push highly filled composite material 211 through fluid-flow-modification plate 200 and out of nozzle 202, fluid-flow-modification plate 200 being configured as described herein. In one or more examples, motor 270 is connected to any suitable controller that drives motor 270 for driving piston 271 in fluid-flow direction 298 at any suitable predetermined feed rate. In one or more examples, material-feed chamber 201 includes any suitable temperature control system, such as heaters 207 that are controlled by any suitable controller, such as controller 208, for maintaining a temperature of highly filled composite material 211 within material-feed chamber 201 at any suitable predetermined temperature.

In one or more examples, nozzle 202 has any suitably shaped exit orifice, such as for example, circular shape 205 or rectangular shape 206. In one or more examples, exit orifice 203, having circular shape 205, has any suitable diameter where length 221 of fluid-flow-modification plate 200, extending from inlet-side surface 301 to the outlet-side surface, is about two times to about five times diameter 220. In one or more examples, length 221 is less than about two times diameter 220 or more than about five times diameter 220. Exit orifice 203 having rectangular shape 206, in one or more examples, has any suitable height and width, where length 221 of fluid-flow-modification plate 200, extending from inlet-side surface 301 to the outlet-side surface, is about two times to about five times height 226 or/width 225. In one or more examples, length 221 is less than about two times height 226 and/or width 225 or more than about five times height 226 and/or width 225. In one or more examples, nozzle 202 is a variable-gate nozzle, having an exit orifice with an adjustable size. Where the size of the exit orifice is adjustable, length 221 is sized, in one or more examples, to be five times larger than the smallest exit orifice and two times larger than the largest exit orifice.

As described above, the different passages of fluid-flow-modification plate 200 redirect highly filled composite material 211 being pushed from the material-feed chamber through fluid-flow-modification plate 200 by piston 271 so that respective fluid-flow streams of highly filled composite material 211 from the passages intertwine and mix within nozzle 202 to randomize orientations of reinforcing fibers 212 in highly filled composite material 211 as highly filled composite material 211 exits nozzle 202.

Figure 13:
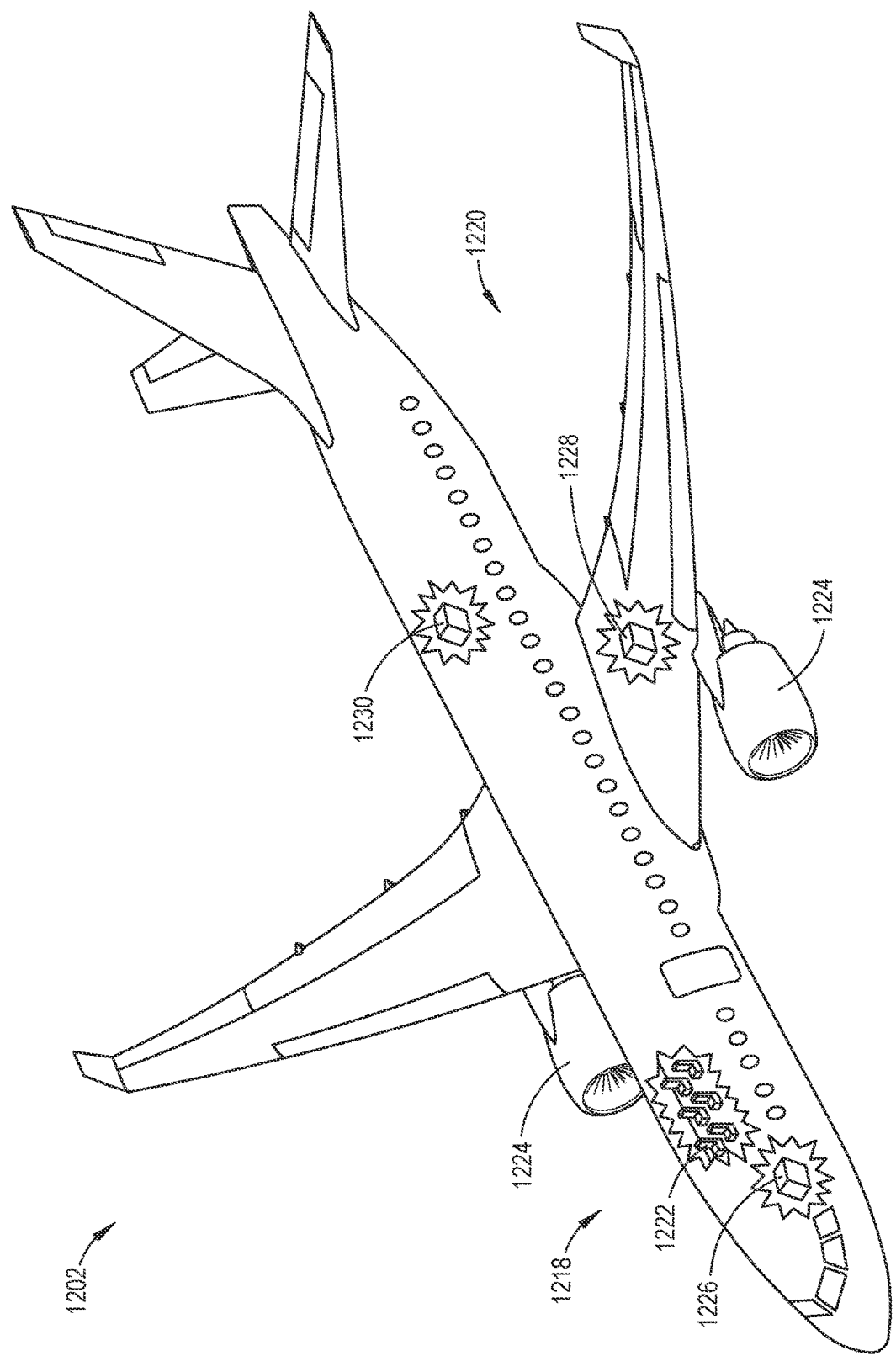
FIG. 13 is a schematic illustration of an aircraft.

Examples of the subject matter, disclosed herein may be described in the context of aircraft manufacturing and service method 1200 as shown in FIG. 12 and aircraft 1202 as shown in FIG. 13. During pre-production, illustrative method 1200 may include specification and design (block 1204) of aircraft 1202 and material procurement (block 1206). During production, component and subassembly manufacturing (block 1208) and system integration (block 1210) of aircraft 1202 may take place. Thereafter, aircraft 1202 may go through certification and delivery (block 1212) to be placed in service (block 1214). While in service, aircraft 1202 may be scheduled for routine maintenance and service (block 1216). Routine maintenance and service may include modification, reconfiguration, refurbishment, etc. of one or more systems of aircraft 1202.

Each of the processes of illustrative method 1200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1202 produced by illustrative method 1200 may include airframe 1218 with a plurality of high-level systems 1220 and interior 1222. Examples of high-level systems 1220 include one or more of propulsion system 1224, electrical system 1226, hydraulic system 1228, and environmental system 1230. Any number of other systems may be included. Although an aerospace example is shown, the principles disclosed herein may be applied to other industries, such as the automotive industry. Accordingly, in addition to aircraft 1202, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1200. For example, components or subassemblies corresponding to component and subassembly manufacturing (block 1208) may be fabricated or manufactured in a manner similar to components or subassemblies produced while aircraft 1202 is in service (block 1214). Also, one or more examples of the apparatus (es), method(s), or combination thereof may be utilized during production stages 1208 and 1210, for example, by substantially expediting assembly of or reducing the cost of aircraft 1202. Similarly, one or more examples of the apparatus or method realizations, or a combination thereof, may be utilized, for example and without limitation, while aircraft 1202 is in service (block 1214) and/or during maintenance and service (block 1216).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A fluid-flow-modification plate (200), comprising:
a monolithic body (300), having an inlet-side surface (301) and an outlet-side surface (302);

a first passage (501), extending between the inlet-side surface (301) and the outlet-side surface (302) and comprising:
- a first-passage inlet opening (511), having a first-passage-inlet-opening perimeter boundary (311), defined in the inlet-side surface (301) of the monolithic body (300); and
- a first-passage outlet opening (521), having a first-passage-outlet-opening perimeter boundary (411), defined in the outlet-side surface (302) of the monolithic body (300);

a second passage (502), extending between the inlet-side surface (301) and the outlet-side surface (302) and comprising:
- a second-passage inlet opening (512), having a second-passage-inlet-opening perimeter boundary (312), defined in the inlet-side surface (301) of the monolithic body (300); and
- a second-passage outlet opening (522), having a second-passage-outlet-opening perimeter boundary (412), defined in the outlet-side surface (302) of the monolithic body (300);

a third passage (503), extending between the inlet-side surface (301) and the outlet-side surface (302) and comprising:
- a third-passage inlet opening (513), having a third-passage-inlet-opening perimeter boundary (313), defined in the inlet-side surface (301) of the monolithic body (300); and
- a third-passage outlet opening (523), having a third-passage-outlet-opening perimeter boundary (413), defined in the outlet-side surface (302) of the monolithic body (300); and a fourth passage (504), extending between the inlet-side surface (301) and the outlet-side surface (302) and comprising:
- a fourth-passage inlet opening (514), having a fourth-passage-inlet-opening perimeter boundary (314), defined in the inlet-side surface (301) of the monolithic body (300); and
- a fourth-passage outlet opening (524), having a fourth-passage-outlet-opening perimeter boundary (414), defined in the outlet-side surface (302) of the monolithic body (300); and wherein:

the first passage (501) and the second passage (502) intersect each other at a first intersection boundary (530);

the third passage (503) and the fourth passage (504) intersect each other at a second intersection boundary (531);

the first passage (501) and the third passage (503) do not intersect each other;

the second passage (502) and the fourth passage (504) do not intersect each other;

the first-passage-inlet-opening perimeter boundary (311) has only two points of intersection with the fourth-passage-inlet-opening perimeter boundary (314);

the first-passage inlet opening (511) and the second-passage inlet opening (512) are separated from each other at least by a portion of the inlet-side surface (301);

the first-passage inlet opening (511) and the third-passage inlet opening (513) are separated from each other at least by a portion of the inlet-side surface (301);

the second-passage inlet opening (512) and the third-passage inlet opening (513) are separated from each other at least by a portion of the inlet-side surface (301);

the third-passage inlet opening (513) and the fourth-passage inlet opening (514) are separated from each other at least by a portion of the inlet-side surface (301);

the second-passage-outlet-opening perimeter boundary (412) has only two points of intersection with the third-passage-outlet-opening perimeter boundary (413);

the first-passage outlet opening (521) and the second-passage outlet opening (522) are separated from each other at least by a portion of the outlet-side surface (302);

the first-passage outlet opening (521) and the third-passage outlet opening (523) are separated from each other at least by a portion of the outlet-side surface (302);

the first-passage outlet opening (521) and the fourth-passage outlet opening (524) are separated from each other at least by a portion of the outlet-side surface (302); and the third-passage outlet opening (523) and the fourth-passage outlet opening (524) are separated from each other at least by a portion of the outlet-side surface (302).

2. The fluid-flow-modification plate (200) according to claim 1, wherein a sum of a smallest cross-sectional area of the first passage (501) and a smallest cross sectional area of the fourth passage (504) is greater than an area, circumscribed by the first-passage-inlet-opening perimeter boundary (311) and the fourth-passage-inlet-opening perimeter boundary (314).

3. The fluid-flow-modification plate (200) according to claim 2, wherein the sum of the smallest cross-sectional area of the first passage (501) and the smallest cross sectional area of the fourth passage (504) is no more than 50% greater than the area, circumscribed by the first-passage-inlet-opening perimeter boundary (311) and the fourth-passage-inlet-opening perimeter boundary (314).

4. The fluid-flow-modification plate (200) according to claim 1, wherein at least one of the first-passage inlet opening (511), the second-passage inlet opening (512), the third-passage inlet opening (513), and the fourth-passage inlet opening (514) is chamfered.

5. The fluid-flow-modification plate (200) according to claim 1, wherein at least one of the first-passage outlet opening (521), the second-passage outlet opening (522), the third-passage outlet opening (523), and the fourth-passage outlet opening (524) is chamfered.

6. The fluid-flow-modification plate (200) according claim 1, wherein the first-passage inlet opening (511), the second-passage inlet opening (512), the third-passage inlet opening (513), and the fourth-passage inlet opening (514) are collectively arranged in a first circumferentially closed formation (367).

7. The fluid-flow-modification plate (200) according to claim 6, further comprising:
a fifth passage (561), extending between the inlet-side surface (301) and the outlet-side surface (302) and comprising:
- a fifth-passage inlet opening (571), having a fifth-passage-inlet-opening perimeter boundary (321), defined in the inlet-side surface (301) of the monolithic body (300); and a fifth-passage outlet opening (575), having a fifth-passage-outlet-opening perimeter boundary (421), defined in the outlet-side surface (302) of the monolithic body (300);

a sixth passage (562), extending between the inlet-side surface (301) and the outlet-side surface (302) and comprising:
 a sixth-passage inlet opening (572), having a sixth-passage-inlet-opening perimeter boundary (322), defined in the inlet-side surface (301) of the monolithic body (300); and
 a sixth-passage outlet opening (576), having a sixth-passage-outlet-opening perimeter boundary (422), defined in the outlet-side surface (302) of the monolithic body (300);

a seventh passage (563), extending between the inlet-side surface (301) and the outlet-side surface (302) and comprising:
 a seventh-passage inlet opening (573), having a seventh-passage-inlet-opening perimeter boundary (323), defined in the inlet-side surface (301) of the monolithic body (300); and
 a seventh-passage outlet opening (577), having a seventh-passage-outlet-opening perimeter boundary (423), defined in the outlet-side surface (302) of the monolithic body (300); and an eighth passage (564), extending between the inlet-side surface (301) and the outlet-side surface (302) and comprising:
 an eighth-passage inlet opening (574), having an eighth-passage-inlet-opening perimeter boundary (324), defined in the inlet-side surface (301) of the monolithic body (300); and
 an eighth-passage outlet opening (578), having an eighth-passage-outlet-opening perimeter boundary (424), defined in the outlet-side surface (302) of the monolithic body (300); and wherein:
the fifth passage (561) and the sixth passage (562) intersect each other at a third intersection boundary (630);
the seventh passage (563) and the eighth passage (564) intersect each other at a fourth intersection boundary (631);
the fifth passage (561) and the seventh passage (563) do not intersect each other;
the sixth passage (562) and the eighth passage (564) do not intersect each other;
the fifth-passage-inlet-opening perimeter boundary (321) has only two points of intersection with the eighth-passage-inlet-opening perimeter boundary (324);
the fifth-passage inlet opening (571) and the sixth-passage inlet opening (572) are separated from each other at least by a portion of the inlet-side surface (301);
the fifth-passage inlet opening (571) and the seventh-passage inlet opening (573) are separated from each other at least by a portion of the inlet-side surface (301);
the sixth-passage inlet opening (572) and the seventh-passage inlet opening (573) are separated from each other at least by a portion of the inlet-side surface (301);
the seventh-passage inlet opening (573) and the eighth-passage inlet opening (574) are separated from each other at least by a portion of the inlet-side surface (301);

the sixth-passage-outlet-opening perimeter boundary (422) has only two points of intersection with the seventh-passage-outlet-opening perimeter boundary (423);
the fifth-passage outlet opening (575) and the sixth-passage outlet opening (576) are separated from each other at least by a portion of the outlet-side surface (302);
the fifth-passage outlet opening (575) and the seventh-passage outlet opening (577) are separated from each other at least by a portion of the outlet-side surface (302);
the fifth-passage outlet opening (575) and the eighth-passage outlet opening (578) are separated from each other at least by a portion of the outlet-side surface (302); and
the seventh-passage outlet opening (577) and the eighth-passage outlet opening (578) are separated from each other at least by a portion of the outlet-side surface (302).

8. The fluid-flow-modification plate (200) according to claim 7, wherein the fifth-passage inlet opening (571), the sixth-passage inlet opening (572), the seventh-passage inlet opening (573), and the eighth-passage inlet opening (574) are arranged in a second circumferentially closed formation (368) that is circumscribed by the first circumferentially closed formation (367).

9. The fluid-flow-modification plate (200) according to claim 8, further comprising:
a ninth passage (581), extending between the inlet-side surface (301) and the outlet-side surface (302) and comprising:
 a ninth-passage inlet opening (585), having a ninth-passage-inlet-opening perimeter boundary (555), defined in the inlet-side surface (301) of the monolithic body (300); and
 a ninth-passage outlet opening (481), having a ninth-passage-outlet-opening perimeter boundary (444), defined in the outlet-side surface (302) of the monolithic body (300);

a tenth passage (582), extending between the inlet-side surface (301) and the outlet-side surface (302) and comprising:
 a tenth-passage inlet opening (586), having a tenth-passage-inlet-opening perimeter boundary (556), defined in the inlet-side surface (301) of the monolithic body (300); and
 a tenth-passage outlet opening (482), having a tenth-passage-outlet-opening perimeter boundary (445), defined in the outlet-side surface (302) of the monolithic body (300);

an eleventh passage (583), extending between the inlet-side surface (301) and the outlet-side surface (302) and comprising:
 an eleventh-passage inlet opening (587), having an eleventh-passage-inlet-opening perimeter boundary (557), defined in the inlet-side surface (301) of the monolithic body (300); and
 an eleventh-passage outlet opening (483), having an eleventh-passage-outlet-opening perimeter boundary (446), defined in the outlet-side surface (302) of the monolithic body (300); and a twelfth passage (584), extending between the inlet-side surface (301) and the outlet-side surface (302) and comprising:

a twelfth-passage inlet opening (588), having a twelfth-passage-inlet-opening perimeter boundary (558), defined in the inlet-side surface (301) of the monolithic body (300); and a twelfth-passage outlet opening (484), having a twelfth-passage-outlet-opening perimeter boundary (447), defined in the outlet-side surface (302) of the monolithic body (300); and wherein:

the ninth passage (581), the tenth passage (582), the eleventh passage (583), and the twelfth passage (584) intersect each other at a fifth intersection boundary (660).

10. The fluid-flow-modification plate (200) according to claim 9, wherein any one of the ninth-passage-inlet-opening perimeter boundary (555), the tenth-passage-inlet-opening perimeter boundary (556), the eleventh-passage-inlet-opening perimeter boundary (557), and the twelfth-passage-inlet-opening perimeter boundary (558) has no contact point with any other one of the ninth-passage-inlet-opening perimeter boundary (555), the tenth-passage-inlet-opening perimeter boundary (556), the eleventh-passage-inlet-opening perimeter boundary (557), and the twelfth-passage-inlet-opening perimeter boundary (558).

11. The fluid-flow-modification plate (200) according to claim 9, wherein any one of the ninth-passage-outlet-opening perimeter boundary (444), the tenth-passage-outlet-opening perimeter boundary (445), the eleventh-passage-outlet-opening perimeter boundary (446), and the twelfth-passage-outlet-opening perimeter boundary (447) has no contact point with any other one of the ninth-passage-outlet-opening perimeter boundary (444), the tenth-passage-outlet-opening perimeter boundary (445), the eleventh-passage-outlet-opening perimeter boundary (446), and the twelfth-passage-outlet-opening perimeter boundary (447).

12. The fluid-flow-modification plate (200) according to claim 9, wherein the ninth-passage inlet opening (585), the tenth-passage inlet opening (586), the eleventh-passage inlet opening (587), and the twelfth-passage inlet opening (588) are arranged in a third circumferentially closed formation (369) that is circumscribed by the first circumferentially closed formation (367) and the second circumferentially closed formation (368).

13. The fluid-flow-modification plate (200) according to claim 12, wherein the third circumferentially closed formation (369) is concentric with the circumferentially closed formation (367) and the second circumferentially closed formation (368).

14. The fluid-flow-modification plate (200) according to claim 12, wherein the fifth intersection boundary (660) is centered about an axis that extends through a center of the third circumferentially closed formation (369).

15. The fluid-flow-modification plate (200) according to claim 9, wherein at least one of the ninth-passage inlet opening (585), the tenth-passage inlet opening (586), the eleventh-passage inlet opening (587), and the twelfth-passage inlet opening (588) is chamfered.

16. The fluid-flow-modification plate (200) according to claim 9, wherein at least one of the ninth-passage outlet opening (481), the tenth-passage outlet opening (482), the eleventh-passage outlet opening (483), and the twelfth-passage outlet opening (484) is chamfered.

17. The fluid-flow-modification plate (200) according to claim 7, wherein a sum of a smallest cross-sectional area of the fifth passage (561) and a smallest cross-sectional area of the eighth passage (564) is greater than an area, circumscribed by the fifth-passage-inlet-opening perimeter boundary (321) and the eighth-passage-inlet-opening perimeter boundary (324).

18. The fluid-flow-modification plate (200) according to claim 17, wherein the sum of the smallest cross-sectional area of the fifth passage (561) and the smallest cross-sectional area of the eighth passage (564) is no more than 50% greater than the area, circumscribed by the fifth-passage-inlet-opening perimeter boundary (321) and the eighth-passage-inlet-opening perimeter boundary (324).

19. The fluid-flow-modification plate (200) according to claim 7, wherein at least one of the fifth-passage inlet opening (571), the sixth-passage inlet opening (572), the seventh-passage inlet opening (573), and the eighth-passage inlet opening (574) is chamfered.

20. The fluid-flow-modification plate (200) according to claim 7, wherein at least one of the fifth-passage outlet opening (575), the sixth-passage outlet opening (576), the seventh-passage outlet opening (577), and the eighth-passage outlet opening (578) is chamfered.

21. An extruder (299), comprising:
a material-feed chamber (201);
a nozzle (202); and
a fluid-flow-modification plate (200), coupled to the material-feed chamber (201) and to the nozzle (202) and comprising:
a monolithic body (300), having an inlet-side surface (301) and an outlet-side surface (302);
a first passage (501), extending between the inlet-side surface (301) and the outlet-side surface (302), and wherein the first passage (501) comprises:
a first-passage inlet opening (511), having a first-passage-inlet-opening perimeter boundary (311), defined in the inlet-side surface (301) of the monolithic body (300); and
a first-passage outlet opening (521), having a first-passage-outlet-opening perimeter boundary (411), defined in the outlet-side surface (302) of the monolithic body (300);
a second passage (502), extending between the inlet-side surface (301) and the outlet-side surface (302) and comprising:
a second-passage inlet opening (512), having a second-passage-inlet-opening perimeter boundary (312), defined in the inlet-side surface (301) of the monolithic body (300); and
a second-passage outlet opening (522), having a second-passage-outlet-opening perimeter boundary (412), defined in the outlet-side surface (302) of the monolithic body (300);
a third passage (503), extending between the inlet-side surface (301) and the outlet-side surface (302) and comprising:
a third-passage inlet opening (513), having a third-passage-inlet-opening perimeter boundary (313), defined in the inlet-side surface (301) of the monolithic body (300); and
a third-passage outlet opening (523), having a third-passage-outlet-opening perimeter boundary (413), defined in the outlet-side surface (302) of the monolithic body (300); and
a fourth passage (504), extending between the inlet-side surface (301) and the outlet-side surface (302) and comprising:
a fourth-passage inlet opening (514), having a fourth-passage-inlet-opening perimeter boundary (314), defined in the inlet-side surface (301) of the monolithic body (300); and a fourth-passage outlet opening (524), having a fourth-passage-outlet-opening perimeter boundary (414), defined in the outlet-side surface (302) of the monolithic body (300); and wherein:

the first passage (501) and the second passage (502) intersect each other at a first intersection boundary (530);

the third passage (503) and the fourth passage (504) intersect each other at a second intersection boundary (531);

the first passage (501) and the third passage (503) do not intersect each other;

the second passage (502) and the fourth passage (504) do not intersect each other;

the first-passage-inlet-opening perimeter boundary (311) has only two points of intersection with the fourth-passage-inlet-opening perimeter boundary (314);

the first-passage inlet opening (511) and the second-passage inlet opening (512) are separated from each other at least by a portion of the inlet-side surface (301);

the first-passage inlet opening (511) and the third-passage inlet opening (513) are separated from each other at least by a portion of the inlet-side surface (301);

the second-passage inlet opening (512) and the third-passage inlet opening (513) are separated from each other at least by a portion of the inlet-side surface (301);

the third-passage inlet opening (513) and the fourth-passage inlet opening (514) are separated from each other at least by a portion of the inlet-side surface (301);

the second-passage-outlet-opening perimeter boundary (412) has only two points of intersection with the third-passage-outlet-opening perimeter boundary (413);

the first-passage outlet opening (521) and the second-passage outlet opening (522) are separated from each other at least by a portion of the outlet-side surface (302);

the first-passage outlet opening (521) and the third-passage outlet opening (523) are separated from each other at least by a portion of the outlet-side surface (302);

the first-passage outlet opening (521) and the fourth-passage outlet opening (524) are separated from each other at least by a portion of the outlet-side surface (302); and the third-passage outlet opening (523) and the fourth-passage outlet opening (524) are separated from each other at least by a portion of the outlet-side surface (302).

* * * * *